(12) United States Patent
Kono et al.

(10) Patent No.: US 11,201,470 B2
(45) Date of Patent: Dec. 14, 2021

(54) POWER-SOURCE POWER FACTOR CONTROL SYSTEM, PHASE MODIFYING APPARATUS, AND ACTIVE FILTER APPARATUS

(71) Applicant: DAIKIN INDUSTRIES, LTD., Osaka (JP)

(72) Inventors: Masaki Kono, Osaka (JP); Reiji Kawashima, Osaka (JP); Takayuki Fujita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/608,690

(22) PCT Filed: Apr. 27, 2018

(86) PCT No.: PCT/JP2018/017324
§ 371 (c)(1),
(2) Date: Oct. 25, 2019

(87) PCT Pub. No.: WO2018/199333
PCT Pub. Date: Nov. 1, 2018

(65) Prior Publication Data
US 2020/0142437 A1 May 7, 2020

(30) Foreign Application Priority Data

Apr. 28, 2017 (JP) .............................. JP2017-089212
Apr. 28, 2017 (JP) .............................. JP2017-089213
(Continued)

(51) Int. Cl.
*H02M 1/42* (2007.01)
*H02M 1/12* (2006.01)
(Continued)

(52) U.S. Cl.
CPC .............. *H02J 3/1842* (2013.01); *H02J 3/01* (2013.01); *H02J 3/14* (2013.01); *H02J 3/1892* (2013.01)

(58) Field of Classification Search
CPC .......... H02J 3/1842; H02J 3/1892; H02J 3/01; H02J 3/14; H02J 2310/00; H02J 2310/50;
(Continued)

(56) References Cited

U.S. PATENT DOCUMENTS 5,442,271 A * 8/1995 Hatanaka ................. H02P 27/08
318/729
5,693,988 A * 12/1997 Bettega ..................... H02J 3/01
307/105
(Continued)

FOREIGN PATENT DOCUMENTS

JP    7-336890 A    12/1995
JP    2003-92829 A    3/2003
(Continued)

OTHER PUBLICATIONS

International Search Report (PCT/ISA/210) issued in PCT/JP2018/017324, dated May 29, 2018.
(Continued)

*Primary Examiner* — Sisay G Tiku
(74) *Attorney, Agent, or Firm* — Birch, Stewart, Kolasch & Birch, LLP

(57) ABSTRACT

A load apparatus is connected to an AC power source and is supplied with power from the AC power source. An operation state control unit controls, based on a target value about a power-source quality including either a power-source power factor of the AC power source or a power-source harmonic of the AC power source and on a present power-source quality, an operation state of the load apparatus.

31 Claims, 32 Drawing Sheets

(30) Foreign Application Priority Data

Apr. 28, 2017  (JP) .............................. JP2017-089214
Apr. 28, 2017  (JP) .............................. JP2017-089215

(51) Int. Cl.
  *H02J 3/00*     (2006.01)
  *H02J 3/01*     (2006.01)
  *H02J 3/14*     (2006.01)
  *H02J 3/18*     (2006.01)
  *H02M 7/493*    (2007.01)

(58) Field of Classification Search
  CPC ...... H02J 2310/56; H02J 3/00; H02J 2310/58; G05F 1/70; H02M 2310/56; H02M 1/42; H02M 1/12; H02M 7/493
  See application file for complete search history.

(56) References Cited

U.S. PATENT DOCUMENTS

| | | | | |
|---|---|---|---|---|
| 5,731,965 | A * | 3/1998 | Cheng | H02J 3/01 363/41 |
| 5,757,099 | A * | 5/1998 | Cheng | H02J 3/01 307/105 |
| 10,447,191 | B2 * | 10/2019 | Kawashima | H02M 1/12 |
| 10,511,220 | B2 * | 12/2019 | Kawashima | H02M 1/44 |
| 10,651,651 | B2 * | 5/2020 | Kono | H02M 7/12 |
| 2008/0077286 | A1 * | 3/2008 | Oyobe | B60L 50/10 701/22 |
| 2009/0021964 | A1 * | 1/2009 | Hsu | H02J 3/1842 363/41 |
| 2011/0057517 | A1 * | 3/2011 | Zhang | H02J 3/01 307/105 |
| 2012/0205981 | A1 * | 8/2012 | Varma | H02J 3/01 307/64 |
| 2013/0046414 | A1 * | 2/2013 | Ree | H02J 3/1892 700/297 |
| 2017/0187190 | A1 * | 6/2017 | Asano | H02J 3/381 |
| 2019/0187736 | A1 * | 6/2019 | Toizumi | G01R 19/2509 |
| 2019/0222023 | A1 * | 7/2019 | Sharifipour | G01R 19/2513 |
| 2020/0129896 | A1 * | 4/2020 | Kono | F24F 11/46 |

FOREIGN PATENT DOCUMENTS

| | | |
|---|---|---|
| JP | 3444030 B2 | 9/2003 |
| JP | 2010-175098 A | 8/2010 |
| JP | 2011-35986 A | 2/2011 |
| JP | 2012-39727 A | 2/2012 |
| JP | 2012-67982 A | 4/2012 |
| JP | 2013-42656 A | 2/2013 |
| JP | 5515765 B2 | 6/2014 |
| JP | 2016-226232 A | 12/2016 |

OTHER PUBLICATIONS

Extended European Search Report issued in European counterpart Application No. 18791305.8 dated Dec. 4, 2020.

* cited by examiner

POWER-SOURCE POWER FACTOR CONTROL SYSTEM, PHASE MODIFYING APPARATUS, AND ACTIVE FILTER APPARATUS

TECHNICAL FIELD

The present disclosure relates to a power-source power factor control system, a phase modifying apparatus, and an active filter apparatus.

BACKGROUND ART

Various apparatuses, such as air conditioning apparatuses and lighting apparatuses, are installed as apparatuses operated by being supplied with power in structures, such as factories and buildings.

There has been a system that performs demand control on the above-described apparatuses. The system obtains the powers of the apparatuses during operation and controls, based on a demand control signal from a demand apparatus, the operation frequencies of the apparatuses such that the powers of the apparatuses become set powers. The demand control is, as disclosed in Patent Document 1 and Patent Document 2, for example, control of adjusting the amount of power or a peak value of the amount of power to a certain value or less in response to a request from a user.

CITATION LIST

Patent Document

Patent Document 1: Japanese Patent No. 5515765
Patent Document 2: Japanese Unexamined Patent Application Publication No. 2010-175098

SUMMARY OF INVENTION

Technical Problem

In general, a basic charge of electricity charges is determined based on a maximum value of the amount of power measured every unit period (for example, 30 minutes), and is discounted based on an average value of a power-source power factor in a predetermined time period in one day (for example, from 8:00 to 22:00). Thus, not only the maximum value of power but also the power factor is an important element in reducing electricity charges. However, in Patent Document 1 and Patent Document 2 listed above, although control based on the amount of power is performed, the control does not address a decrease in power-source power factor, and thus it is impossible to sufficiently reduce electricity charges.

In some cases, a penalty is imposed on a basic charge of electricity charges in accordance with the degree of decrease in power-source power factor. Thus, it is important to improve and optimize the power-source power factor.

The present invention has been made in view of the above-described points, and an object thereof is to improve a power-source power factor.

Solution to Problem

A first aspect of the present disclosure is a power-source power factor control system including: a load apparatus (1, 2, 101, 102, 201, 202, 301, 302, 401, 402, 501, 502, 601, 602, 701, 702, 801, 802, 901, 902, 1001, 1002) that is connected to an AC power source (3, 103, 203, 303, 403, 503, 603, 703, 803, 903, 1003) and that is supplied with power from the AC power source; and an operation state control unit (1c, 2c, 101 c, 102c, 240, 340, 440, 540, 640, 740, 840, 940, 1001c, 1002c) that controls, based on a target value about a power-source quality including either a power-source power factor of the AC power source or a power-source harmonic of the AC power source and on a present power-source quality, an operation state of the load apparatus.

Here, the operation state of the load apparatus is changed in accordance with the power-source quality including either the power-source power factor or the power-source harmonic of the AC power source and with the target value about the power-source power factor. Accordingly, the power-source power factor can be improved.

A second aspect of the present disclosure is the power-source power factor control system according to the first aspect, further including: a power-source power factor measuring unit (9) that measures the power-source power factor; and a control signal generating unit (40) that generates, based on a measurement result of the power-source power factor measuring unit (9), a control signal Fs for changing the operation state of the load apparatus, wherein the operation state control unit (1c, 2c) adjusts, based on the control signal Fs, an operation parameter for changing the operation state of the load apparatus (1, 2) such that the power-source power factor approaches the target value of the power-source power factor, to control the operation state of the load apparatus (1, 2).

Here, the operation parameter of the load apparatus is adjusted such that the actual power-source power factor approaches the target value, and thus the operation capability of the load apparatus is changed from a state before the operation parameter is changed. The change in the operation capability of the load apparatus causes the actual power-source power factor to approach the target value, and thus the actual power-source power factor is optimized. This leads to, for example, suppression of a decrease in power-source power factor and an improvement in power-source power factor, and makes it possible to reduce a basic charge included in electricity charges or avoid the imposition of a penalty on electricity charges.

A third aspect of the present disclosure is the power-source power factor control system according to the second aspect, wherein the control signal Fs is a signal for changing the operation state of the load apparatus (1, 2) when the measurement result of the power-source power factor measuring unit (9) is below the target value.

The control signal enables the actual power-source power factor below the target value to increase and approach the target value.

A fourth aspect of the present disclosure is the power-source power factor control system according to the third aspect, wherein the control signal generating unit (40) integrates a difference between the measurement result of the power-source power factor measuring unit (9) and the target value while the measurement result of the power-source power factor measuring unit (9) is below the target value, and generates the control signal Fs in a case where a result of the integration reaches a predetermined value.

Here, the operation state of the load apparatus is changed such that the actual power-source power factor approaches the target value in a case where the integral value of the difference between the actual power-source power factor and the target value reaches the predetermined value. That is, the operation state of the load apparatus is changed not in a case where the power-source power factor is instantaneously lower than the target value but in a case where deviation of the power-source power factor from the target value has certainly occurred. Thus, control to change the operation state of the load apparatus is performed only in a case where there is certainly the necessity of increasing the power-source power factor.

A fifth aspect of the present disclosure is the power-source power factor control system according to the first aspect, further including: a power-source power factor measuring unit (104) that measures the power-source power factor; a control signal generating unit (152) that generates, based on a measurement result of the power-source power factor measuring unit (104) and the target value, a control signal Fs for changing the operation state of the load apparatus; and a target value adjusting unit (151) that adjusts, based on the measurement result of the power-source power factor measuring unit (104), the target value.

Here, the operation state of the load apparatus is changed based on the target value of the power-source power factor and the actual power-source power factor, but the target value is not a fixed value but is a value adjusted based on the actual power-source power factor. Because the target value is a variable value, the power-source power factor at the site where the power-source power factor control system is established can be optimized, with the change in the operation capability of the load apparatus being minimized. That is, not the control of optimizing the power-source power factor by actively changing the operation capability of the load apparatus, but the control of optimizing the power-source power factor by changing the target value of the power-source power factor is performed. This leads to, for example, suppression of a decrease in power-source power factor and an improvement in power-source power factor, and makes it possible to reduce a basic charge included in electricity charges or avoid the imposition of a penalty on electricity charges.

A sixth aspect of the present disclosure is the power-source power factor control system according to the fifth aspect, wherein the target value adjusting unit (151) adjusts the target value by using the power-source power factor in a unit period for which the target value is adjusted.

A seventh aspect of the present disclosure is the power-source power factor control system according to the sixth aspect, wherein the target value adjusting unit (151) adjusts the target value by using an average value of the power-source power factor in the unit period.

An eighth aspect of the present disclosure is the power-source power factor control system according to the seventh aspect, wherein, in a case where an average value of the power-source power factor in a first period of the unit period exceeds a reference value, the target value adjusting unit (151) causes the target value in a second period following the first period of the unit period to be smaller than the target value in the first period, and in a case where the average value in the first period is below the reference value, the target value adjusting unit (151) causes the target value in the second period to be larger than the target value in the first period.

Accordingly, fluctuation of the average value of the target value in the unit period can be suppressed as much as possible. As a result, the power-source power factor in the unit period can be reliably optimized.

A ninth aspect of the present disclosure is the power-source power factor control system according to the eighth aspect, wherein a total period of the first period and the second period is equal to or shorter than the unit period.

When the total period of the first period and the second period is equal to the unit period, fluctuation of the average value of the target value in the unit period can be suppressed as much as possible. When the total period of the first period and the second period is shorter than the unit period, fluctuation of the average value of the target value in the unit period can be finely suppressed.

A tenth aspect of the present disclosure is the power-source power factor control system according to the ninth aspect, wherein the total period of the first period and the second period is equal to the unit period, and each of the first period and the second period is half the unit period.

Accordingly, the target value in the second period can be easily adjusted, and thus fluctuation of the average value of the target value during the unit period can be prevented relatively easily.

An eleventh aspect of the present disclosure is the power-source power factor control system according to any one of the sixth to tenth aspects, wherein the unit period is one month.

In some cases, the period over which the value of the power-source power factor has an influence on electricity charges is "one month". Here, fluctuation of the average value of the target value of the power-source power factor in "one month" as the unit period is suppressed. This makes it possible to reliably receive the application of discount of electricity charges based on the average value of the power-source power factor, and to reliably suppress the imposition of a penalty of a basic charge based on the degree of decrease in power-source power factor.

A twelfth aspect of the present disclosure is the power-source power factor control system according to any one of the second to eleventh aspects, wherein the power-source power factor measuring unit (9, 104) is a power meter.

A power meter is connected to a structure, such as a building or a factory. The power meter measures a power-source power factor in addition to a power in many cases. Here, the power meter is used as the power-source power factor measuring unit, and thus it is not necessary to specially attach a sensor or detecting circuit for measuring a power-source power factor. This eliminates the necessity of newly attaching a sensor or detecting circuit, and the cost can be reduced accordingly.

A thirteenth aspect of the present disclosure is the power-source power factor control system according to any one of the second to twelfth aspects, wherein the power-source power factor measuring unit (9, 104) wirelessly transmits the measurement result to the control signal generating unit (40, 152).

Accordingly, the necessity of a wiring line for connecting the power-source power factor measuring unit and the control signal generating unit is eliminated, and the necessity of installing the wiring line is eliminated.

A fourteenth aspect of the present disclosure is the power-source power factor control system according to any one of the second to thirteenth aspects, wherein the control signal generating unit (40, 152) wirelessly transmits the control signal Fs that has been generated to the operation state control unit (1c, 2c, 101c, 102c).

Accordingly, the necessity of a wiring line for connecting the control signal generating unit and the operation state control unit is eliminated, and the necessity of installing the wiring line is eliminated.

A fifteenth aspect of the present disclosure is the power-source power factor control system according to any one of the second to fourteenth aspects, wherein the load apparatus (1, 2, 101, 102) is an air conditioning apparatus.

In the case of designing a structure, such as a building or a factory, installation of a refrigerant pipe that connects an outdoor unit and an indoor unit of an air conditioning apparatus is necessary, and thus the specifications of the air conditioning apparatus to be installed in the structure are determined naturally. Thus, a communication line between the control signal generating unit or the like and the air conditioning apparatus can be connected during construction of the structure, and an environment in which the operation capability of the air conditioning apparatus can be changed by the power-source power factor can be easily established.

A sixteenth aspect of the present disclosure is the power-source power factor control system according to the fifteenth aspect, wherein the load apparatus (1, 2, 101, 102) is a source of a harmonic current, the power-source power factor control system further includes an active filter (1b, 101b) that is connected in parallel to the load apparatus (1, 2, 101, 102) with respect to the AC power source (3, 103) and that reduces a harmonic current generated in the load apparatus (1, 2, 101, 102), and the active filter (1b, 101b) is incorporated in the air conditioning apparatus.

Accordingly, the power factor of the air conditioning apparatus, which is a load apparatus, can be kept high, and thus the power-source power factor can converge to the target value as quickly as possible.

A seventeenth aspect of the present disclosure is the power-source power factor control system according to any one of the second to sixteenth aspects, further including: a phase modifier (31, 131) that is connected in parallel to the load apparatus (1, 2, 101, 102) with respect to the AC power source (3, 103) and that controls reactive power of the power supplied to the load apparatus (1, 2, 101, 102).

Accordingly, the power factor of the load apparatus can be kept high, and thus the power-source power factor can converge to the target value as quickly as possible.

An eighteenth aspect of the present disclosure is the power-source power factor control system according to any one of the second to fourteenth aspects, wherein the load apparatus (1, 2, 101, 102) is a source of a harmonic current, and the power-source power factor control system further includes an active filter (30, 130) that is connected in parallel to the load apparatus (1, 2, 101, 102) with respect to the AC power source (3, 103) and that reduces a harmonic current generated in the load apparatus (1, 2, 101, 102).

Accordingly, the power factor of the load apparatus can be kept high, and thus the power-source power factor can converge to the target value as quickly as possible.

A nineteenth aspect of the present disclosure is a phase modifying, apparatus that is included in the power-source power factor control system according to the first aspect and that is connected to the AC power source (203, 303, 403, 503) and the load apparatus (201, 202, 301, 302, 401, 402, 501, 502), including: a power factor improving unit (230, 330, 430, 531) that improves a fundamental power factor by generating a current for reducing a harmonic current of the load apparatus or by changing, a phase of the current; and the operation state control unit (240, 340, 440, 540), wherein the target value about the power-source power factor of the AC power source is a target value of the fundamental power factor, and the operation state control unit controls an operation parameter for changing the operation state of the load apparatus such that the fundamental power factor approaches the target value.

Here, the operation of the phase modifying apparatus is not controlled but the operation state of the load apparatus is changed such that the fundamental power factor approaches the target value. Accordingly, the actual power-source power factor approaches the target value. In this way, even if the capacity of the phase modifying apparatus is small, the operation capability of the load apparatus is adjusted so as to be decreased, for example, by controlling the operation state of the load apparatus, and thus the capability of improving the fundamental power factor of the phase modifying apparatus recovers. Accordingly, even if the capacity of phase modifying apparatus is relatively small, the fundamental power factor is improved without problems. Thus, the capacity of the phase modifying apparatus can be actively reduced, and the cost can be reduced accordingly.

A twentieth aspect of the present disclosure is the phase modifying apparatus according to the nineteenth aspect, further including: a current detecting unit (205a. 205b, 305a to 305c, 406a, 400, 407a, 407b, 505a, 505b) that detects an output current output from the AC power source, wherein the operation state control unit (240, 340, 440, 540) adjusts, based on a detection result of the current detecting unit, the operation parameter such that the fundamental power factor approaches the target value.

By using an actually detected output current of the AC power source at the time of adjusting the operation parameter, the actual power-source power factor can be grasped. Thus, the operation parameter can be easily adjusted such that the fundamental power factor approaches the target value more reliably.

A twenty-first aspect of the present disclosure is the phase modifying apparatus according to the twentieth aspect, wherein the AC power source (303) is a power source having a plurality of phases, and the current detecting unit (305a to 305c) includes a plurality of current detecting units provided corresponding to respective phases of the AC power source.

This is preferable in a case where a load apparatus driven by a single-phase voltage is connected. A plurality of current detecting units are provided corresponding to the respective phases of the AC power source. Thus, even if the phase connected to the load apparatus is unknown, the current values of all the three phases can be reliably grasped.

A twenty-second aspect of the present disclosure is the phase modifying apparatus according to the twentieth or twenty-first aspect, wherein the current detecting unit (205a, 205b, 305a to 305c, 406a, 406b, 407a, 407b, 505a, 505b) wirelessly transmits the detection result to the operation state control unit (240, 340, 440, 540).

Accordingly, the necessity of a wiring line for connecting the current detecting unit and the operation state control unit is eliminated, and the necessity of installing the wiring line is eliminated.

A twenty-third aspect of the present disclosure is the phase modifying apparatus according to any one of the twentieth to twenty-second aspects, wherein the current detecting unit (205a, 205b, 305a to 305c, 406a. 406b, 407a, 407b, 505a, 505b) operates with a non-power-source scheme.

Accordingly, the necessity of connecting the current detecting unit to an external power source is eliminated.

A twenty-fourth aspect of the present disclosure is the phase modifying apparatus according to any one of the nineteenth to twenty-third aspects, wherein the power factor improving unit (531) is a phase modifier that is connected in parallel to the load apparatus (501, 502) with respect to the AC power source (503) and that controls reactive power of the power supplied to the load apparatus.

Accordingly, the power factor of the load apparatus can be kept high, and thus the fundamental power factor can be improved as quickly as possible.

A twenty-fifth aspect of the present disclosure is the phase modifying apparatus according to the twenty-fourth aspect, wherein the phase modifier (531) includes a phase advancing capacitor (Ca, Cb, Cc).

A twenty-sixth aspect of the present disclosure is the phase modifying apparatus according to the twenty-fifth aspect, wherein the phase modifier (531) further includes a reactor (La, Lb, Lc) connected in series to the phase advancing capacitor (Ca, Cb, Cc).

Accordingly, even if a short-circuit failure occurs in the phase advancing capacitor, the magnitude of the current flowing through the phase modifier can be reduced by the reactor. Thus, when a short-circuit failure occurs, for example, a situation can be prevented from occurring where a large current transiently flows through the phase modifier, the current also affects a component other than the phase modifier, and a serious failure occurs.

A twenty-seventh aspect of the present disclosure is the phase modifying apparatus according to any one of the nineteenth to twenty-third aspects, wherein the load apparatus (201, 202, 301, 302, 401, 402) is a source of a harmonic current, and the power factor improving unit (230, 330, 430) is an active filter that is connected in parallel to the load apparatus with respect to the AC power source (203, 303, 403) and that reduces a harmonic current generated in the load apparatus.

Accordingly, the power factor of the load apparatus can be kept high, and thus the fundamental power factor can be improved as quickly as possible.

A twenty-eighth aspect of the present disclosure is the phase modifying apparatus according to any one of the nineteenth to twenty-seventh aspects, wherein the load apparatus (201, 202, 301, 302, 401, 402, 501, 502) is an air conditioning apparatus.

In the case of designing a structure, such as a building or a factory, installation of a refrigerant pipe that connects an outdoor unit and an indoor unit of an air conditioning apparatus is necessary, and thus the specifications of the air conditioning apparatus to be installed in the structure are determined naturally. Thus, a communication line between the operation state control unit or the like and the air conditioning apparatus can be connected during construction of the structure, and an environment in which the operation capability of the air conditioning apparatus can be changed by the power-source power factor can be easily established.

A twenty-ninth aspect of the present disclosure is an active filter apparatus that is included in the power-source power factor control system according to the first aspect and that is connected to the AC power source (603, 703, 803, 903) and the load apparatus (601, 602, 701, 702, 801, 802, 901, 902), including: a current source (630, 730, 830, 930) that generates a current for improving a fundamental power factor of the load apparatus; a current detecting unit (605a, 605b, 705a, 705b, 805a to 805c. 906a, 906b, 907a, 907b) that detects an output current output from the AC power source; and the operation state control unit (640, 740, 840, 940), wherein the target value about the power-source power factor of the AC power source is a target value of the fundamental power factor, and the operation state control unit controls, based on a detection result of the current detecting unit, an operation parameter for changing the operation state of the load apparatus such that the fundamental power factor approaches the target value.

Here, the operation of the active filter apparatus is not controlled but the operation state of the load apparatus is controlled based on the actual output current of the AC power source such that the fundamental power factor approaches the target value. Accordingly, the actual power-source power factor approaches the target value. In this way, even if the capacity of the active filter apparatus is small, the operation capability of the load apparatus is adjusted so as to be decreased, for example, by controlling the operation state of the load apparatus, and thus the capability of improving the fundamental power factor of the active filter apparatus recovers. Accordingly, even if the capacity of the active filter apparatus is relatively small, the fundamental power factor is improved without problems. Thus, the capacity of the active filter apparatus can be actively reduced, and the cost can be reduced accordingly.

A thirtieth aspect of the present disclosure is the active filter apparatus according to the twenty-ninth aspect, wherein the current source further reduces a harmonic current of the load apparatus.

Here, a reduction in harmonic current and an improvement in fundamental power factor are performed.

A thirty-first aspect of the present disclosure is the active filter apparatus according to the twenty-ninth or thirtieth aspect, wherein the load apparatus (601, 602, 701, 702, 801, 802) includes a plurality of load apparatuses, and the operation state control unit (640, 740, 840) adjusts the operation parameter of each of the plurality of load apparatuses such that operation capabilities of the plurality of load apparatuses decrease, to cause the fundamental power factor to approach the target value.

Here, the operation states of the plurality of load apparatuses are changed in the direction of decreasing the operation capabilities. Accordingly, the operation capabilities of the load apparatuses are decreased more than in the case of changing only the operation state of one load apparatus, and thus the capability of improving the fundamental power factor quickly recovers. Thus, the power-source power factor can quickly reach the target value, with a decrease in power-source power factor being minimized.

A thirty-second aspect of the present disclosure is the active filter apparatus according to the twenty-ninth or thirtieth aspect, wherein the load apparatus (901, 902) includes a plurality of load apparatuses, the operation state control unit (940) determines, based on the detection result of the current detecting unit (906a, 906b, 907a, 907b), a load apparatus whose operation capability is to be decreased from among the plurality of load apparatuses, and adjusts the operation parameter of the determined load apparatus such that the operation capability of the determined load apparatus decreases, to cause the fundamental power factor to approach the target value.

Here, a load apparatus whose operation state is to be changed in the direction of reducing power, that is, decreasing the operation capability, is selected from among the plurality of load apparatuses. Accordingly, the number of load apparatuses whose operation capability is to be decreased can be minimized, and the operation state of the load apparatus whose operation capability is not to be decreased can be maintained.

A thirty-third aspect of the present disclosure is the active filter apparatus according to the thirty-second aspect, wherein the current detecting unit (906a, 906b, 907a, 907b) includes a plurality of current detecting units provided corresponding to the respective load apparatuses (901, 902), and each of the current detecting units detects the output current from the AC power source (903) to a corresponding one of the load apparatuses (901, 902).

Here, a load apparatus whose operation state is to be changed in the direction of decreasing the operation capability is determined from the values of currents actually flowing through the respective load apparatuses. Accordingly, the load apparatus as a target whose operation capability is to be decreased can be accurately determined in accordance with an actual situation.

A thirty-fourth aspect of the present disclosure is the active filter apparatus according to any one of the thirty-first to thirty-third aspects, further including: a distribution switchboard (606, 706, 806, 906) that causes the power from the AC power source to branch off to each of the load apparatuses, wherein the current detecting unit (605a, 605b, 705a, 705b, 805a to 805c, 906a, 906b) is installed in the distribution switchboard.

Here, the current detecting unit is installed inside or outside the distribution switchboard.

A thirty-fifth aspect of the present disclosure is the active filter apparatus according to any one of the twenty-ninth to thirty-second aspects, wherein the current detecting unit (805a to 805c) includes a plurality of current detecting units provided corresponding to respective phases (R, S, T) of the AC power source (803).

This is preferable in a case where a load apparatus driven by a single-phase voltage is connected. A plurality of current detecting units are provided corresponding to the respective phases of the AC power source. Thus, even if the phase connected to the load apparatus is unknown, the current values of all the three phases can be reliably grasped.

A thirty-sixth aspect of the present disclosure is the active filter apparatus according to any one of the twenty-ninth to thirty-fifth aspects, wherein the current detecting unit (605a, 605b, 705a, 705b, 805a to 805c, 906a, 906b, 907a, 907b) wirelessly transmits the detection result to the operation state control unit.

Accordingly, the necessity of a wiring line for connecting the current detecting unit and the operation state control unit is eliminated, and the necessity of installing the wiring line is eliminated.

A thirty-seventh aspect of the present disclosure is the active filter apparatus according to any one of the twenty-ninth to thirty-sixth aspects, wherein the current detecting unit (605a, 605b, 705a, 705b, 805a to 805c, 906a, 906b, 907a, 907b) operates with a non-power-source scheme.

Accordingly, the necessity of connecting the current detecting unit to an external power source is eliminated.

A thirty-eighth aspect of the present disclosure is the active filter apparatus according to any one of the twenty-ninth to thirty-seventh aspects, wherein the active filter apparatus (604, 704, 804, 904) is incorporated in an air conditioning apparatus (620, 720, 820, 920).

In the case of designing a structure, such as a building or a factory, installation of a refrigerant pipe that connects an outdoor unit and an indoor unit of an air conditioning apparatus is necessary, and thus the specifications of the air conditioning apparatus to be installed in the structure are determined naturally. Thus, a communication line between the active filter apparatus and the air conditioning apparatus can be connected during construction of the structure, and an environment in which the operation capability of the load apparatus can be changed based on the output current output from the AC power source can be easily established.

Advantageous Effects of Invention

According to the aspects of the present disclosure, a power-source power factor can be improved.

DESCRIPTION OF EMBODIMENTS

Hereinafter, embodiments of the present invention will be described in detail with reference to the drawings. The following embodiments are essentially preferable examples and are not intended to limit the scope of the present invention, the application thereof, or the use thereof.

First Embodiment

<Configuration of Power-Source Power Factor Control System (100)>

Figure 1:
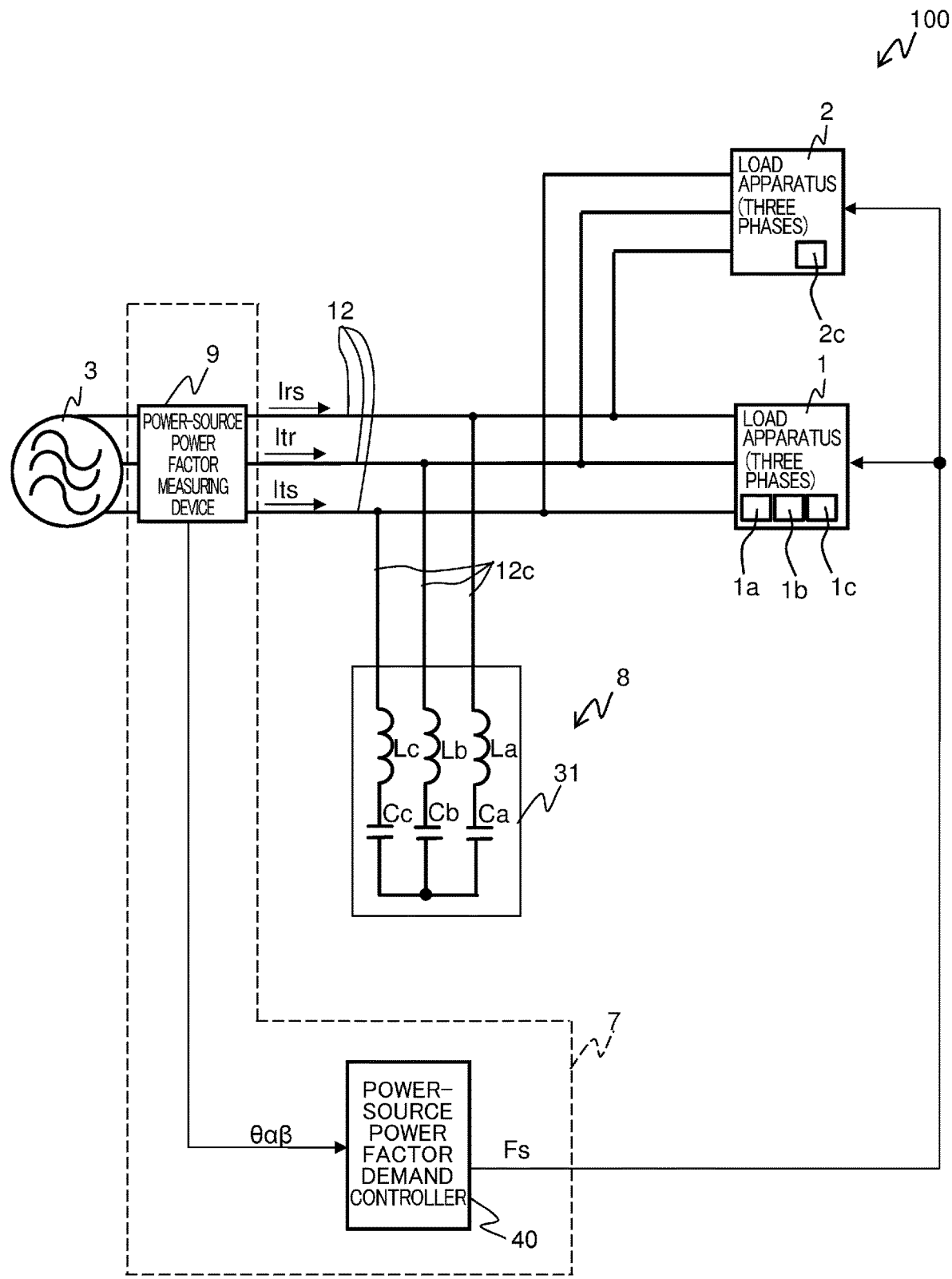
FIG. 1 is a diagram schematically illustrating the configuration of a power-source power factor control system according to a first embodiment.

FIG. 1 is a block diagram illustrating the configuration of a power-source power factor control system (100) according to a first embodiment. In this example, the power-source power factor control system (100) includes a plurality of load apparatuses (1, 2), a phase modifying facility (8), a power-source power factor measuring device (9) (corresponding to a power-source power factor measuring unit), a power-source power factor demand controller (40) (corresponding to a control signal generating unit), and adjusting units (1c, 2c) (corresponding to an operation state control unit) included in the load apparatuses (1, 2). In the first embodiment, a case is taken as an example where the load apparatus (1) of the plurality of load apparatuses (1, 2) is an air conditioning apparatus.

The power-source power factor control system (100) is installed in an apartment, a factory, a building, a detached house, or the like (hereinafter a building or the like). The load apparatus (1), which is an air conditioning apparatus, performs indoor air conditioning.

The building or the like is supplied with power from a power system including an alternating-current (AC) power source (3). In this example, the AC power source (3) is a three-phase AC power source (for example, a three-phase commercial power source), and supplies power to the plurality of load apparatuses (1, 2) in a branching manner.

In the first embodiment, a case is taken as an example where the load apparatus (2) is an apparatus including a circuit that can be a source of a harmonic current, such as an inverter circuit (the apparatus is referred to as a harmonic generating load apparatus). Examples of the load apparatus (2) include an elevator, a fan, a pump, an escalator, a lighting apparatus driven by a three-phase power source, an air conditioning apparatus that is different from the load apparatus (I) as an air conditioning apparatus and that does not have measures against harmonics such as an active filter, and the like provided in the building or the like.

The load apparatuses (1, 2) respectively include the adjusting units (1c, 2c) connected to the power-source power factor demand controller (40). The adjusting units (1c, 2c) are each configured using a microcomputer and a memory device storing a program for operating the microcomputer. The adjusting units (1c, 2c) adjust, based on a load apparatus command signal Fs (corresponding to a control signal) output from the power-source power factor demand controller (40), operation parameters for changing the operation states of the respective load apparatuses (1, 2) to control the operation states of the load apparatuses (1, 2). Specifically, the operation parameters are the powers of the load apparatuses (1, 2), the currents of the load apparatuses (1, 2), the rotational speeds of electric motors included in the load apparatuses (1, 2), or the like.

In this example, the power-source power factor measuring device (9) and the power-source power factor demand controller (40) that are included in the power-source power factor control system (100) function as a central management unit (7) of the system (100). The central management unit (7) collectively manages and centrally controls the plurality of load apparatuses (1, 2). The central management unit (7) is located in a central management room inside a structure, such as the building.

<Load Apparatus (1)>

The load apparatus (1), which is an air conditioning apparatus, includes a refrigerant circuit (not illustrated) and a power converting apparatus (1a) as well as the above-described adjusting unit (1c).

The refrigerant circuit is configured by connecting a compressor, an outdoor heat exchanger, an expansion mechanism, and an indoor heat exchanger by a refrigerant pipe. The refrigerant circuit is charged with refrigerant. Circulation of the refrigerant throughout the refrigerant circuit causes the inside of a room to be cooled or heated.

Although the details are not illustrated, the power converting apparatus (1a) is connected to the AC power source (3) and includes a converter circuit and an inverter circuit. When supplied with AC power from the AC power source (3), the power converting apparatus (1a) converts the AC power to power having a desired frequency and a desired voltage and supplies the converted power to the compressor (more specifically, the electric motor included in the compressor). Accordingly, the compressor operates and the refrigerant circuit functions. As a result, indoor air conditioning is performed.

When the power converting apparatus (1a) or the electric motor of the compressor operates in the load apparatus (1), which is an air conditioning apparatus, a harmonic current may be generated. The harmonic current may flow out to the AC power source (3) through a current path for supplying power to the load apparatus (1). As described above, a harmonic current may flow out to the AC power source (3) not only from the load apparatus (I) but also from the load apparatus (2), which is a harmonic generating load apparatus, through a current path for supplying power to the load apparatus (2).

Thus, in the first embodiment, an active filter (1b) is incorporated in the load apparatus (I), which is an air conditioning apparatus. The active filter (1b) is connected in parallel to the load apparatus (2) and the power converting apparatus (1a) with respect to the AC power source (3), and reduces a harmonic current generated in the load apparatus (2) and the power converting apparatus (1a).

Furthermore, the active filter (1b) has a function of improving a fundamental power factor under circumstances where an improvement in the fundamental power factor at power distribution/reception ends is required from the viewpoints of installed capacity and energy saving. When the load apparatuses (1, 2) or the electric motor of the compressor included in the load apparatus (1) operates at the maximum power, a harmonic current may flow out through current paths (power reception paths (12) in FIG. 1) of the AC power source (3) for supplying power to the load apparatuses (1, 2), and the power-source power factor of the AC power source (3) may decrease. In general, electricity charge systems have a mechanism of giving a higher discount rate with a higher power-source power factor, and/or a mechanism of imposing a penalty of increasing electricity charges as the power-source power factor decreases below a predetermined value (for example, 90% or 85%). Also from the viewpoint of electricity charges, the degree of importance of avoiding a decrease in power-source power factor as much as possible and optimizing the power-source power factor is high.

Thus, in the first embodiment, the active filter (1b) for improving the power factor is incorporated in the load apparatus (1), which is an air conditioning apparatus, so as to improve the power-source power factor with a higher power factor of the air conditioning apparatus.

In the first embodiment, control for improving and optimizing the power-source power factors of the load apparatuses (1, 2) is also performed, which will be described below.

<Phase Modifying Facility (8)>

The phase modifying facility (8) is attached to improve the power factor of the entire structure and includes a phase modifier (31) that changes the phase of a harmonic current of the load apparatuses (1, 2) to improve a fundamental power factor.

The phase modifier (31) is connected in parallel to the load apparatuses (1, 2) with respect to the AC power source (3) and controls reactive power of the AC power supplied to the individual load apparatuses (1, 2). The phase modifier (31) includes a plurality of phase advancing capacitors (Ca, Cb, Cc) and a plurality of reactors (La, Lb, Lc). The phase advancing capacitors (Ca, Cb, Cc) are connected in series on respective branch lines (12c) extending to the phase modifying facility (8) of the power reception paths (12). The three phase advancing capacitors (Ca, Cb, Cc) are provided corresponding to the respective phases of the three-phase AC power source (3). The three reactors (La, Lb, Lc) are provided corresponding to the respective phase advancing capacitors (Ca, Cb, Cc). The reactors (La, Lb, Lc) are connected in series to the respective phase advancing capacitors (Ca, Cb, Cc).

In the first embodiment, the phase modifier (31) includes not only the phase advancing capacitors (Ca, Cb, Cc) but also the reactors (La, Lb, Lc) because the reactors (La, Lb, Lc) are capable of reducing the magnitude of a current flowing through the phase modifier (31) if the phase advancing capacitors (Ca, Cb, Cc) are broken by a short circuit.

<Power-Source Power Factor Measuring Device (9)>

The power-source power factor measuring device (9) measures the power-source power factor of the AC power source (3) and is constituted by a power meter or a smart meter. A structure, such as a building or a factory, is provided in advance with a power meter that measures not only a power but also a power-source power factor $\theta\alpha\beta$ at each time. In the first embodiment, this power meter is used as the power-source power factor measuring device (9). The power-source power factor $\theta\alpha\beta$ measured by the power meter is input to the power-source power factor demand controller (40).

The use of the power meter or smart meter already provided in the structure as the power-source power factor measuring device (9) eliminates the necessity of providing a sensor or detecting circuit for measuring the power-source power factor separately from the power meter or smart meter.

In particular, it is desirable that the power-source power factor measuring device (9) be a smart meter. The smart meter has a communication function, and thus the power-source power factor measuring device (9) is capable of wirelessly transmitting the power-source power factor $\theta\alpha\beta$, which is a measurement result, to the power-source power factor demand controller (40) by using the communication function. This eliminates the necessity of the wiring line for connecting the power-source power factor measuring device (9) and the power-source power factor demand controller (40) and the necessity of installing the wiring line. Thus, the cost of wiring lines and installing the wiring lines can be reduced.

<Power-Source Power Factor Demand Controller (40)>

The power-source power factor demand controller (40) is configured using a microcomputer and a memory device storing a program for operating the microcomputer. As illustrated in FIG. 1, the power-source power factor demand controller (40) is connected to the power-source power factor measuring device (9) and the individual load apparatuses (1, 2) (specifically, the adjusting units (1c. 2c) of the respective load apparatuses (1, 2)), and controls, based on a detected value of the power-source power factor measuring device (9) as a power-source quality and a target value of the power-source power factor of the AC power source (3), the operations of the respective load apparatuses (1, 2).

Figure 2:
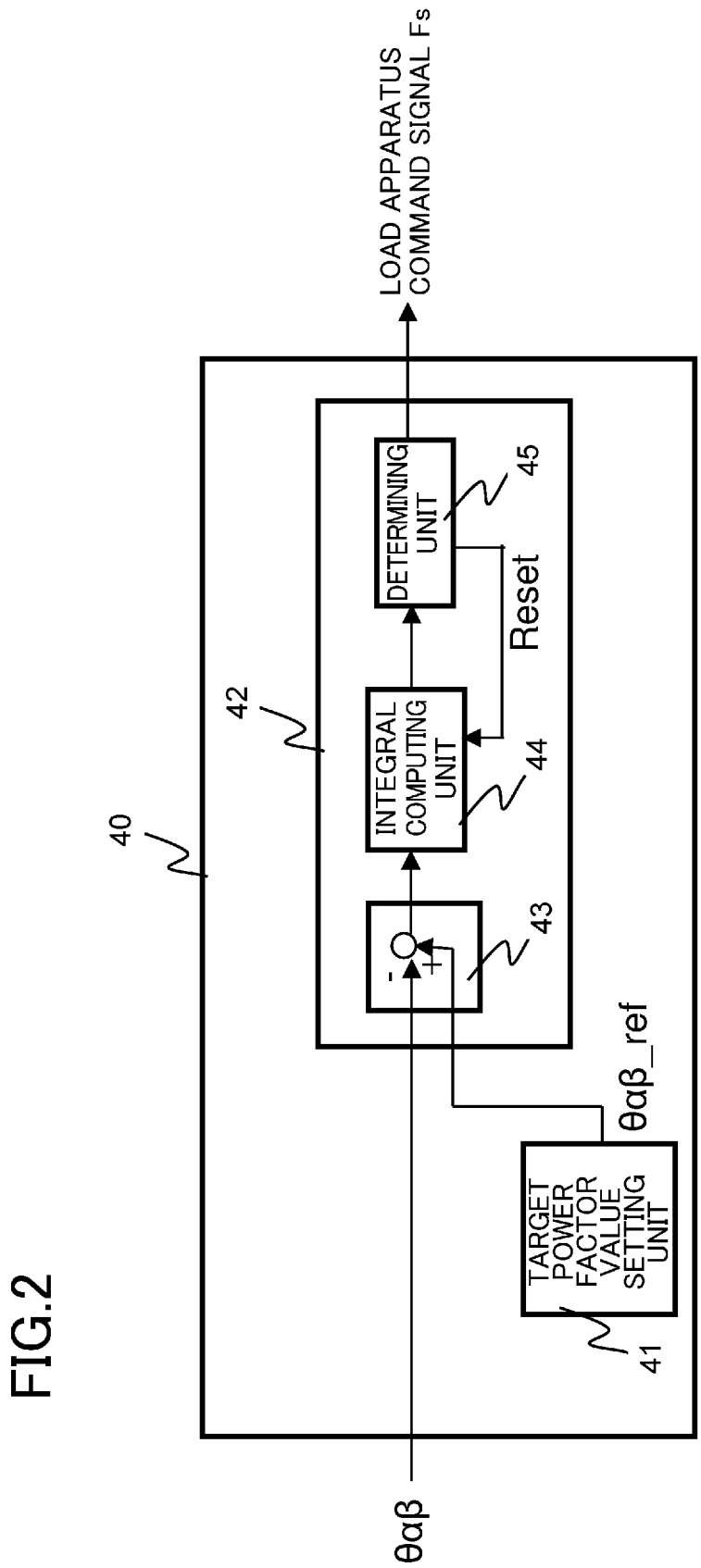
FIG. 2 is a block diagram illustrating an example of a power-source power factor demand controller according to the first embodiment.

The power-source power factor demand controller (40) according to the first embodiment performs adjustment control on the operation states of the respective load apparatuses (1, 2) in accordance with the actual power-source power factor θαβ. To perform such control, the power-source power factor demand controller (40) includes a target power factor value setting unit (41) and a load adjustment determining unit (42), as illustrated in FIG. 2. The load adjustment determining unit (42) includes a subtracting unit (43), an integral computing unit (44), and a determining unit (45).

As will be described below, the power-source power factor demand controller (40) transmits a load apparatus command signal Fs (corresponding to the control signal), generated based on a measurement result of the power-source power factor measuring device (9), to the adjusting units (1c, 2c) of the respective load apparatuses (1, 2). In the first embodiment, the power-source power factor demand controller (40) and the individual load apparatuses (1, 2) are not connected through wiring lines, and the load apparatus command signal Fs is wirelessly transmitted.

<Adjustment Control on Operation States of Respective Load Apparatuses (1, 2)>

A detailed description will be given of the adjustment control on the operation states of the respective load apparatuses (1, 2), performed by the above-described power-source power factor demand controller (40), with reference to FIG. 2 and FIG. 3.

The target power factor value setting unit (41) sets in advance a target value θαβ_ref of the power-source power factor. The target power factor value setting unit (41) according to the first embodiment sets the target value θαβ_ref of the power-source power factor to a value of 0.995 to 1.004. In the case of evaluating the power-source power factor, the value thereof is to be rounded off at the third decimal place. Thus, when the target value θαβ_ref of the power-source power factor is set to a value of 0.995 to 1.004, the actual power-source power factor controlled based on the target value θαβ_ref of the power-source power factor is evaluated as "1".

The subtracting unit (43) of the load adjustment determining unit (42) receives the actual power-source power factor θαβ measured by the power-source power factor measuring device (9), which is a power-source quality, and the target value θαβ_ref of the power-source power factor set by the target power factor value setting unit (41). The subtracting unit (43) subtracts the actual power-source power factor θαβ from the target value θαβ_ref of the power-source power factor. The subtracting unit (43) outputs a value obtained through the subtraction to the integral computing unit (44).

The integral computing unit (44) integrates the subtraction result of the subtracting unit (43) (i.e., the result obtained by subtracting the actual power-source power factor θαβ from the target value θαβ_ref of the power-source power factor).

The determining unit (45) receives the integration result of the integral computing unit (44). Based on the integration result, the determining unit (45) generates a load apparatus command signal Fs for changing the operation states of the load apparatuses (1, 2) such that the fundamental power factor approaches the target value θαβ_ref of the power-source power factor. Specifically, the determining unit (45) outputs, to the adjusting units (1c, 2c) of the load apparatuses (1, 2), the load apparatus command signal Fs for adjusting the operation parameters and decreasing the operation capabilities of the load apparatuses (1, 2) to cause the fundamental power factor (power-source power factor) to approach the target value θαβ_ref of the power-source power factor. When the operation capabilities of the load apparatuses (1, 2) are decreased by the load apparatus command signal Fs, the output powers of the load apparatuses (1, 2) are decreased and a power margin is generated. Thus, the fundamental power factor (power-source power factor) increases to substantially match the target power factor value.

Figure 3:
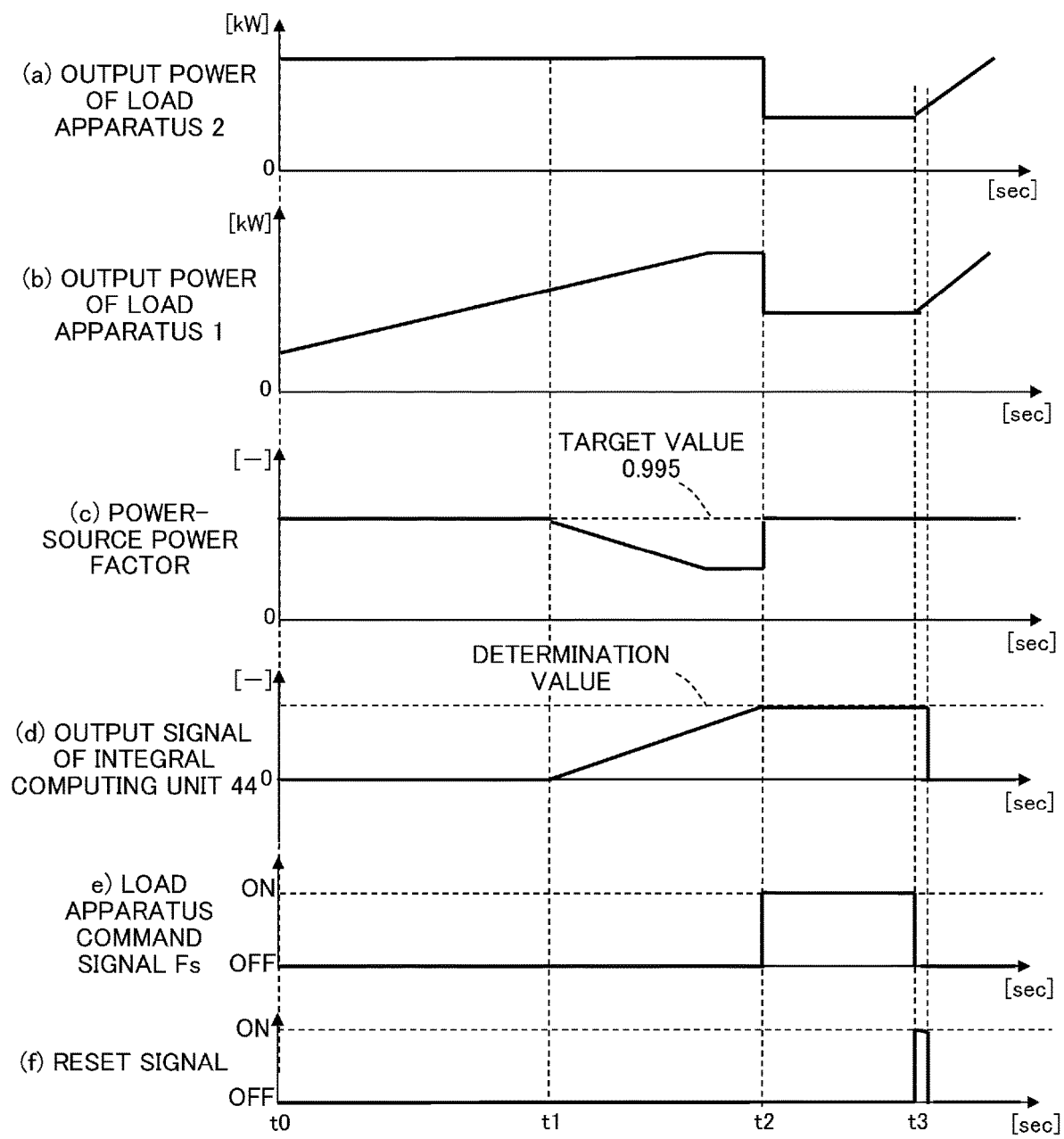
FIG. 3 is a diagram illustrating temporal changes in output powers of respective load apparatuses, a power-source power factor, an output signal of an integral computing unit, a load apparatus command signal, and a reset signal according to the first embodiment.

FIG. 3 illustrates an example of temporal changes in the operations of the load apparatuses (1, 2), the power-source power factor, and the operation of the load adjustment determining unit (42). FIG. 3(a) illustrates the output power correlated to the operation of the load apparatus (2). In this example, it is assumed that the load apparatus (2) is a constant load, such as a pump. FIG. 3(b) illustrates the output power of the load apparatus (1). In this example, it is assumed that the load apparatus (1) is an air conditioning apparatus.

From time t0 to time t2, the load apparatus (2) stably operates with a constant output power. In contrast, from time t0 to time t2, the load apparatus (1) continuously increases the output power with an increase in air conditioning load. It is assumed that the period from time t0 to time t2 is daytime (14:00 to 15:00) of the hottest day of mid-summer, when an outside temperature is abnormally high, the air conditioning load suddenly increases, and the output power of the load apparatus (I), which is an air conditioning apparatus, increases.

With these output powers of the respective load apparatuses (1, 2), the power-source power factor illustrated in FIG. 3(c) substantially maintains the target value θαβ_ref of the power-source power factor from time t0 to time t1. However, from time t1 to time t2, a further increase in the output power of the load apparatus (1) causes a decrease in the power-source power factor illustrated in FIG. 3(c) from the target value θαβ_ref of the power-source power factor.

Thus, as illustrated in FIG. 3(d), from time t0 time t1, there is almost no difference between the target value θαβ_ref of the power-source power factor and the actual power-source power factor θαβ, and the output result (output signal) of the integral computing unit (44) is substantially kept at "0". However, at and after time t1, the difference between the target value θαβ_ref of the power-source power factor and the actual power-source power factor θαβ gradually increases with a further increase in the output power of the load apparatus (1). Thus, as illustrated in FIG. 3(d), the output result (output signal) of the integral computing unit (44) increases at and after time t1.

Time t2 is the point of time at which the output result (output signal) of the integral computing unit (44) reaches a determination value (corresponding to a predetermined value). At time t2, in response to receipt of the output result (output signal) from the integral computing unit (44), the determining unit (45) outputs a load apparatus command signal Fs (i.e., a load apparatus command signal Fs representing "ON") for making the operation states of the load apparatuses (1, 2) different from the operation states at and before time t2 to the adjusting units (1c, 2c) of the load apparatuses (1, 2), as illustrated in FIG. 3(e). Based on the load apparatus command signal Fs, the adjusting units (1c, 2c) of the load apparatuses (1, 2) adjust the operation parameters, which are at least one of the powers of the load apparatuses (1, 2), the currents of the load apparatuses (1, 2), the rotational speeds of the electric motors included in the load apparatuses (1, 2), and the like, to change the operation states in the direction of decreasing the output voltages of the respective load apparatuses (1, 2) from time t2 to time t3, as illustrated in FIGS. 3(*a*) and (*b*). The adjustment of the operation parameters is performed such that the actual power-source power factor θαβ approaches the target value θαβ_ref of the power-source power factor. Accordingly, at and after time t2, the output powers of both the load apparatuses (1, 2) decrease, and thus the actual power-source power factor θαβ recovers so as to match the target value θαβ_ref of the power-source power factor and is maintained in the state of substantially matching the target value θαβ_ref, as illustrated in FIG. 3(*c*).

In this way, when the actual power-source power factor θαβ, which is a measurement result of the power-source power factor measuring device (9), decreases below the target value θαβ_ref of the power-source power factor, the power-source power factor demand controller (40) and the adjusting units (1*c*, 2*c*) according to the first embodiment change the operation states of the load apparatuses (1, 2) such that the operation parameters of the load apparatuses (1, 2) decrease. Accordingly, the power-source power factor control system (100) performs "power-source power factor demand control" of forcibly decreasing the operation capabilities of the load apparatuses (1, 2) and making a state where the actual power-source power factor θαβ matches the target value θαβ_ref of the power-source power factor when the actual power-source power factor θαβ is below the target value θαβ_ref of the power-source power factor. The "power-source power factor demand control" is control of adjusting, based on an actual measurement result of the power-source power factor measuring device (9), the operation parameters such that the fundamental power factor approaches the target value θαβ_ref of the power factor.

In FIG. 3, when a state where the actual power-source power factor θαβ matches the target value θαβ_ref of the power-source power factor continues for a certain period from time 12 (in FIG. 3, the period from time t2 to time t3), the determining unit (45) causes the load apparatus command signal Fs output therefrom to be in an "OFF" state as in the period from time t0 to time t2, as illustrated in FIG. 3(*e*). Accordingly, the load apparatuses (1, 2) are released from a forcible decrease in operation capability and perform a normal operation under control that is based on a normal command.

After causing the load apparatus command signal Fs to be in an OFF state, the determining unit (45) outputs a reset signal for resetting the integration result (clearing, the integration result to zero) of the integral computing unit (44) to the integral computing unit (44), as illustrated at time t3 in FIG. 3(*f*). Accordingly, the integration result (output signal) of the integral computing unit (44) becomes zero, and the integral computing unit (44) becomes ready for a case where the actual power-source power factor θαβ decreases below the target value θαβ_ref of the power-source power factor next time.

<Advantages>

The power-source power factor control system (100) according to the first embodiment controls, based on the target value θαβ_ref of the power-source power factor, which is a power-source quality, and a present power-source power factor (i.e., a present power-source quality), the operation states of the load apparatuses (1, 2). In particular, in the first embodiment, the operation parameters of the load apparatuses (1, 2) are adjusted based on the load apparatus command signal Fs such that the actual power-source power factor θαβ approaches the target value θαβ_ret and thus the operation capabilities of the load apparatuses (1, 2) are changed from the state before the operation parameters are changed. The change in the operation capabilities of the load apparatuses (1, 2) causes the actual power-source power factor θαβ to approach the target value θαβ_ref of the power-source power factor, and thus the actual power-source power factor θαβ is optimized. This leads to, for example, suppression of a decrease in power-source power factor and an improvement in power-source power factor, and makes it possible to reduce a basic charge included in electricity charges or avoid the imposition of a penalty on electricity charges.

The above-described load apparatus command signal Fs is a signal for changing the operation states of the load apparatuses (1, 2) when the measurement result of the power-source power factor measuring device (9) is below the target value θαβ_ref of the power-source power factor. The load apparatus command signal Fs enables the actual power-source power factor θαβ that is below the target value θαβ_ref of the power-source power factor to increase to approach the target value θαβ_ref of the power-source power factor.

In particular, the above-described load apparatus command signal Fs is generated in a case where an integration result reaches the determination value, the integration result being obtained by integrating the difference between the measurement result of the power-source power factor measuring device (9) and the target value θαβ_ref of the power-source power factor while the measurement result of the power-source power factor measuring device (9) is below the target value θαβ_ref of the power-source power factor. That is, the above-described load apparatus command signal Fs is generated and the operation states of the load apparatuses (1, 2) are changed not in a case where the power-source power factor θαβ instantaneously becomes lower than the target value θαβ_ref of the power-source power factor but in a case where deviation of the power-source power factor θαβ from the target value θαβ_ref of the power-source power factor has certainly occurred. Thus, the control of changing the operation states of the load apparatuses (1, 2) is performed only in a case where it is certainly required to increase the power-source power factor θαβ.

A power meter is connected to a structure, such as a building. The power meter measures a power-source power factor in addition to a power in many cases. In the first embodiment, the power meter is used as the power-source power factor measuring device (9), and thus it is not necessary to specially attach a sensor or detecting circuit for measuring a power-source power factor. This eliminates the necessity of newly attaching a sensor or detecting circuit, and the cost can be reduced accordingly.

The above-described power-source power factor measuring device (9) wirelessly transmits a measurement result to the power-source power factor demand controller (40). This eliminates the necessity of the wiring line for connecting the power-source power factor measuring device (9) and the power-source power factor demand controller (40) and the necessity of installing, the wiring line.

The above-described power-source power factor demand controller (40) wirelessly transmits the load apparatus command signal Fs generated thereby to the adjusting units (1*c*, 2*c*). This eliminates the necessity of the wiring lines for connecting the power-source power factor demand controller (40) and the adjusting units (1*c*, 2*c*) and the necessity of installing the wiring lines.

In the first embodiment, the load apparatus (1) is an air conditioning apparatus. In the case of designing a structure, such as a building, installation of a refrigerant pipe that connects an outdoor unit and an indoor unit of an air conditioning apparatus is necessary, and thus the specifications of the air conditioning apparatus to be installed in the structure are determined naturally. Thus, a communication line between the power-source power factor demand controller (40) or the like and the air conditioning apparatus can be connected during construction of the structure, and an environment in which the operation capability of the air conditioning apparatus can be changed by the power-source power factor can be easily established.

In the first embodiment, the active filter (1b) is incorporated in the air conditioning apparatus. The power-source power factor control system (100) further includes the phase modifier (31). These components make it possible to keep the power factor of the air conditioning apparatus high, and thus the actual power-source power factor $\theta\alpha\beta$ can converge to the target value $\theta\alpha\beta\_ref$ of the power-source power factor as quickly as possible.

<Modification Example of First Embodiment>

Figure 4:
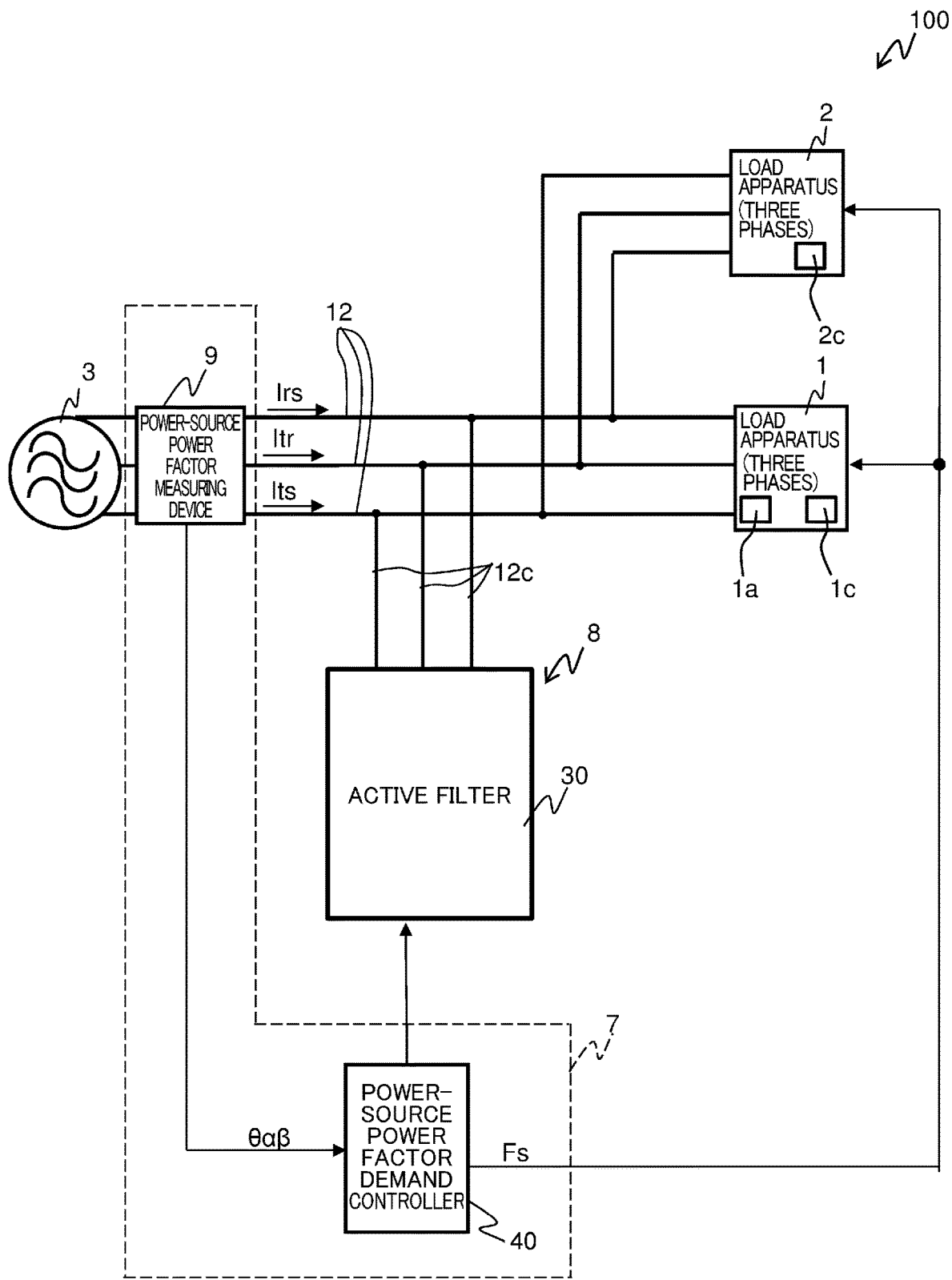
FIG. 4 is a diagram schematically illustrating the configuration of a power-source power factor control system according to a modification example of the first embodiment.

As illustrated in FIG. 4, the power-source power factor control system (100) may include an active filter (30) instead of the phase modifier (31). The active filter (30) is connected in parallel to the load apparatuses (1, 2) with respect to the AC power source (3), and reduces a harmonic current generated in the load apparatuses (1, 2). The active filter (30) is controlled by the power-source power factor demand controller (40). Accordingly, the power factors of the load apparatuses (1, 2) can be kept high, and thus the power-source power factor can converge to the target value as quickly as possible. In this case, an active filter need not be incorporated in the load apparatus (1).

The load apparatus (1) may be an apparatus other than an air conditioning apparatus. For example, the load apparatus (1) may be an elevator, a fan, a pump, an escalator, a lighting apparatus driven by a three-phase power source, or the like provided in the building or the like.

The power-source power factor measuring device (9) need not be a power meter (a smart meter or the like) in the structure.

The power-source power factor measuring device (9) need not be of a wireless type.

The power-source power factor demand controller (40) need not be of a wireless type.

In the above-described first embodiment, the active filter (1b) need not be incorporated in the load apparatus (1).

A plurality of phase modifiers (31) or active filters (30) may be provided for the single load apparatus (1).

In the power-source power factor control system (100), the phase modifier (31) and the active filter (30) are not essential.

The phase modifier (31) may include only the phase advancing capacitors (Ca, Cb, Cc).

The load apparatus command signal Fs may be generated as a signal for changing the operation states of the load apparatuses (1, 2) not when the measurement result of the power-source power factor measuring device (9) is below the target value $\theta\alpha\beta\_ref$ of the power-source power factor but when the power-source power factor $\theta\alpha\beta$ does not match a desired target value $\theta\alpha\beta$ ref (for example, when the power-source power factor $\theta\alpha\beta$ is above the target value $\theta\alpha\beta\_ref$ of the power-source power factor).

The power-source power factor demand controller (40) may generate the load apparatus command signal Fs by using a method other than a method that is based on the integral value of the difference between the actual power-source power factor $\theta\alpha\beta$ and the target value $\theta\alpha\beta\_ref$ of the power-source power factor.

In a case where the load apparatuses (1, 2) are air conditioning apparatuses, the air conditioning apparatuses are not limited to apparatuses that perform only cooling and heating. The air conditioning apparatuses include apparatuses capable of performing freezing, ventilation, and humidity control.

Second Embodiment

<Configuration of Power-Source Power Factor Control System (200)>

Figure 5:
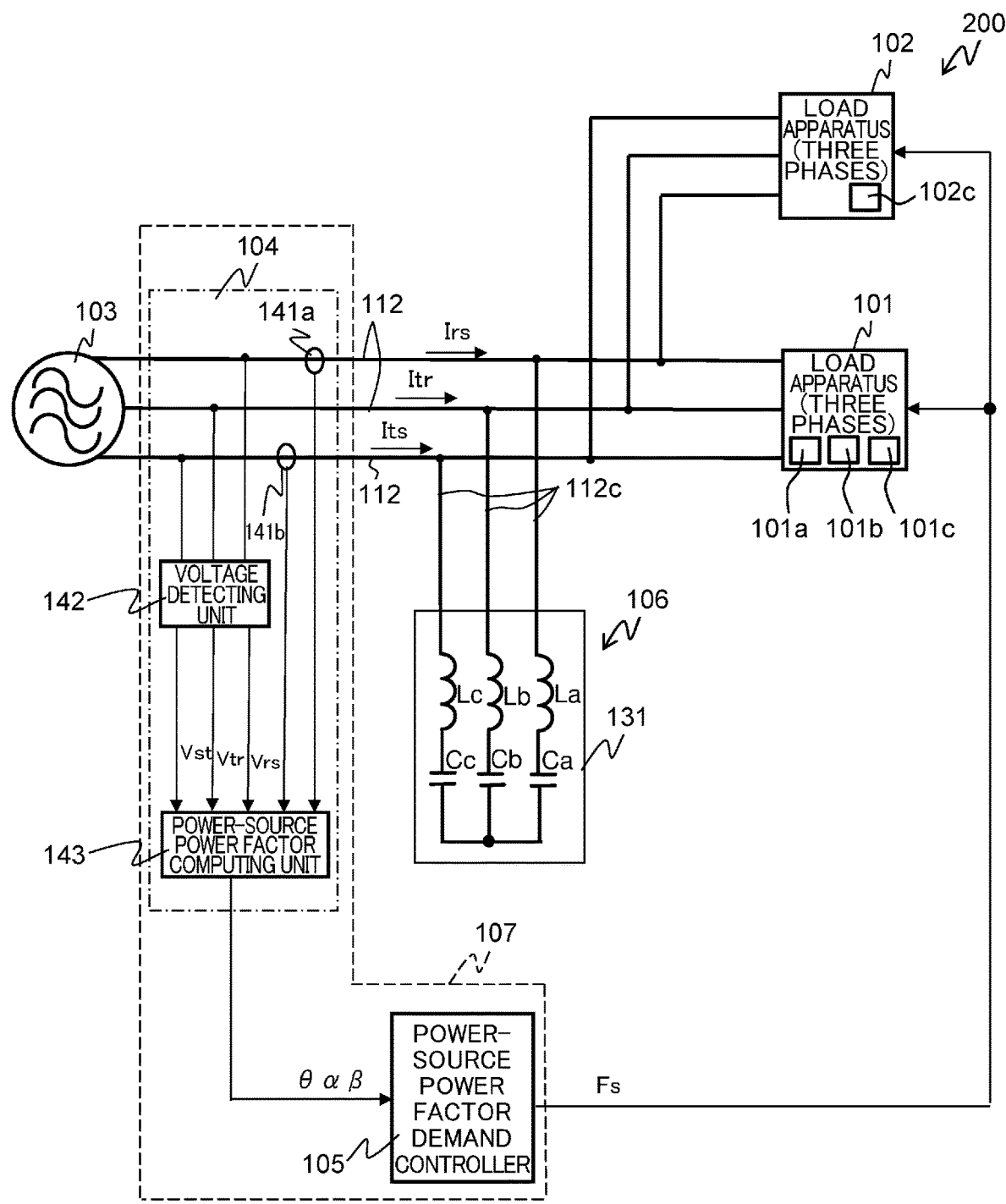
FIG. 5 is a diagram schematically illustrating the configuration of a power-source power factor control system according to a second embodiment.

FIG. 5 is a block diagram illustrating the configuration of a power-source power factor control system (200) according to a second embodiment. In this example, the power-source power factor control system (200) includes a plurality of load apparatuses (101, 102), a phase modifying facility (106), a power-source power factor measuring device (104) (corresponding to the power-source power factor measuring unit), and a power-source power factor demand controller (105).

Here, a case is taken as an example where the load apparatus (101) of the plurality of load apparatuses (101, 102) is an air conditioning apparatus.

The power-source power factor control system (200) is installed in an apartment, a factory, a building, a detached house, or the like (hereinafter a building or the like). The load apparatus (101), which is an air conditioning apparatus, performs indoor air conditioning.

The building or the like is supplied with power from a power system including an AC power source (103). In this example, the AC power source (103) is a three-phase AC power source (for example, a three-phase commercial power source), and supplies power to the plurality of load apparatuses (101, 102) in a branching manner.

In the second embodiment, a case is taken as an example where the load apparatus (102) is an apparatus including a circuit that can be a source of a harmonic current, such as an inverter circuit (the apparatus is referred to as a harmonic generating load apparatus). Examples of the load apparatus (102) include an elevator, a fan, a pump, an escalator, a lighting apparatus driven by a three-phase power source, an air conditioning apparatus that is different from the load apparatus (101) as an air conditioning apparatus and that does not have measures against harmonics such as an active filter, and the like provided in the building or the like.

The load apparatuses (101, 102) respectively include adjusting units (101c, 102c) (corresponding to the operation state control unit) connected to the power-source power factor demand controller (105). The adjusting units (101c, 102c) are each configured using a microcomputer and a memory device storing a program for operating the microcomputer. The adjusting units (101c, 102c) adjust, based on a load apparatus command signal Fs output from the power-source power factor demand controller (105), operation parameters for changing the operation states of the respective load apparatuses (101, 102) to control the operation states of the load apparatuses (101, 102). Specifically, the operation parameters are the powers of the load apparatuses (101, 102), the currents of the load apparatuses (101, 102), the rotational speeds of electric motors included in the load apparatuses (101, 102), or the like.

In this example, the power-source power factor measuring device (104) and the power-source power factor demand controller (105) that are included in the power-source power factor control system (200) function as a central management unit (107) of the system (200). The central management unit (107) collectively manages and centrally controls the plurality of load apparatuses (101, 102). The central management unit (107) is located in a central management room inside a structure, such as the building.

<Load Apparatus (101)>

The load apparatus (101), which is an air conditioning apparatus, includes a refrigerant circuit (not illustrated) and a power converting apparatus (101a) as well as the above-described adjusting unit (101c).

The refrigerant circuit is configured by connecting a compressor, an outdoor heat exchanger, an expansion mechanism, and an indoor heat exchanger by a refrigerant pipe. The refrigerant circuit is charged with refrigerant. Circulation of the refrigerant throughout the refrigerant circuit causes the inside of a room to be cooled or heated.

Although the details are not illustrated, the power converting apparatus (101a) is connected to the AC power source (103) and includes a converter circuit and an inverter circuit. When supplied with AC power from the AC power source (103), the power converting apparatus (101a) converts the AC power to power having a desired frequency and a desired voltage and supplies the converted power to the compressor (more specifically, the electric motor included in the compressor). Accordingly, the compressor operates and the refrigerant circuit functions. As a result, indoor air conditioning is performed.

When the power converting apparatus (101a) or the electric motor of the compressor operates in the load apparatus (101), which is an air conditioning apparatus, a harmonic current may be generated. The harmonic current may flow out to the AC power source (103) through a current path for supplying power to the load apparatus (101). As described above, a harmonic current may flow out to the AC power source (103) not only from the load apparatus (101) but also from the load apparatus (102), which is a harmonic generating load apparatus, through a current path for supplying power to the load apparatus (102).

Thus, in the second embodiment, an active filter (101b) is incorporated in the load apparatus (101), which is an air conditioning apparatus. The active filter (101b) is connected in parallel to the load apparatus (102) and the power converting apparatus (101a) with respect to the AC power source (103), and reduces a harmonic current generated in the load apparatus (102) and the power converting apparatus (101a).

Furthermore, the active filter (101b) has a function of improving a fundamental power factor under circumstances where an improvement in the fundamental power factor at power distribution/reception ends is required from the viewpoints of installed capacity and energy saving. When the load apparatuses (101, 102) or the electric motor of the compressor included in the load apparatus (101) operates at the maximum power, a harmonic current may flow out through current paths (power reception paths (112) in FIG. 5) of the AC power source (103) for supplying power to the load apparatuses (101, 102), and the power-source power factor of the AC power source (103) may decrease. In general, electricity charge systems have a mechanism of giving a higher discount rate with a higher power-source power factor, and/or a mechanism of imposing a penalty of increasing electricity charges as the power-source power factor decreases below a predetermined value (for example, 90% or 85%). Also from the viewpoint of electricity charges, the degree of importance of avoiding, a decrease in power-source power factor as much as possible and optimizing the power-source power factor is high.

Thus, in the second embodiment, the active filter (101b) for improving the power factor is incorporated in the load apparatus (101), which is an air conditioning apparatus, so as to improve the power-source power factor with a higher power factor of the air conditioning apparatus.

In the second embodiment, control for improving and optimizing the power-source power factors of the load apparatuses (101, 102) is also performed, which will be described below.

<Phase Modifying Facility (106)>

The phase modifying facility (106) is attached to improve the power factor of the entire structure and includes a phase modifier (131) that changes the phase of a harmonic current of the load apparatuses (101, 102) to improve a fundamental power factor.

The phase modifier (131) is connected in parallel to the load apparatuses (101, 102) with respect to the AC power source (103) and controls reactive power of the AC power supplied to the individual load apparatuses (101, 102). The phase modifier (131) includes a plurality of phase advancing capacitors (Ca, Cb, Cc) and a plurality of reactors (La. Lb, Lc). The phase advancing capacitors (Ca, Cb, Cc) are connected in series on respective branch lines (112c) extending to the phase modifying facility (106) of the power reception paths (112). The three phase advancing capacitors (Ca, Cb, Cc) are provided corresponding to the respective phases of the three-phase AC power source (103). The three reactors (La, Lb, Lc) are provided corresponding to the respective phase advancing capacitors (Ca, Cb, Cc). The reactors (La, Lb, Lc) are connected in series to the respective phase advancing capacitors (Ca, Cb, Cc).

In the second embodiment, the phase modifier (131) includes not only the phase advancing capacitors (Ca, Cb, Cc) but also the reactors (La, Lb, Lc) because the reactors (La, Lb, Lc) are capable of reducing the magnitude of the current flowing through the phase modifier (131) if the phase advancing capacitors (Ca, Cb, Cc) are broken by a short circuit.

<Power-Source Power Factor Measuring Device (104)>

The power-source power factor measuring device (104) measures the power-source power factor of the AC power source (103) and is constituted by a power meter or a smart meter. A structure, such as a building or a factory, is provided in advance with a power meter that measures not only a power but also a power-source power factor $\theta\alpha\beta$ at each time. In the second embodiment, this power meter is used as the power-source power factor measuring device (104). The power-source power factor $\theta 0$ measured by the power meter is input to the power-source power factor demand controller (105).

The use of the power meter or smart meter already provided in the structure as the power-source power factor measuring device (104) eliminates the necessity of providing a sensor or detecting circuit for measuring the power-source power factor separately from the power meter or smart meter.

In particular, it is desirable that the power-source power factor measuring device (104) be a smart meter. The smart meter has a communication function, and thus the power-source power factor measuring device (104) is capable of wirelessly transmitting the power-source power factor $\theta\alpha\beta$, which is a measurement result, to the power-source power factor demand controller (105) by using the communication function. This eliminates the necessity of the wiring line for connecting the power-source power factor measuring device (104) and the power-source power factor demand controller (105) and the necessity of installing the wiring line. Thus, the cost of wiring lines and installing the wiring lines can be reduced.

Specifically, the power-source power factor measuring device (104) according to the second embodiment includes current detecting units (141a, 141b), a voltage detecting unit (142), and a power-source power factor computing unit (143).

The current detecting units (141a, 141b) detect current values in the power reception paths (112) of the AC power source (103). Specifically, the current detecting units (141a, 141b) detect the values of output currents of the AC power source (103) before the output currents branch off to the individual load apparatuses (101, 102), which are harmonic sources. In this example, the two current detecting units (141a, 141b) are provided. Specifically, the current detecting unit (141a) detects an R-phase current value (Irs) in the AC power source (103). The current detecting unit (141b) detects a T-phase current value (Its) in the AC power source (103).

The voltage detecting unit (142) is connected to output terminals of the respective phases of the AC power source (103) and detects line-to-line voltages (Vrs, Vst, Vtr) of the AC power source (103).

The power-source power factor computing unit (143) is configured using a microcomputer and a memory device storing a program for operating the microcomputer. The power-source power factor computing unit (143) applies the detection results (Irs, Its) of the current detecting units (141a, 141b) and the detection results (Vrs, Vst, Vtr) of the voltage detecting unit (142) input thereto to the following Equations (1) and (2), thereby computing voltages Vα and Vβ and currents iα and iβ of two rotation axes (αβ axes).

[Math. 1]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (1)$$

[Math. 2]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (2)$$

Subsequently, the power-source power factor computing unit (143) applies the voltages Vα and Vβ and the currents iα and iβ of the two rotation axes (αβ axes) obtained from the above Equations (1) and (2) to the following Equation (3), thereby computing an active power Pα. Also, the power-source power factor computing unit (143) applies the voltages Vα and vβ and the currents iα and iβ of the two rotation axes (αβ axes) obtained from above Equations (1) and (2) to the following Equation (4), thereby computing a reactive power Pβ.

[Math. 3]

$$P\alpha = V\alpha \times i\alpha + V\beta \times i\beta \quad (3)$$

[Math. 4]

$$P\beta = V\alpha \times i\beta - V\beta \times i\alpha \quad (4)$$

The power-source power factor computing unit (143) applies the active power Pα and the reactive power Pβ to the following Equation (5), thereby computing the power-source power factor θαβ of the AC power source (103). That is, the power-source power factor θαβ obtained by the power-source power factor computing unit (143) means the actual power-source power factor θαβ.

[Math. 5]

$$\theta\alpha\beta = \frac{P\alpha}{\sqrt{(P\alpha)^2 + (P\beta)^2}} \quad (5)$$

The actual power-source power factor θαβ obtained in this manner is input to the power-source power factor demand controller (105).

<Power-Source Power Factor Demand Controller (105)>

The power-source power factor demand controller (105) is configured using a microcomputer and a memory device storing a program for operating the microcomputer. In this example, the power-source power factor demand controller (105) is constituted by a microcomputer and a memory device different from those of the power-source power factor computing unit (143).

As illustrated in FIG. 5, the power-source power factor demand controller (105) is connected to the power-source power factor measuring device (104) and the individual load apparatuses (101, 102), and controls, based on a measurement result of the power-source power factor measuring device (104) as a power-source quality and a target value of the power-source power factor of the AC power source (103), the operations of the respective load apparatuses (101, 102).

Figure 6:
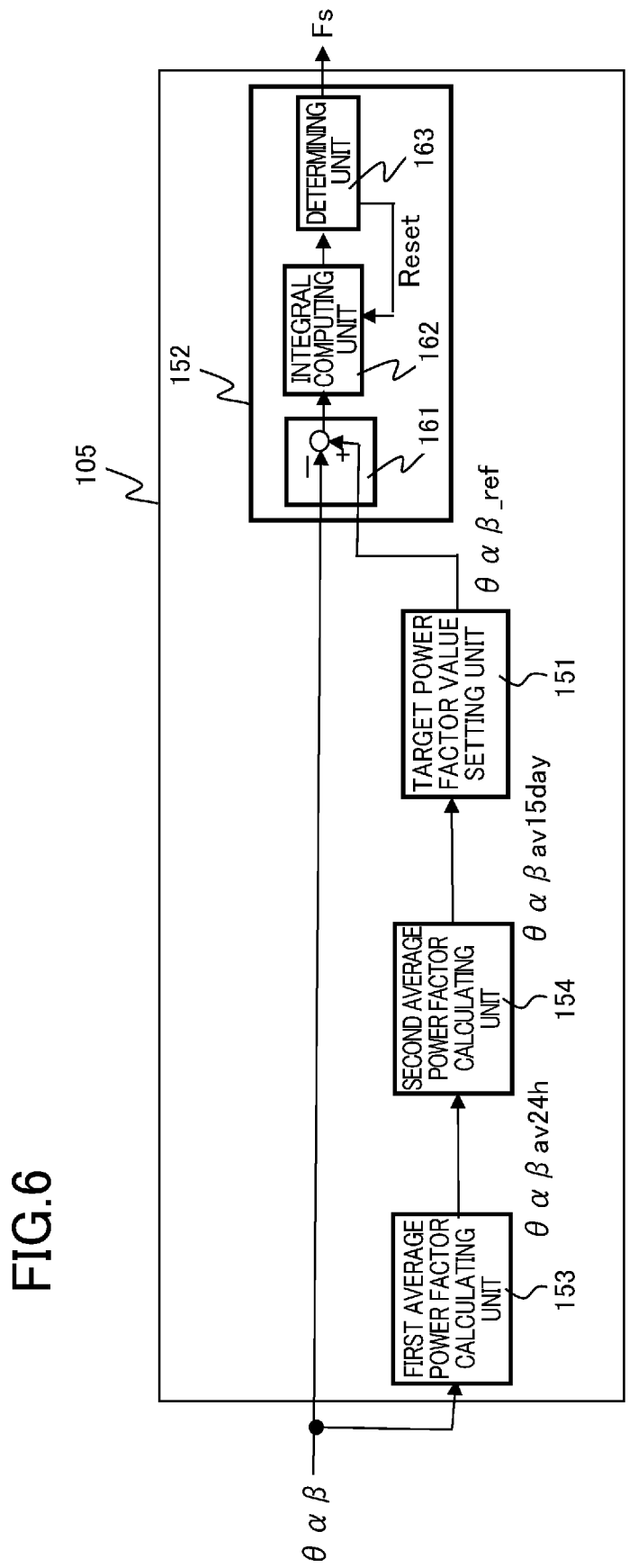
FIG. 6 is a block diagram illustrating an example of a power-source power factor demand controller according to the second embodiment.

The power-source power factor demand controller (105) according to the second embodiment performs adjustment control on the operation states of the respective load apparatuses (101, 102) in accordance with the actual power-source power factor θαβ, and adjustment control on the target value θαβ_ref of the power-source power factor. To perform such control, the power-source power factor demand controller (105) includes a load adjustment determining unit (152) (corresponding to the control signal generating unit), a first average power factor calculating unit (153), a second average power factor calculating unit (154), and a target power factor value setting unit (151) (corresponding to a target value adjusting unit), as illustrated in FIG. 6. The load adjustment determining unit (152) generates, based on a measurement result of the power-source power factor measuring device (104) and the target value θαβ_ref of the power-source power factor, a load apparatus command signal Fs, which is a control signal for changing the operation states of the load apparatuses (101, 102), and includes a subtracting unit (161), an integral computing unit (162), and a determining unit (163).

The adjustment control on the operation states of the respective load apparatuses (101, 102) is performed by the load adjustment determining unit (152), and the adjustment control on the target value θαβ ref of the power-source power factor is performed by the first average power factor calculating unit (153), the second average power factor calculating unit (154), and the target power factor value setting unit (151).

The power-source power factor demand controller (105) transmits the load apparatus command signal Fs generated thereby to the adjusting units (101c, 102c) of the respective load apparatuses (101, 102). In the second embodiment, the power-source power factor demand controller (105) and the individual load apparatuses (101, 102) are not connected through wiring lines, and the load apparatus command signal Fs is wirelessly transmitted.

<Adjustment Control on Operation States of Respective Load Apparatuses (101, 102)>

The subtracting unit (161) of the load adjustment determining unit (152) receives the actual power-source power factor θαβ (corresponding to a power-source quality) measured by the power-source power factor measuring device (104), and the target value θαβ_ref of the power-source power factor set by the target power factor value setting unit (151). The subtracting unit (161) subtracts the actual power-source power factor θαβ from the target value θαβ_ref of the power-source power factor. The subtracting unit (161) outputs a value obtained through the subtraction to the integral computing unit (162).

The value obtained through the subtraction is especially large in a case where, for example, a sudden increase in air conditioning load in daytime (14:00 to 15:00) of the hottest day of mid-summer and an increase in the output power of the load apparatus (101), which is an air conditioning apparatus, cause a decrease in the actual power-source power factor θαβ from the target value θαβ_ref.

The integral computing unit (162) integrates the subtraction result of the subtracting unit (161) (i.e., the result obtained by subtracting the actual power-source power factor θαβ from the target value θαβ_ref of the power-source power factor).

The determining unit (163) receives the integration result of the integral computing unit (162). Based on the integration result, the determining unit (163) controls the operation parameters for changing the operation states of the load apparatuses (101, 102) such that the fundamental power factor approaches the target value θαβ_ref of the power-source power factor. Specifically, the determining unit (163) outputs, to the load apparatuses (101, 102), a load apparatus command signal Fs for adjusting the operation parameters and decreasing the operation capabilities of the load apparatuses (101, 102) to cause the fundamental power factor (power-source power factor) to approach the target value θαβ_ref. When the operation capabilities of the load apparatuses (101, 102) are decreased by the load apparatus command signal Fs, the output powers of the load apparatuses (101, 102) are decreased and a margin is generated in output power. Thus, the fundamental power factor (power-source power factor) increases to substantially match the target value θαβ_ref.

Here, the operation parameters include, as described above, at least one of the powers of the load apparatuses (101, 102), the currents of the load apparatuses (101, 102), the rotational speeds of the electric motors included in the load apparatuses (101, 102), and the like. The load adjustment determining unit (152) performs "power-source power factor demand control" of forcibly decreasing the operation capabilities of the load apparatuses (101, 102) and making a state where the actual power-source power factor θαβ matches the target value θαβ_ref of the power factor by adjusting the operation parameters such that the actual power-source power factor θαβ approaches the target value θαβ_ref.

When a state where the fundamental power factor (power-source power factor) matches the target value θαβ_ref continues for a certain period, the determining unit (163) causes the load apparatus command signal Fs to be in an OFF state. Accordingly, the load apparatuses (101, 102) are released from a forcible decrease in operation capability and perform a normal operation under control that is based on a normal command. After causing the load apparatus command signal Fs to be in an OFF state, the determining unit (163) outputs a reset signal for resetting the integration result (clearing the integration result to zero) of the integral computing unit (162) to the integral computing unit (162). Accordingly, the integration result (output signal) of the integral computing unit (162) becomes zero, and the integral computing unit (162) becomes ready for a case where the actual power-source power factor θαβ decreases below the target value θαβ_ref of the power factor next time.

<Adjustment Control on Target Value θαβ_Ref of Power-Source Power Factor>

Figure 7:
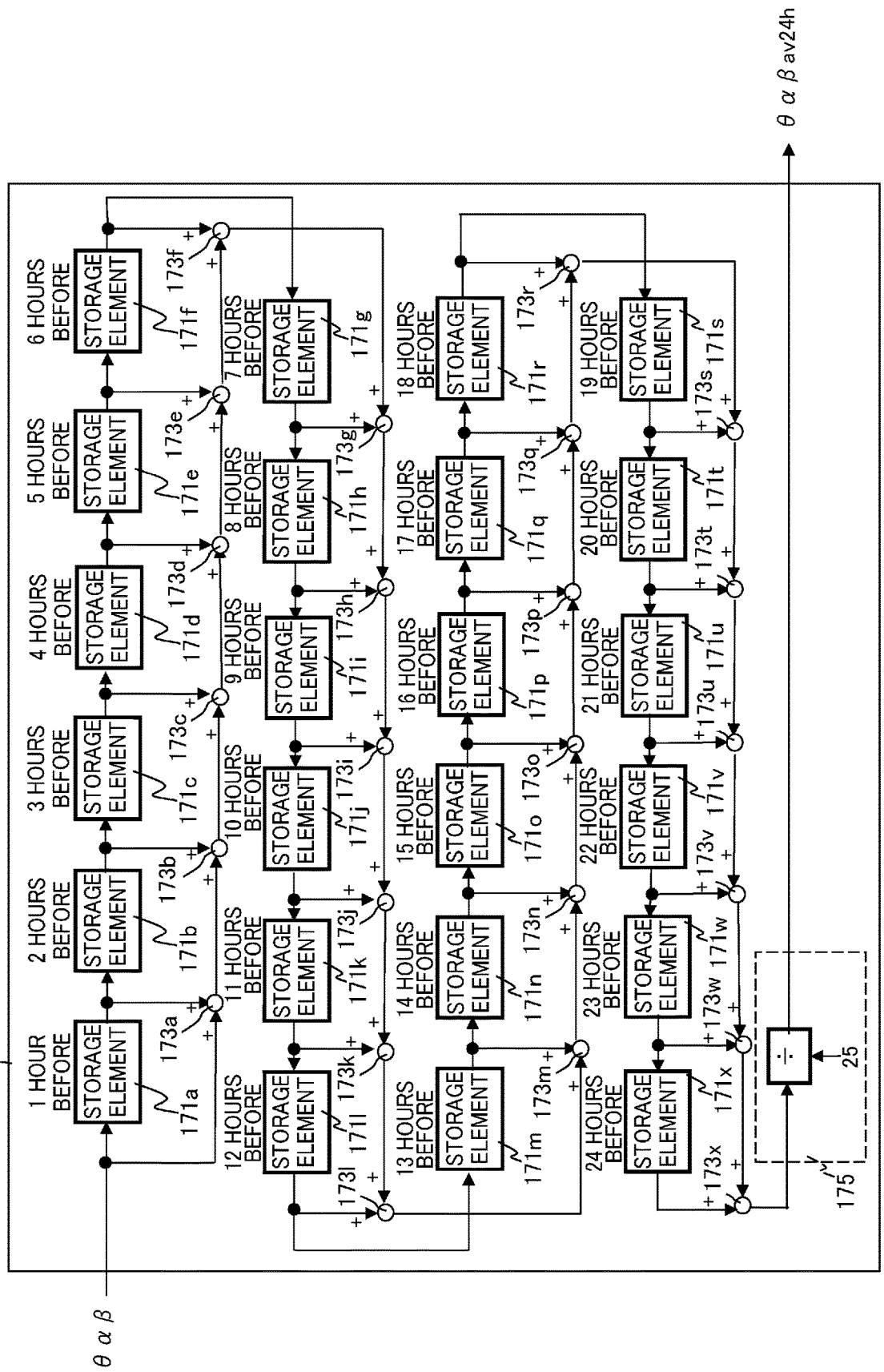
FIG. 7 is a block diagram illustrating an example of a first average power factor calculating unit according to the second embodiment.

The first average power factor calculating unit (153) of the power-source power factor demand controller (105) is constituted by twenty-four storage elements (171a to 171x), twenty-four adding units (173a to 173x), and one 1-day average power factor calculating unit (175), as illustrated in FIG. 7.

The twenty-four storage elements (171a to 171x) are provided corresponding to respective time periods that are obtained by dividing one day (twenty-four hours) into one-hour periods. The storage elements (171a to 171x) each store the power-source power factor θαβ of the corresponding one of the time periods (one-hour periods).

The adding units (173a to 173x) sequentially add the power-source power factors θαβ in the respective storage elements (171a to 171x). For example, the adding unit (173a) adds, to the present power-source power factor θαβ, the power-source power factor θαβ of the time period one hour before. The adding unit (173b) adds, to the addition result of the adding unit (173a), the power-source power factor θαβ of the time period two hours before stored in the storage element (171b). The adding unit (173x) adds, to the addition result of the adding unit (173w), the power-source power factor θαβ of the time period twenty-four hours before stored in the storage element (171x). The addition result of the adding unit (173x) is equal to the sum of the power-source power factors θαβ of one day (i.e., twenty-four hours).

The 1-day average power factor calculating unit (175) divides the sum of the power-source power factors θαβ of one day by 25 to calculate an average power-source power factor θαβav24 h, which is an average of twenty-four hours. As illustrated in FIG. 6, the average power-source power factor θαβav24 h is input to the second average power factor calculating unit (154).

Figure 8:
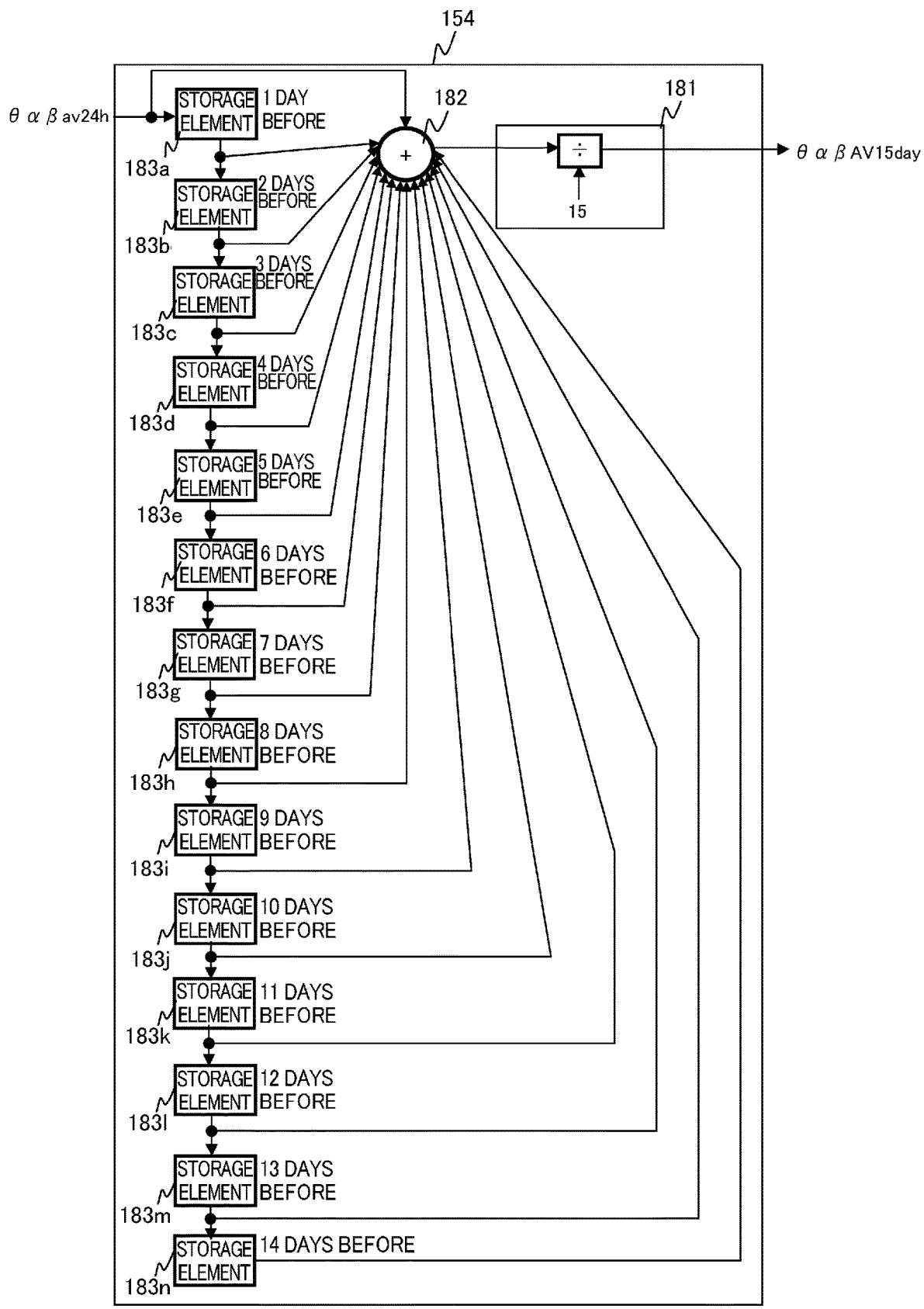
FIG. 8 is a block diagram illustrating an example of a second average power factor calculating unit according to the second embodiment.

The second average power factor calculating unit (154) is constituted by fourteen storage elements (183a to 183n), one adding unit (182), and one 15-day average power factor calculating unit (181), as illustrated in FIG. 8.

The storage elements (183a to 183n) are provided for fourteen days in total, each corresponding to one day. The storage elements (183a to 183n) each store the average power-source power factor θαβav24 h of one day. That is, in this example, the average power-source power factor θαβav24 h of one day can be stored for each of days from the day one day before to the day fourteen days before.

The adding unit (182) adds the average power-source power factors θαβav24 h of the day one day before to the day fourteen days before stored in all the storage elements (183a to 183n) and the average power-source power factor θαβ av24 h of the present day. Thus, the addition result of the adding unit (182) is the sum of the average power-source power factors θαβav24 h of fifteen days, from the present day to the day fourteen days before.

The 15-day average power factor calculating unit (181) divides the sum of the average power-source power factors θαβav24 h of the fifteen days by 15 to calculate an average power-source power factor θαβav15 day of the fifteen days. As illustrated in FIG. 6, the average power-source power factor θαβav15 day of the fifteen days is input to the target power factor value setting unit (151).

Figure 9:
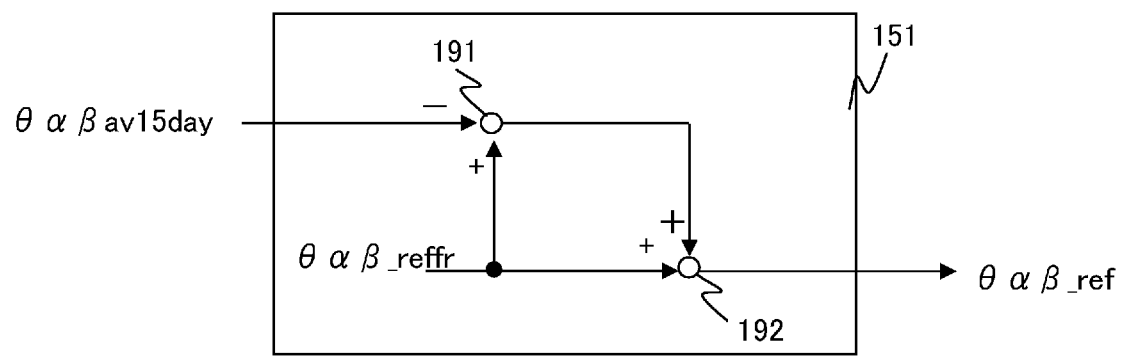
FIG. 9 is a block diagram illustrating an example of a target power factor value setting unit according to the second embodiment.

As illustrated in FIG. 9, the target power factor value setting unit (151) is constituted by one subtracting unit (191) and one adding unit (192), and adjusts and sets, based on a measurement result of the power-source power factor measuring device (104), the target value θαβ_ref of the power-source power factor through calculation.

The subtracting unit (191) subtracts, from a reference value θαβ_reffr of the target power factor value, the average power-source power factor θαβav15 day of the fifteen days, which is a value computed by using the measurement result of the power-source power factor measuring device (104).

Here, the reference value θαβ_reffr of the target power factor value is characterized in being set to a value of 0.995 to 1.004. In the case of evaluating the power-source power factor, the value thereof is to be rounded off at the third decimal place. Thus, when the reference value θαβ_reffr of the target power factor value is set to a value of 0.995 to 1.004, the target value θαβ_ref of the power-source power factor adjusted and set by the target power factor value setting unit (151) is naturally a value of 0.995 to 1.004. Accordingly, the actual power-source power factor controlled based on the target value θαβ_ref of the power-source power factor is evaluated as "1".

The adding unit (192) adds the subtraction result of the subtracting unit (191) and the reference value θαβ_reffr of the target power factor value. The addition result is the target value θαβ_ref of the power-source power factor and is input to the load adjustment determining unit (152), as illustrated in FIG. 6.

Accordingly, in a case where a unit period is thirty days (one month), when the average power-source power factor θαβav15 day of the former fifteen days (corresponding to a first period) is higher than the reference value θαβ_reffr of the target power factor value, the target value θαβ_ref of the power-source power factor for the following fifteen days (corresponding to a second period) is set to a value smaller than the reference value θαβ_reffr of the target power factor value, and thus the average power factor of the thirty days (one month) as a unit period can be a value of 0.995 to 1.004, which is set as the reference value θαβ_reffr of the target power factor value. That is, when the average power-source power factor θαβav15 day of the former fifteen days is higher than the reference value θαβ_reffr of the target power factor value, the target value θαβ_ref of the power-source power factor for the following fifteen days is set to a value smaller than that for the former fifteen days, and thus the output of the load apparatus command signal Fs for actively decreasing the operation capabilities, such as powers, currents, or speeds, to the individual load apparatuses (101, 102) can be avoided as much as possible. On the other hand, when the average power-source power factor θαβav15 day of the former fifteen days is lower than the reference value θαβ_reffr of the target power factor value, the target value θαβ_ref of the power-source power factor for the following fifteen days is set to a value larger than that for the former fifteen days, and thus the average value of the actual power-source power factors of the thirty days as a unit period can reliably approach the reference value θαβ_reffr of the target power factor value. Accordingly, it is possible to receive the application of a desired power factor discount for electricity charges and to avoid the imposition of a penalty on the basic charge of the electricity charges.

Figure 10:
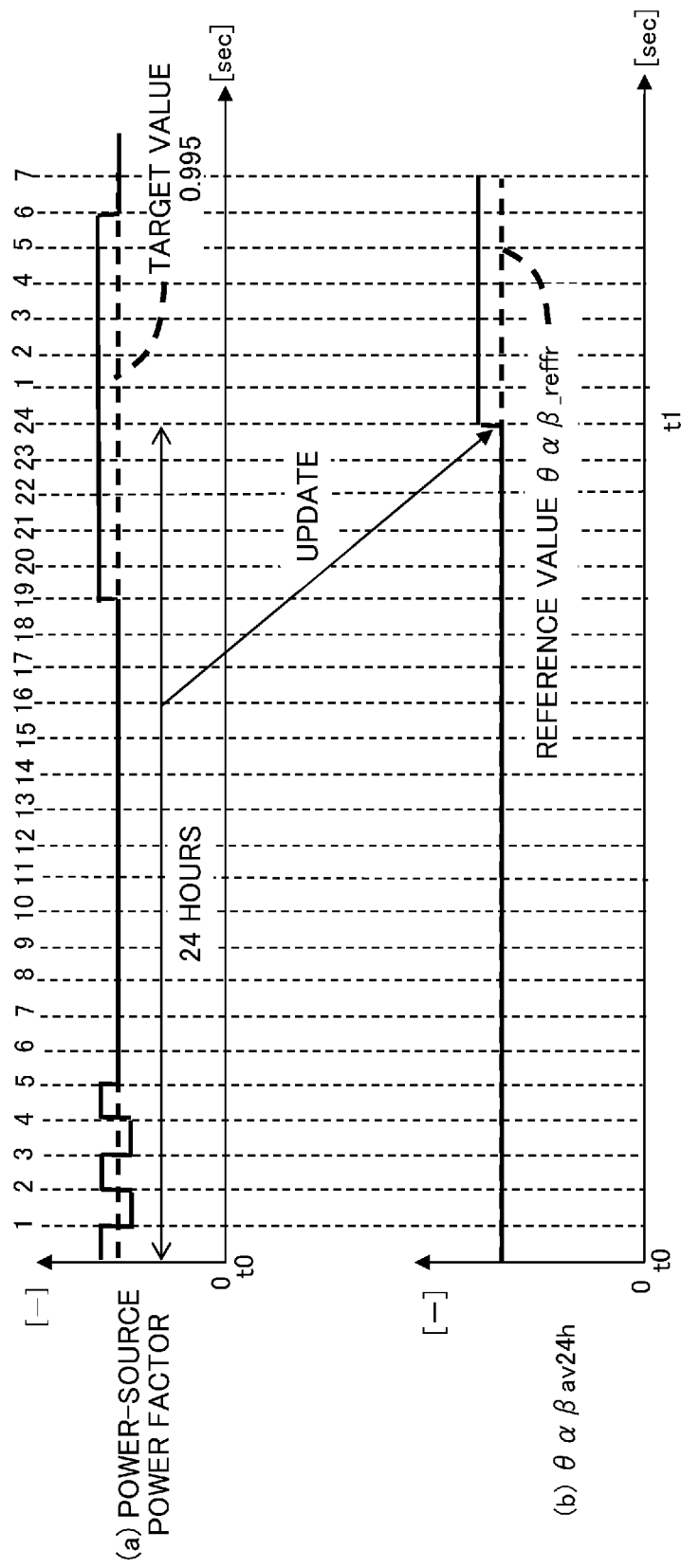
FIG. 10 is a diagram illustrating an example operation of the first average power factor calculating unit according to the second embodiment.

FIG. 10(a) illustrates temporal changes in power-source power factor, and FIG. 10(b) illustrates temporal changes in average power-source power factor θαβav24 h. which is an average of twenty-four hours calculated by the 1-day average power factor calculating unit (175). In FIG. 10, the interval between vertically extending broken lines represents one hour, and the bold solid line in FIG. 10(a) represents the manner of change in power-source power factor in each hour. The average power-source power factor θαβav24 h represented by the bold solid line in FIG. 10(b) is an average value of the power-source power factor of the latest twenty-four hours, and is thus updated every twenty-hour hours. That is, it is shown that, at time t1 illustrated in FIG. 10(b), the average power-source power factor θαβav24 h, which is an average of twenty-four hours from time t0 to time t1, is calculated and updated.

Figure 11:
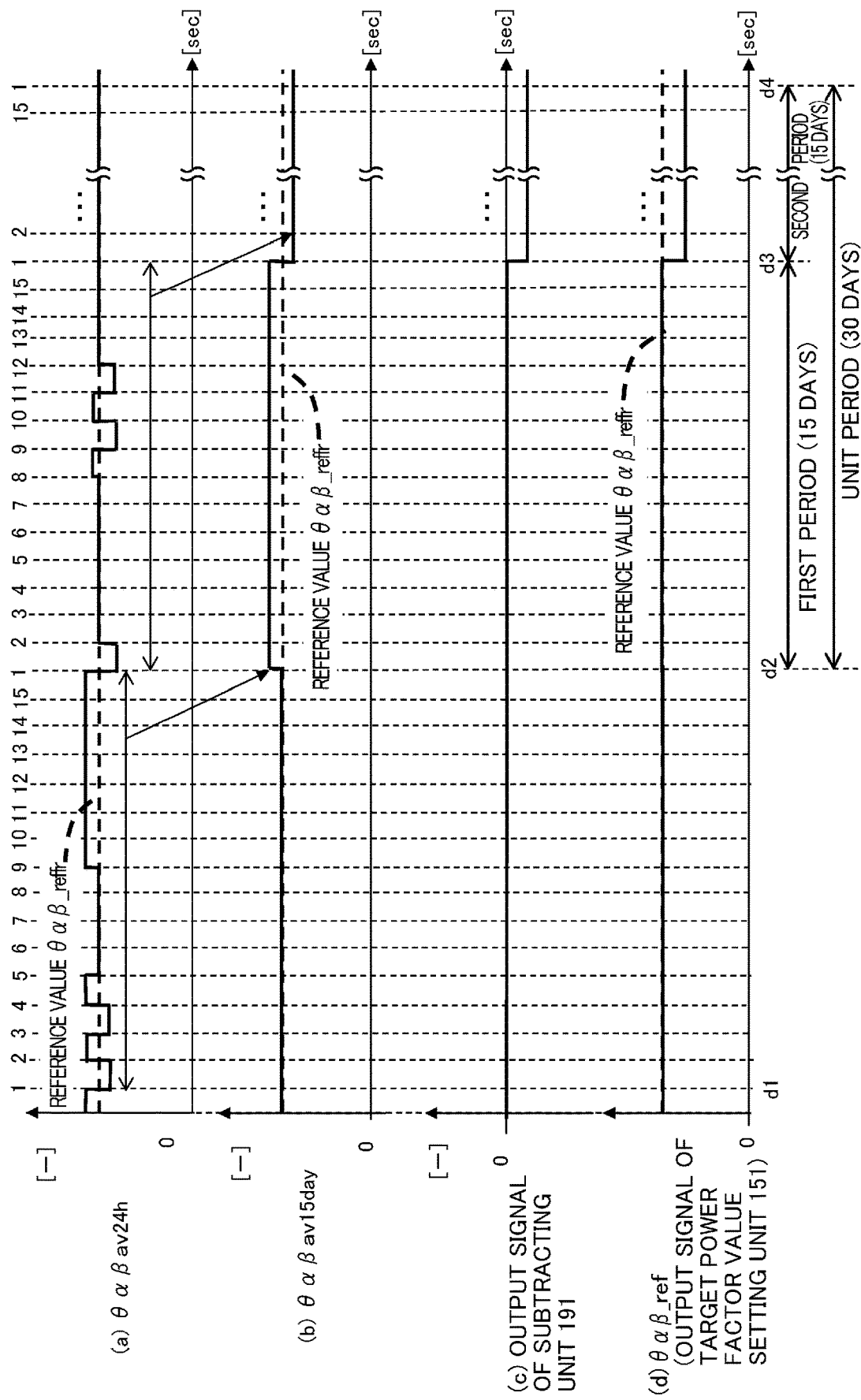
FIG. 11 is a diagram illustrating example operations of the second average power factor calculating unit and the target power factor value setting unit according to the second embodiment.

Next, FIG. 11(a) illustrates temporal changes in the average power-source power factor θαβav24 h, which is an average of twenty-four hours, FIG. 11(b) illustrates temporal changes in the average power-source power factor θαβav15 day of fifteen days, FIG. 11(c) illustrates temporal changes in the output signal of the subtracting unit (191) of the target power factor value setting unit (151), and FIG. 11(d) illustrates temporal changes in the target value θαβ_ref of the power-source power factor, which is the output signal of the target power factor value setting unit (151). In FIG. 11, the interval between vertically extending broken lines represents one day (twenty-four hours), and a period from date d1 to date d2, a period from date d2 to date d3, and a period from date d3 to date d4 each represent fifteen days. When the unit period is one month and the one month includes thirty days, the fifteen days from date d2 to date d3 of the thirty days correspond to the "first period", and the fifteen days from date d3 to date d4 following the first period correspond to the "second period".

That is, in the second embodiment, a case is exemplified where the sum of the first period and the second period is equal to the unit period, the first period is equal to the second period, and each of the first period and the second period is half the unit period.

In FIG. 11(b), the average value of the actual power-source power factors of fifteen days, obtained by using the average power-source power factor θαβav24 h of each day from date d1 to date d2, is updated as the average power-source power factor θαβav15 day of the fifteen days on date d2. FIG. 11(c) illustrates a result obtained by subtracting the average power-source power factor θαβav15 day of the fifteen days from the reference value θαβ_reffr of the target power factor value, and a value obtained by adding the output signal of the subtracting unit (191) illustrated in FIG. 11(c) to the reference value θαβ_reffr of the target power factor value is the target value θαβ_ref of the power-source power factor in FIG. 11(d).

Based on FIG. 11, in a case where the average power-source power factor θαβav15 day of the fifteen days in the first period is higher than the reference value θαβ_reffr of the target power factor value, the target value θαβ_ref of the power-source power factor for the fifteen days in the second period following the first period is set to a value smaller than that for the first period. Accordingly, fluctuation of the average value of the power-source power factor can be suppressed as much as possible without performing control of improving the power-source power factor by actively decreasing the operation capabilities of the load apparatuses (101, 102) in a state where the actual power-source power factor is higher than the target value θαβ_ref. Thus, it is possible to avoid or minimize, for example, a situation where the operation capability of the air conditioning apparatus serving as the load apparatus (101) is decreased or the operation of the air conditioning apparatus is stopped in daytime (14:00 to 15:00) of the hottest day of mid-summer. Thus, it is possible to keep the environment in the structure comfortable while receiving a desired power factor discount that is based on a power-source power factor that is as high as possible.

<Advantages>

In the second embodiment, the operation states of the load apparatuses (101, 102) are changed based on the target value θαβ_ref of the power-source power factor as a power-source quality and the actual power-source power factor θαβ (i.e., the actual power-source quality), but the target value θαβ_ref is not a fixed value but is a value adjusted based on the actual power-source power factor θαβ. Because the target value θαβ_ref is a variable value, the power-source power factor at the site where the power-source power factor control system (200) is established can be optimized, with the change in the operation capabilities of the load apparatuses (101, 102) being minimized. That is, not the control of optimizing the power-source power factor by actively changing the operation capabilities of the load apparatuses (101, 102), but the control of optimizing the power-source power factor by changing the target value θαβ_ref of the power-source power factor is performed. This leads to, for example, suppression of a decrease in power-source power factor and an improvement in power-source power factor, and makes it possible to reduce a basic charge included in electricity charges or avoid the imposition of a penalty on electricity charges.

In the second embodiment, the target value θαβ_ref of the power-source power factor is adjusted by using the power-source power factor θαβ in the unit period for which the target value θαβ_ref of the power-source power factor is adjusted, in particular, the average value of the power-source power factor θαβ.

Specifically, in the second embodiment, in a case where the average power-source power factor θαβav15 day in the first period of the unit period exceeds the reference value θαβ_reffr of the target power factor value, the target value θαβ_ref of the power-source power factor in the second period following the first period of the unit period is set to a value smaller than the target value θαβ_ref of the power-source power factor in the first period. In a case where the average power-source power factor θαβav15 day in the first period is below the reference value θαβ_reffr of target power factor value, the target value θαβ_ref of the power-source power factor in the second period is set to a value larger than the target value θαβ_ref of the power-source power factor in the first period. Accordingly, fluctuation of the average value of the target value θαβ_ref of the power-source power factor in the unit period is suppressed as much as possible. As a result, the power-source power factor θαβ in the unit period is optimized more reliably.

In the second embodiment, the total period of the first period and the second period is equal to the unit period. In particular, each of the first period and the second period is half the unit period. This makes it easy to adjust the target value θαβ_ref in the second period, and thus makes it relatively easy to prevent the average value of the target value θαβ_ref in the unit period from fluctuating.

In some cases, the period over which the value of the power-source power factor has an influence on electricity charges is "one month". In the second embodiment, fluctuation of the average value of the target value θαβ_ref of the power-source power factor in "one month" as the unit period is suppressed. This makes it possible to reliably receive the application of discount of electricity charges based on the average value θαβav15 day of the power-source power factor, and to reliably suppress the imposition of a penalty of a basic charge based on the degree of decrease in power-source power factor.

A power meter is connected to a structure, such as a building. The power meter measures a power-source power factor in addition to a power in many cases. In the second embodiment, the power meter is used as the power-source power factor measuring device (104), and thus it is not necessary to specially attach a sensor or detecting circuit for measuring a power-source power factor. This eliminates the necessity of newly attaching a sensor or detecting circuit, and the cost can be reduced accordingly.

In the second embodiment, the power-source power factor measuring device (104) wirelessly transmits a measurement result to the power-source power factor demand controller (105) including the load adjustment determining unit (152). This eliminates the necessity of the wiring line for connecting the power-source power factor measuring device (104) and the power-source power factor demand controller (105) and the necessity of installing the wiring line.

In the second embodiment, the power-source power factor demand controller (105) including the load adjustment determining unit (152) wirelessly transmits the load apparatus command signal Fs generated thereby to the adjusting units (101c, 102c) of the load apparatuses (101, 102). This eliminates the necessity of the wiring lines for connecting the power-source power factor demand controller (105) and the load apparatuses (101, 102) and the necessity of installing the wiring lines.

In the second embodiment, the load apparatus (101) is an air conditioning apparatus. In the case of designing a structure, such as a building, installation of a refrigerant pipe that connects an outdoor unit and an indoor unit of an air conditioning apparatus is necessary, and thus the specifications of the air conditioning apparatus to be installed in the structure are determined naturally. Thus, a communication line between the power-source power factor demand controller (105) or the like and the air conditioning apparatus can be connected during construction of the structure, and an environment in which the operation capability of the air conditioning apparatus can be changed by the power-source power factor can be easily established.

In the second embodiment, the active filter (101b) is incorporated in the air conditioning apparatus. The power-source power factor control system (200) further includes the phase modifier (131). These components make it possible to keep the power factor of the air conditioning apparatus high, and thus the actual power-source power factor θαβ can converge to the target value θαβ_ref of the power-source power factor as quickly as possible.

<Modification Example of Second Embodiment>

Figure 12:
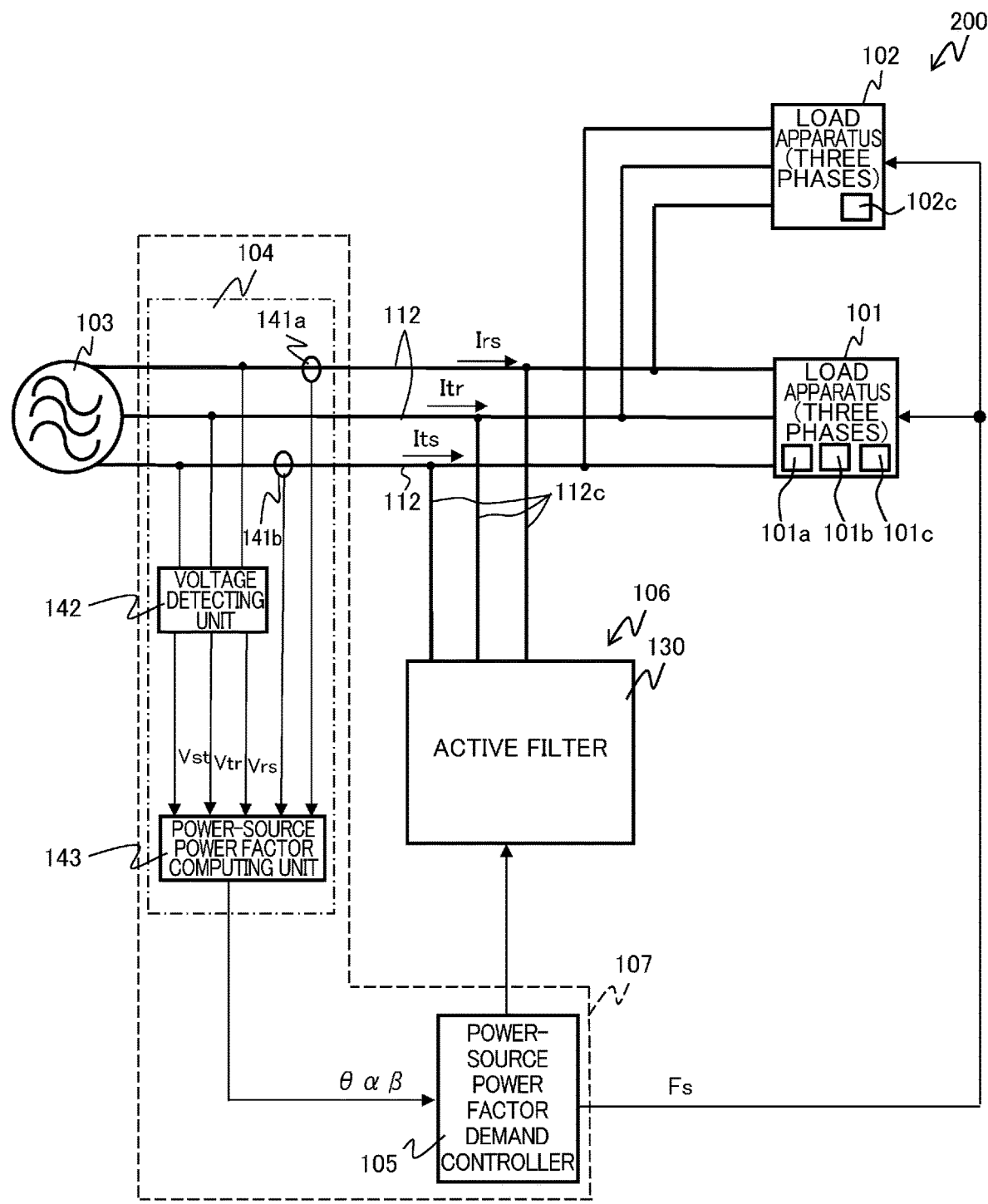
FIG. 12 is a diagram schematically illustrating the configuration of a power-source power factor control system according, to a modification example of the second embodiment.

As illustrated in FIG. 12, the power-source power factor control system (200) may include an active filter (130) instead of the phase modifier (131). The active filter (130) is connected in parallel to the load apparatuses (101, 102) with respect to the AC power source (103), and reduces a harmonic current generated in the load apparatuses (101, 102). The active filter (130) is controlled by the power-source power factor demand controller (105). Accordingly, the power factors of the load apparatuses (101, 102) can be kept high, and thus the power-source power factor can converge to the target value as quickly as possible. In this case, an active filter need not be incorporated in the load apparatus (101).

The load apparatus (101) may be an apparatus other than an air conditioning apparatus. For example, the load apparatus (101) may be an elevator, a fan, a pump, an escalator, a lighting apparatus driven by a three-phase power source, or the like provided in the building or the like.

The power-source power factor measuring device (104) need not be a power meter (a smart meter or the like) in the structure.

The power-source power factor measuring device (104) need not be of a wireless type.

The power-source power factor demand controller (105) need not be of a wireless type.

The active filter (101b) need not be incorporated in the load apparatus (101).

In the adjustment of the target value θαβ_ref of the power-source power factor, the actual power-source power factor θαβ at each time may be used instead of the "average value" of the power-source power factor in the unit period.

A description has been given that, in a case where the average value θαβav15 day of the power-source power factor in the former first period of the unit period exceeds the reference value θαβ_reffr of the target power factor value, the target value θαβ_ref of the power-source power factor in the latter second period is decreased. However, the timing to decrease the target value θαβ_ref of the power-source power factor is not limited thereto. For example, the target value θαβ_ref of the power-source power factor may be decreased immediately when it is determined that the average value of the power-source power factor exceeds the reference value θαβ_reffr of the target power factor value. The same applies to a case where the average value of the power-source power factor is below the reference value θαβ_reffr of the target power factor value.

The above-described unit period is not limited to one month. Even in a case where the unit period is one month, the number of days in the one month is not limited to thirty.

Each of the first period and the second period need not be half the unit period.

The total period of the first period and the second period may be shorter than the unit period. For example, in a case where the shorter period is twenty-eight days, the first period and the second period may each be five days or ten days. In such a case where the total period of the first period and the second period is shorter than the unit period, it is possible to change the target value θαβ_ref of the power-source power factor a plurality of times during the unit period, depending on the relationship between the total period and the unit period. Accordingly, the fluctuation of the average value of the target value θαβ_ref of the power-source power factor in the unit period can be finely suppressed.

The first period and the second period need not be equal to each other, for example, the first period may be five days and the second period may be ten days.

A plurality of phase modifiers (131) or active filters (130) may be provided for the single load apparatus (101).

The phase modifier (131) may include only the phase advancing capacitors (Ca, Cb, Cc).

In a case where the load apparatuses (101, 102) are air conditioning apparatuses, the air conditioning apparatuses are not limited to apparatuses that perform only cooling and heating. The air conditioning apparatuses include apparatuses capable of performing freezing, ventilation, and humidity control.

<Regarding Third to Tenth Embodiments>

In a factory, a building, and the like, many large inverter apparatuses are installed as a power source for supplying power to electric motors or the like. The inverter apparatus may become a harmonic source that generates harmonics having a negative influence on another apparatus.

Thus, an active filter apparatus is provided in a power system to which power is supplied from a commercial power source (AC power source). The active filter apparatus detects a harmonic current of the power system to which the inverter apparatus is connected, generates a current having a phase opposite to that of the detected harmonic current, and supplies the generated current to the power system, thereby reducing harmonics in the power system. Accordingly, voltage distortion, current distortion, and the like in the power system are reduced, and a negative influence of harmonics on another apparatus is suppressed. The suppression of the negative influence of harmonics improves a power factor.

At the time of designing an active filter apparatus, it is difficult to determine the capacity of the active filter apparatus to an appropriate value if the specifications of a load apparatus that generates harmonics, such as an inverter apparatus, are not clear. Thus, it is often the case that an active filter with a relatively large capacity is installed so that the fundamental power factor of the load apparatus can be improved regardless of any magnitude of harmonics. For example, in a structure provided with a transformer, an active filter apparatus whose capacity is about one-third of the capacity of the transformer is installed. In this case, however, the capacity of the active filter apparatus is very large relative to the actual load, and the active filter apparatus having an excessive capacity is installed. The active filter apparatus is more expensive as the capacity thereof increases.

In addition, the structure is provided with an air conditioning apparatus, an elevator apparatus, a lighting apparatus, a pump apparatus, and the like as load apparatuses including an inverter apparatus or the like that generates harmonics. However, a time period over which these apparatuses operate with the maximum load power is very short. For example, a time period over which an air conditioning apparatus as a load apparatus operates with the maximum load power is only a time period over which the temperature rises most in mid-summer (for example, around 14:00 from the beginning to the middle of August in Japan) in most cases. In addition, the possibility that, when some of the load apparatuses (for example, the air conditioning apparatus) are operating with the maximum load power, other load apparatuses (for example, the elevator apparatus, the lighting apparatus, and the like) are operating with the maximum load power is very low.

Thus, in a case where an active filter apparatus having a relatively large capacity is installed, the active filter apparatus does not fully demonstrate the capability thereof (specifically, the capability of improving a fundamental power factor), and the expensive active filter apparatus is not effectively utilized.

In another case, the structure is provided with a phase modifier as a phase modifying apparatus for modifying the phase of reactive power, instead of the active filter apparatus. The same things as those for the above-described active filter apparatus may be applied to the phase modifier.

In view of the above-described points, in the following third to tenth embodiments, a description will be given of techniques for improving and optimizing a power-source power factor by improving the fundamental power factor of a load apparatus without problems by using a phase modifying apparatus or active filter apparatus having a relatively small capacity.

Hereinafter, the third to sixth embodiments will be described as embodiments related to a phase modifying apparatus. Among these embodiments, the fourth to sixth embodiments correspond to so-called modification examples of the third embodiment, which are based on the third embodiment. The seventh to tenth embodiments will be described as embodiments related to an active filter apparatus. Among these embodiments, the eighth to tenth embodiments correspond to so-called modification examples of the seventh embodiment, which are based on the seventh embodiment.

Third Embodiment

<Overview of Air Conditioning System>

Figure 13:
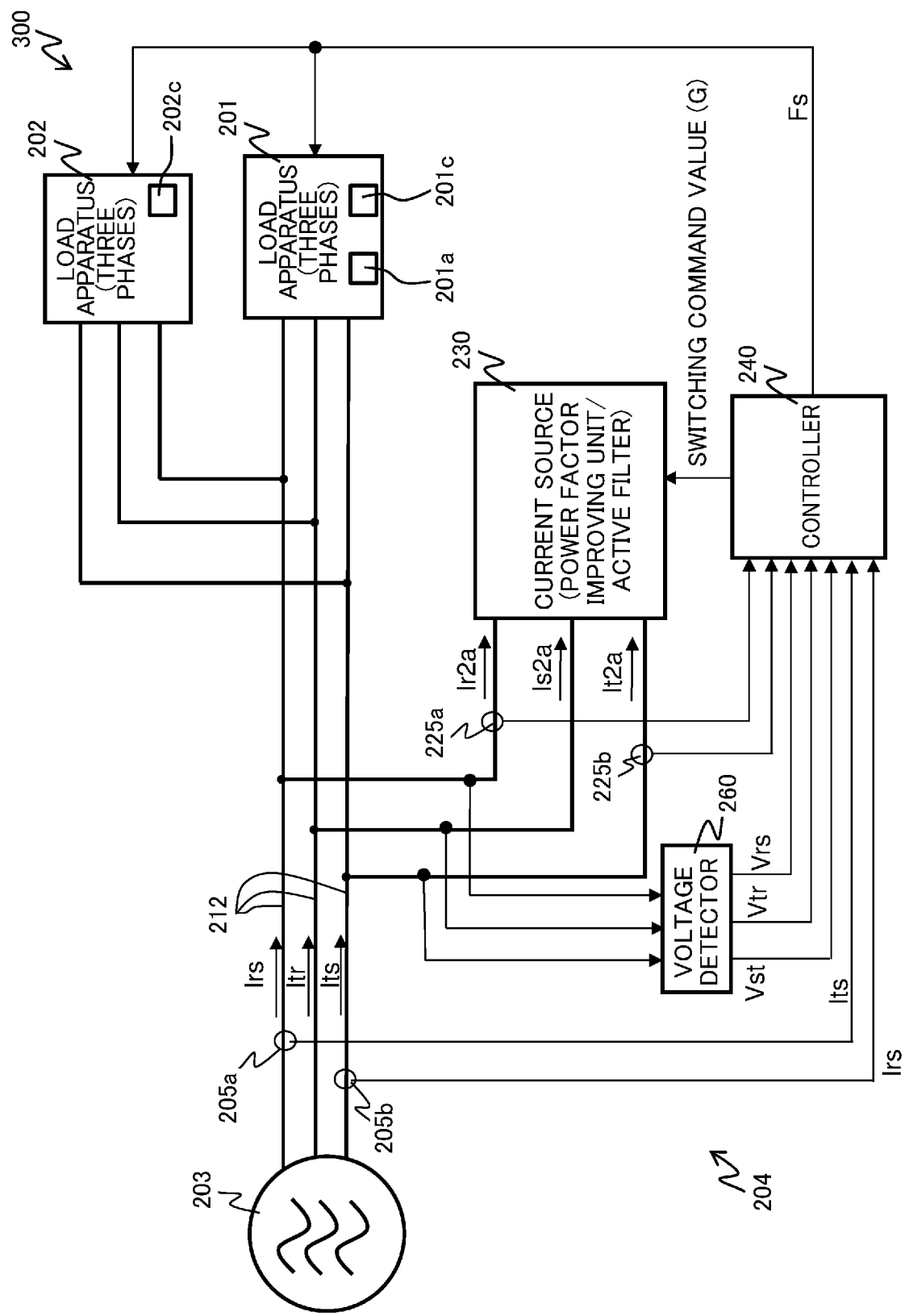
FIG. 13 is a diagram schematically illustrating the configuration of an air conditioning system including an active filter apparatus according to a third embodiment.

FIG. 13 is a block diagram illustrating the configuration of an air conditioning system (300) according to the third embodiment. In this example, the air conditioning system (300) includes a plurality of load apparatuses (201, 202) and an active filter apparatus (204) corresponding to a phase modifying apparatus. In the third embodiment, a case is taken as an example where the load apparatus (201) of the plurality of load apparatuses (201, 202) is an air conditioning apparatus.

The air conditioning system (300) is installed in an apartment, a factory, a building, a detached house, or the like (hereinafter a building or the like), and the load apparatus (201), which is an air conditioning apparatus, performs indoor air conditioning.

The building or the like is supplied with power from a power system including an AC power source (203). In this example, the AC power source (203) is a three-phase AC power source (for example, a three-phase commercial power source), and supplies power to the plurality of load apparatuses (201, 202) in a branching manner.

In the third embodiment, a case is taken as an example where the load apparatus (202) is an apparatus including a circuit that can be a source of a harmonic current, such as an inverter circuit (the apparatus is referred to as a harmonic generating load apparatus). Examples of the load apparatus (202) include an elevator, a fan, a pump, an escalator, a lighting apparatus driven by a three-phase power source, an air conditioning apparatus that is different from the load apparatus (201) as an air conditioning apparatus and that does not have measures against harmonics such as an active filter, and the like provided in the building or the like.

The load apparatuses (201, 202) respectively include adjusting units (201c, 202c) connected to a controller (240) (corresponding to the operation state control unit). The adjusting units (201c, 202c) are each configured using a microcomputer and a memory device storing a program for operating the microcomputer. The adjusting units (201c, 202c) adjust, based on a load apparatus command signal Fs output from the controller (240), operation parameters for changing the operation states of the respective load apparatuses (201, 202). Specifically, the operation parameters are the powers of the load apparatuses (201, 202), the currents of the load apparatuses (201, 202), the rotational speeds of electric motors included in the load apparatuses (201, 202), or the like.

<Configuration of Load Apparatus (201)>

The load apparatus (201), which is an air conditioning apparatus, includes a refrigerant circuit (not illustrated) and a power converting apparatus (201a) as well as the above-described adjusting unit (201c).

The refrigerant circuit is configured by connecting a compressor, an outdoor heat exchanger, an expansion mechanism, and an indoor heat exchanger by a refrigerant pipe. The refrigerant circuit is charged with refrigerant. Circulation of the refrigerant throughout the refrigerant circuit causes the inside of a room to be cooled or heated.

Although the details are not illustrated, the power converting apparatus (201a) is connected to the AC power source (203) and includes a converter circuit and an inverter circuit. When supplied with AC power from the AC power source (203), the power converting apparatus (201a) converts the AC power to power having a desired frequency and a desired voltage and supplies the converted power to the compressor (more specifically, the electric motor included in the compressor). Accordingly, the compressor operates and the refrigerant circuit functions. As a result, indoor air conditioning is performed.

When the power converting apparatus (201a) or the electric motor of the compressor operates in the load apparatus (201), which is an air conditioning apparatus, a harmonic current may be generated. The harmonic current may flow out to the AC power source (203) through a current path for supplying power to the load apparatus (201).

As described above, a harmonic current may flow out to the AC power source (203) not only from the load apparatus (201) but also from the load apparatus (202), which is a harmonic generating load apparatus, through a current path for supplying power to the load apparatus (202).

In general, the flow-out level of such a harmonic current to the AC power source (203) side is restricted. Thus, in the air conditioning system (300) according to the third embodiment, the harmonic current is reduced by the active filter apparatus (204). Furthermore, the active filter apparatus (204) according to the third embodiment has a function of improving a fundamental power factor under circumstances where an improvement in the fundamental power factor at power distribution/reception ends is required from the viewpoints of installed capacity and energy saving.

Hereinafter, the configuration of the active filter apparatus (204) will be described.

<Active Filter Apparatus (204)>

The active filter apparatus (204) is connected to the AC power source (203) and has a function of cancelling out a harmonic current that flows out from the load apparatuses (201, 202), which are harmonic generating load apparatuses. That is, the active filter apparatus (204) causes a compensating current to flow so that the waveforms of the currents in the current paths of the AC power source (203) (hereinafter, power reception paths (212)) become closer to a sinusoidal waveform. More specifically, the active filter apparatus (204) generates a compensating current having a phase opposite to that of the harmonic current appearing in the power reception paths (212), and supplies the compensating current to the power reception paths (212).

As a result of causing the above-described compensating current to flow, the active filter apparatus (204) improves a fundamental power factor. In this example, the active filter apparatus (204) is configured to cause a compensating current for compensating for a reactive component of the fundamental to flow, thereby improving the fundamental power factor.

The harmonic current generated in the load apparatus (201), which is an air conditioning apparatus, may be the largest when the load of the air conditioning apparatus is the largest (for example, at the maximum output in a cooling operation). The same applies to the harmonic current generated in the load apparatus (202) when it is assumed that the load apparatus (202) is an air conditioning apparatus.

Thus, in general, the capability (the amount of power that can be generated), that is, the capacity, of the active filter apparatus (204) is set by assuming the harmonic current when all the load apparatuses (201, 202) simultaneously have the maximum load. However, the load apparatuses (201, 202) are used at a load smaller than the maximum load more often than used at the maximum load. Thus, the active filter apparatus (204) having the above-described capability set thereto may be mostly in a state where the capability thereof is redundant, if the capability is used only to improve the power factor by taking measures against the harmonic current of the load apparatuses (201, 202).

Thus, in the third embodiment, the capability (i.e., the capacity) of the active filter apparatus (204) is set to be lower than a general capability described above. For example, the capability (i.e., the capacity) of the active filter apparatus (204) is set to about 80%, with the capability of coping with the harmonic current when all the load apparatuses (201, 202) simultaneously have the maximum load being 100%. The active filter apparatus (204) becomes more expensive as the capability (i.e., the capacity) thereof increases. In the third embodiment, the capability is set to be relatively low, and thus the cost of the active filter apparatus (204) can be reduced.

The active filter apparatus (204) according to the third embodiment exhibits the function of improving the power factor by taking measures against the harmonic current without problems and performs control to improve the power-source power factor although the capability thereof is relatively low, which will be described below.

To implement the above-described function, the active filter apparatus (204) according to the third embodiment includes, as illustrated in FIG. 13, a current source (230) (corresponding to a power factor improving unit), first current detectors (205a, 205b) (corresponding to a current detecting unit), second current detectors (225a, 225b), a voltage detector (260), and the controller (240) corresponding to the operation state control unit.

—Current Source—

The current source (230) is a so-called active filter that improves the fundamental power factor by generating a current for reducing a harmonic current and improving the fundamental power factor (i.e., a compensating current).

An output terminal of the current source (230) is connected to the power reception paths (212) of the load apparatuses (201, 202), and a generated compensating current is output to the power reception paths (212). Specifically, the current source (230) is connected in parallel to the load apparatuses (201, 202) with respect to the AC power source (203).

Although not illustrated, the current source (230) according to the third embodiment is configured using a so-called inverter circuit. A switching command value (G), which will be described below, is input to the current source (230) from the controller (240). The current source (230) performs switching in accordance with the switching command value (G) to generate a compensating current.

—First Current Detectors—

The first current detectors (205a, 205b) detect current values in the power reception paths (212) of the AC power source (203). Specifically, the first current detectors (205a, 205b) detect the values of output currents output from the AC power source (203) before the output currents branch off to the current source (230) and the individual load apparatuses (201, 202).

In this example, the two first current detectors (205a, 205b) are provided. Specifically, the first current detector (205a) detects an R-phase current value (Irs) in the AC power source (203). The first current detector (205b) detects a T-phase current value (Its) in the AC power source (203). The detection results of the respective first current detectors (205a, 205b) are transmitted to the controller (240).

The configurations of the respective first current detectors (205a, 205b) are not particularly limited. For example, a current transformer may be adopted thereto.

The first current detectors (205a, 205b) are each configured to wirelessly transmit a detection result to the controller (240). The distance between the AC power source (203) and the active filter apparatus (204) may be 20 to 30 m. Thus, if the first current detectors (205a, 205b) are connected to the active filter apparatus (204) by wiring lines, the wiring run length is long, and a great deal of time and effort is required to connect the first current detectors (205a, 205b) and the active filter apparatus (204). In contrast, in the third embodiment, the detection results of the first current detectors (205a, 205b) are wirelessly transmitted to the controller (240). This eliminates the necessity of the wiring lines and the necessity of installing the wiring lines.

A phenomenon in which the magnetic fluxes passing through the first current detectors (205a, 205b) are changed with time by the currents flowing through the first current detectors (205a, 205b) is called electromagnetic induction. An induced electromotive force, which is an electromotive force generated by the electromagnetic induction, may be used as a power source for driving the first current detectors (205a, 205b) (for example, a power source for communication). Accordingly, the first current detectors (205a, 205b) can operate with a non-power-source scheme (i.e., operate without connecting the first current detectors (205a, 205b) to an external power source), and it becomes unnecessary to connect the first current detectors (205a, 205b) to an external power source.

—Second Current Detectors—

The second current detectors (225a, 225b) detect current values to be input to the current source (230) (hereinafter referred to as current values (Ir2a, It2a)).

In this example, the two second current detectors (225a, 225b) are provided. The second current detector (225a) detects an R-phase current value (Ir2a) to be input to the current source (230) from the AC power source (203), and the second current detector (225b) detects a T-phase current value (It2a) to be input to the current source (230) from the AC power source (203). The current values (Ir2a, It2a) detected by the respective second current detectors (225a, 225b) are transmitted to the controller (240).

The configurations of the respective second current detectors (225a, 225b) are not particularly limited. For example, a current transformer may be adopted thereto.

The second current detectors (225a, 225b) may respectively transmit the current values (Ir2a, It2a) in a wired or wireless manner.

Like the above-described first current detectors (205a, 205b), the second current detectors (225a, 225b) may be configured to operate with a non-power-source scheme.

FIG. 13 illustrates an example in which the two second current detectors (225a, 225b) are provided corresponding to the currents (Ir2a, It2a) of the two phases of the currents (Ir2a, Is2a, It2a) of the three phases to be input to the current source (230). Alternatively, three second current detectors may be provided corresponding to the currents (Ir2a, Is2a, It2a) of the three phases.

—Voltage Detector—

The voltage detector (260) is connected to the output terminals of the respective phases of the AC power source (203). The voltage detector (260) is a sensor that detects line-to-line voltages (Vrs, Vtr, Vst) of the AC power source (203).

—Controller—

The controller (240) is configured using a microcomputer and a memory device storing a program for operating the microcomputer. As illustrated in FIG. 13, the controller (240) is connected to the current source (230), the first current detectors (205a, 205b), the second current detectors (225a, 225b), the voltage detector (260), and the individual load apparatuses (201, 202), and controls, based on the detection results of the respective detectors (205a, 205b, 225a, 225b, 260), the operations of the current source (230) and the load apparatuses (201, 202).

Figure 14:
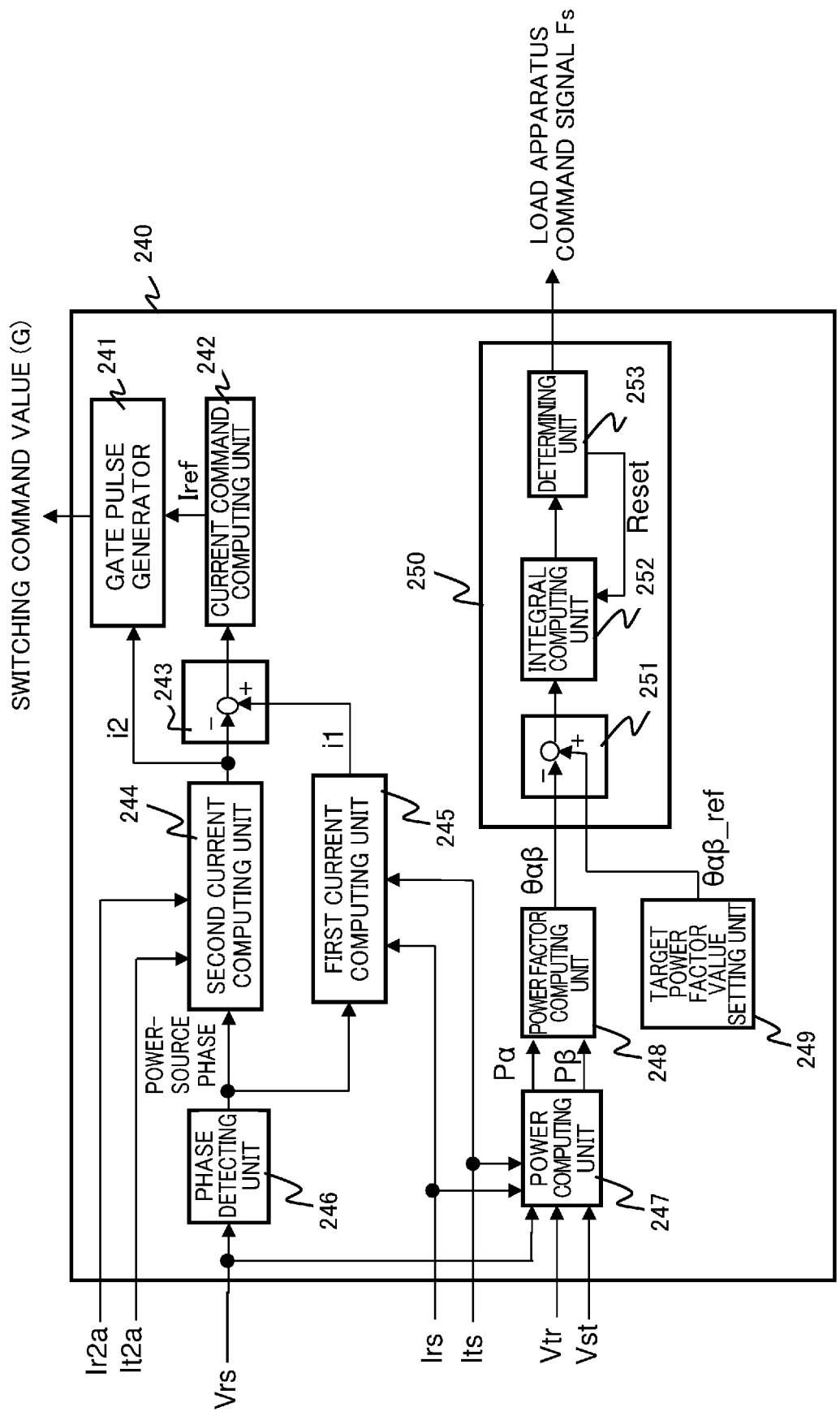
FIG. 14 is a block diagram illustrating an example of a controller according to the third embodiment.

The controller (240) according to the third embodiment performs adjustment control on the output current of the current source (230), and adjustment control on the operation states of the respective load apparatuses (201, 202) based on the actual power-source power factor of the AC power source (203). To perform such control, the controller (240) includes, as exemplified as a block diagram in FIG. 14, a phase detecting unit (246), a first current computing unit (245), a second current computing unit (244), a load current computing unit (243), a current command computing unit (242), a gate pulse generator (241), a power computing unit (247), a power factor computing unit (248), a target power factor value setting unit (249), and a load adjustment determining unit (250). The load adjustment determining unit (250) includes a subtracting unit (251), an integral computing unit (252), and a determining unit (253).

The adjustment control on the output current of the current source (230) is mainly performed by the phase detecting unit (246), the first current computing unit (245), the second current computing unit (244), the load current computing unit (243), the current command computing unit (242), and the gate pulse generator (241) among these units. The adjustment control on the operation states of the respective load apparatuses (201, 202) based on the actual power-source power factor of the AC power source (203) is performed by the power computing unit (247), the power factor computing unit (248), the target power factor value setting unit (249), and the load adjustment determining unit (250).

<Adjustment Control on Output Current of Current Source (230)>

The phase detecting unit (246) receives the line-to-line voltage (Vrs) of one phase of the line-to-line voltages (Vrs, Vst, Vtr) of the AC power source (203) detected by the voltage detector (260). The phase detecting, unit (246) detects the phase of the power-source voltage in the power reception paths (212) by using the received line-to-line voltage (Vrs), and outputs the detected phase to the first current computing unit (245) and the second current computing unit (244).

The first current computing unit (245) receives the phase of the power-source voltage detected by the phase detecting unit (246) and the output currents (Irs, Its) of the AC power source (203) detected by the first current detectors (205a, 205b). Based on the phase of the power-source voltage and the output currents (Irs, Its) of the AC power source (203) that have been received, the first current computing unit (245) obtains a current (a first current value (i1)) that is necessary to perform both compensation for a harmonic current (reduction of a harmonic current) and compensation for a reactive component of the fundamental (improvement in the fundamental power factor), and outputs the first current value (i1) to the load current computing unit (243). More specifically, the first current computing unit (245) extracts, from the detection results (the current values (Irs, Its)) of the first current detectors (205a, 205b), a harmonic current component and a reactive component of the fundamental, and outputs them as the first current value (i1).

The second current computing unit (244) receives the phase of the power-source voltage detected by the phase detecting unit (246) and the current values (Ir2a, It2a) that have been detected by the second current detectors (225a, 225b) and that are to be input to the current source (230). Based on the phase of the power-source voltage and the current values (Ir2a, It2a) that have been received, the second current computing unit (244) obtains a current (a second current value (i2)) flowing into the active filter apparatus (204) that is performing both compensation for a harmonic current (reduction of a harmonic current) and compensation for a reactive component of the fundamental (improvement in the fundamental power factor) at the present, and outputs the second current value (i2) to the load current computing unit (243). More specifically, the second current computing unit (244) extracts, from the detection results (the current values (Ir2a, It2a)) of the second current detectors (225a, 225b), a harmonic current component and a reactive component of the fundamental, and outputs them as the second current value (i2).

The load current computing unit (243) calculates the currents flowing through the respective load apparatuses (201, 202), which are harmonic generating load apparatuses. By subtracting the current values (Ir2a, Is1a, It2a) of the respective phases input to the current source (230) of the active filter apparatus (204) from the output current values (Irs, Itr, Its) of the respective phases of the AC power source (203), the sum of the currents flowing through the respective load apparatuses (201, 202) is obtained. With use of this, in the third embodiment, harmonics generated in the individual load apparatuses (201, 202) are suppressed to improve the fundamental power factor at the power distribution/reception ends near the AC power source (203) and reduce the harmonic current. Specifically, in the third embodiment, the load current computing unit (243) obtains the sum of the currents flowing through the respective load apparatuses (201, 202) by subtracting the second current value (i2) of the second current computing unit (244) from the first current value (i1) of the first current computing unit (245), and outputs the obtained computation result to the current command computing unit (242).

The current command computing unit (242) computes the current value of the opposite phase of the computation result of the load current computing unit (243), and outputs the value as a current command value (Iref) to the gate pulse generator (241).

The gate pulse generator (241) generates a switching command value (G) for providing a command for switching in the inverter circuit constituting the current source (230). Specifically, the gate pulse generator (241) performs so-called feedback control of repeating an operation of generating a switching command value (G) in accordance with the difference between the current value output from the current source (230) and the above-described current command value (Iref). Accordingly, the current source (230) supplies a current (compensating current) corresponding to the current command value (Iref) to the power reception paths (212). More specifically, the gate pulse generator (241) generates a switching command value (G) that causes the second current value (i2) obtained by the second current computing unit (244) to match the current command value (Iref), and outputs the switching command value (G) to the current source (230). Accordingly, the harmonic component included in the currents flowing through the load apparatuses (201, 202) and the current output from the active filter apparatus (204) are cancelled out, the output currents (Irs, Itr, Its) of the AC power source (203) become sine-wave currents from which a harmonic current has been removed, and the power factor is improved.

<Adjustment Control on Operation States of Respective Load Apparatuses (201, 202)>

The power computing unit (247) receives the line-to-line voltages (Vrs, Vtr, Vst) of the three phases of the AC power source (203) detected by the voltage detector (260) and the output currents (Irs, Its) of the AC power source (203) detected by the first current detectors (205a, 205b). The power computing unit (247) applies these received values to the following Equations (6) and (7), thereby computing voltages Vα and Vβ and currents iα and iβ of two rotation axes (αβ axes).

[Math. 6]

$$\begin{bmatrix} V\alpha \\ V\beta \end{bmatrix} = \frac{\sqrt{2}}{\sqrt{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (6)$$

[Math. 7]

$$\begin{bmatrix} i\alpha \\ i\beta \end{bmatrix} = \frac{\sqrt{2}}{\sqrt{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (7)$$

Subsequently, the power computing unit (247) applies the voltages Vα and Vβ and the currents iα and iβ of the two rotation axes (αβ axes) obtained from the above Equations (6) and (7) to the following Equation (8), thereby computing an active power Pα. Also, the power computing unit (247) applies the voltages Vα and Vβ and the currents iα and iβ of the two rotation axes (αβ axes) obtained from above Equations (6) and (7) to the following Equation (9), thereby computing a reactive power Pβ.

[Math. 8]

$$P\alpha = V\alpha \times i\alpha + V\beta \times i\beta \quad (8)$$

[Math. 9]

$$P\beta = V\alpha \times i\beta - V\beta \times i\alpha \quad (9)$$

The power factor computing unit (248) applies the active power Pα and the reactive power Pβ obtained by the power computing unit (247) to the following Equation (10), thereby computing the power-source power factor θαβ of the AC power source (203). That is, the power-source power factor θαβ obtained by the power factor computing unit (248) means the actual power-source power factor θαβ.

[Math. 10]

$$\theta\alpha\beta = \frac{P\alpha}{\sqrt{(P\alpha)^2 + (P\beta)^2}} \quad (10)$$

The target power factor value setting unit (249) sets in advance a target value θαβ_ref of the power factor. The target power factor value setting unit (249) according to the third embodiment sets the target value θαβ_ref of the power factor to a value of 0.995 to 1.004. In the case of evaluating the power-source power factor, the value thereof is to be rounded off at the third decimal place. Thus, when the target value θαβ_ref of the power factor is set to a value of 0.995 to 1.004, the actual power-source power factor controlled based on the target value θαβ_ref of the power factor is evaluated as "1".

The subtracting unit (251) of the load adjustment determining unit (250) receives the actual power-source power factor θαβ obtained by the power factor computing unit (248) and the target value θαβ_ref of the power factor set by the target power factor value setting unit (249). The subtracting unit (251) subtracts the actual power-source power factor θαβ from the target value θαβ_ref of the power factor. The subtracting unit (251) outputs a value obtained through the subtraction to the integral computing unit (252).

The integral computing unit (252) integrates the subtraction result of the subtracting unit (251) (i.e., the result obtained by subtracting the actual power-source power factor θαβ from the target value θαβ_ref of the power factor).

The determining unit (253) receives the integration result of the integral computing unit (252). Based on the integration result, the determining unit (253) controls the operation parameters for changing the operation states of the load apparatuses (201, 202) such that the fundamental power factor approaches the target value θαβ_ref of the power factor. Specifically, the determining unit (253) outputs, to the individual load apparatuses (201, 202), a load apparatus command signal Fs, which is a control signal for adjusting the operation parameters and decreasing the operation capabilities of the load apparatuses (201, 202), to cause the fundamental power factor (power-source power factor) to approach the target value θαβ_ref of the power factor. When the operation capabilities of the load apparatuses (201, 202) are decreased by the load apparatus command signal Fs, a margin is generated in the compensation capability of the active filter apparatus (204), and the fundamental power factor increases to substantially match the target value θαβ_ref of the power factor.

Here, the operation parameters include at least one of the powers of the respective load apparatuses (201, 202), the currents of the respective load apparatuses (201, 202), the rotational speeds of the electric motors, and the like.

Figure 15:
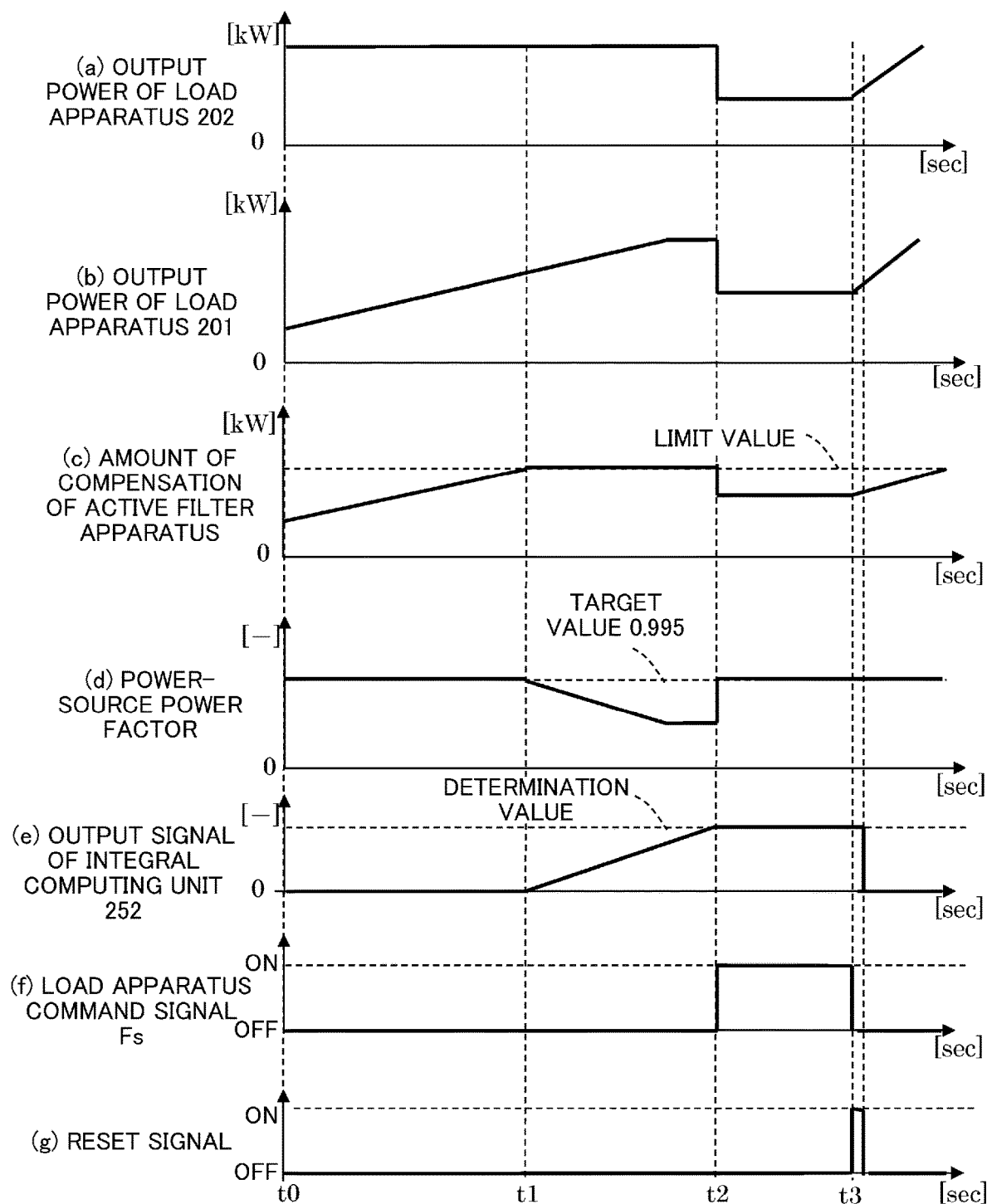
FIG. 15 is a diagram illustrating temporal changes in output powers of respective load apparatuses, an amount of compensation of the active filter apparatus, a power-source power factor, an output signal of an integral computing unit, a load apparatus command signal, and a reset signal according to the third embodiment.

FIG. 15 illustrates an example of temporal changes in the operations of the load apparatuses (201, 202), the amount of compensation of the active filter apparatus (204), the power-source power factor, and the operation of the load adjustment determining unit (250). FIG. 15(a) illustrates the output power correlated to the operation of the load apparatus (202). In this example, it is assumed that the load apparatus (202) is a constant load, such as a pump. FIG. 15(b) illustrates the output power correlated to the operation of the load apparatus (201). In this example, it is assumed that the load apparatus (201) is an air conditioning apparatus. From time t0 to time t2, the load apparatus (202) stably operates with a constant output power regardless of time. In contrast, from time t0 to time t2, the load apparatus (201) continuously increases the output power with an increase in air conditioning load. It is assumed that the period from time t0 to time t2 is daytime (14:00 to 15:00) of the hottest day of mid-summer, when an outside temperature is abnormally high and the air conditioning load suddenly increases.

FIG. 15(c) illustrates the amount of compensation of the active filter apparatus (204) by power. From time t0 to time t1, the amount of compensation of the active filter apparatus (204) increases with an increase in the output power of the load apparatus (201). That is, from time t0 to time t1, the active filter apparatus (204) compensates for an increase in the output power of the load apparatus (201). Thus, from time t0 to time t1, the power-source power factor illustrated in FIG. 15(d) is substantially maintained at the target value.

However, at and after time t1, the output power of the load apparatus (201) continues increasing, but the amount of compensation of the active filter apparatus (204) reaches a limit value at time t1 and is kept constant at the limit value thereafter. Thus, at and after time t1, the power-source power factor decreases from the target value in contrast to the increase in the output power of the load apparatus (201). This is because, although the output power of the load apparatus (201) increases, the compensation capability of the active filter apparatus (204) has already reached the limit value and is insufficient.

Thus, from time t0 to time t1, there is no difference between the target value θαβ_ref of the power factor and the actual power-source power factor θαβ, and the output result (output signal) of the integral computing unit (252) of the load adjustment determining unit (250) is substantially kept at "0", as illustrated in FIG. 15(e). However, at and after time t1, a difference occurs between the target value θαβ_ref of the power factor and the actual power-source power factor θαβ, the output result (output signal) of the integral computing unit (252) increases.

Time t2 is the point of time at which the output result (output signal) of the integral computing unit (252) reaches a determination value. At time t2, in response to receipt of the output result (output signal) from the integral computing unit (252), the determining unit (253) outputs a load apparatus command signal Fs (i.e., a load apparatus command signal Fs representing "ON") for making the operation states of the respective load apparatuses (201, 202) different from the operation states at and before time t2 to the individual load apparatuses (201, 202), as illustrated in FIG. 15(t). The load apparatus command signal Fs causes the operation states of both the load apparatuses (201, 202) to change in the direction of decreasing the output powers from time t2 to time t3 as illustrated in FIGS. 15(a) and (b). Accordingly, at and after time t2, the amount of compensation of the active filter apparatus (204) decreases from the limit value because the output powers of both the load apparatuses (201, 202) decrease, as illustrated in FIG. 15(c). This means that a margin is generated in the amount of compensation of the active filter apparatus (204). Thus, as illustrated in FIG. 15(d), the actual power-source power factor (i.e., the actual power-source quality) can recover so as to substantially match the target value θαβ_ref of the power factor (i.e., the target value of the power-source quality).

In this way, when the actual power-source power factor θαβ decreases from the target value θαβ_ref of the power factor, the controller (240) according to the third embodiment adjusts the operation parameters, which are at least one of the powers, currents, rotational speeds of electric motors, and the like of the load apparatuses (201, 202), to decrease the operation parameters. Accordingly, the controller (240) performs "power-source power factor demand control" of forcibly decreasing the operation capabilities of the respective load apparatuses (201, 202) and making a state where the actual power-source power factor θαβ matches the target value θαβ_ref of the power factor. The "power-source power factor demand control" is control in which the controller (240) according to the third embodiment adjusts, based on the detection results of the first current detectors (205a, 205b), the operation parameters such that the fundamental power factor approaches the target value θαβ_ref of the power factor.

When a state where the actual power-source power factor θαβ matches the target value θαβ_ref of the power factor continues for a certain period from time t2 (in FIG. 15, the period from time t2 to time t3), the determining unit (253) causes the load apparatus command signal Fs output therefrom to be in an "OFF" state as in the period from time t0 to time t2, as illustrated in FIG. 15(f). Accordingly, both the load apparatuses (201, 202) are released from a forcible decrease in operation capability and perform a normal operation under control that is based on a normal command.

At time t3, the determining unit (253) outputs a reset signal for resetting the integration result (clearing the integration result to zero) of the integral computing unit (252), as illustrated in FIG. 15(g). Accordingly, the integration result (output signal) of the integral computing unit (252) becomes zero, and the integral computing unit (252) becomes ready for a case where the actual power-source power factor θαβ decreases below the target value θαβ_ref of the power factor next time.

<Advantages>

A power-source power factor, which is a power-source quality, is obtained by adding a power factor that is based on a harmonic component to a fundamental power factor. In the third embodiment, the operation states of the load apparatuses (201, 202) are changed such that the fundamental power factor approaches the target value θαβ_ref of the power-source power factor. Accordingly, the actual power-source power factor θαβ, which is the actual power-source quality, approaches the target value θαβ_ref of the power-source power factor, which is the target value of the power-source quality. In this way, even if the capacity of the active filter apparatus (204) is small, the operation capabilities of the load apparatuses (201, 202) are adjusted so as to be decreased, for example, by controlling the operation states of the load apparatuses (201, 202), and thus the capability of improving the fundamental power factor of the active filter apparatus (204) recovers. Accordingly, even if the capacity of the active filter apparatus (204) is relatively small, the fundamental power factor is improved without problems. Thus, the capacity of the active filter apparatus (204) can be actively reduced, and the cost can be reduced accordingly.

Specifically, the controller (240) adjusts the operation parameters, based on the detection results of the first current detectors (205a, 205b) such that the fundamental power factor approaches the target value. In this way, by using actually detected output currents of the AC power source (203) at the time of adjusting the operation parameters, the actual power-source power factor θαβ can be grasped. Thus, the operation parameters can be easily adjusted such that the fundamental power factor approaches the target value θαβ_ref more reliably.

In the third embodiment, the first current detectors (205a, 205b) are configured to wirelessly transmit a detection result to the controller (240). This eliminates the necessity of the wiring lines for connecting the first current detectors (205a, 205b) and the controller (240) and the necessity of installing the wiring lines.

In the third embodiment, the first current detectors (205a, 205b) are configured to operate with a non-power-source scheme. This eliminates the necessity of connecting the first current detectors (205a, 205b) to an external power source.

In the third embodiment, a case is exemplified where the phase modifying apparatus is the active filter apparatus (204). Accordingly, the power factors of the load apparatuses (201, 202) can be kept high, and thus the fundamental power factor can be improved as quickly as possible.

In the third embodiment, the load apparatus (201) is an air conditioning apparatus. In the case of designing a structure, such as a building or a factory, installation of a refrigerant pipe that connects an outdoor unit and an indoor unit of an air conditioning apparatus is necessary, and thus the specifications of the air conditioning apparatus to be installed in the structure are determined naturally. Thus, a communication line between the controller (240) or the like and the air conditioning apparatus can be connected during construction of the structure, and an environment in which the operation capability of the air conditioning apparatus can be changed by the power-source power factor can be easily established.

Fourth Embodiment

Figure 16:
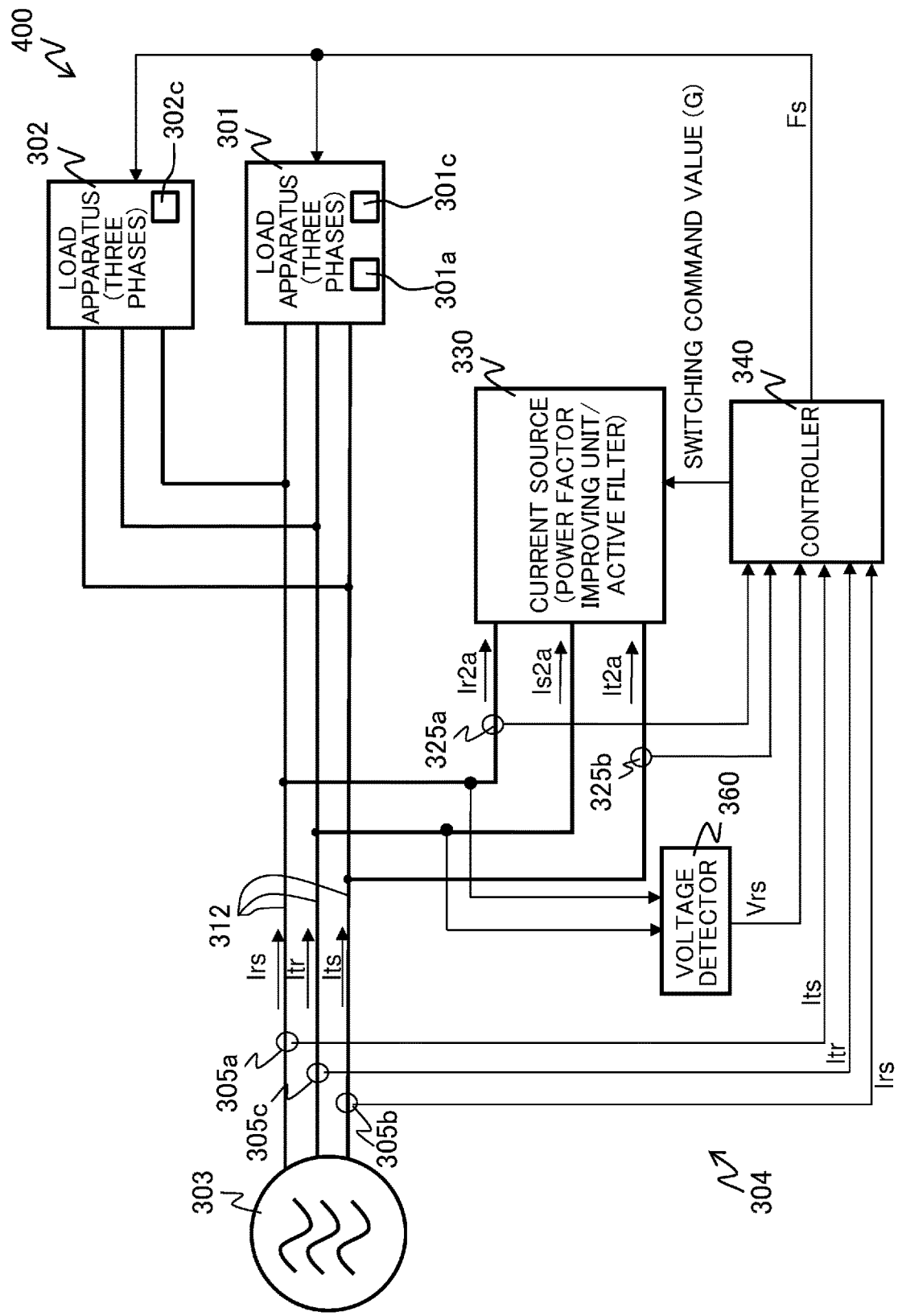
FIG. 16 is a diagram schematically illustrating the configuration of an air conditioning system including an active filter apparatus according to a fourth embodiment.

FIG. 16 is a block diagram illustrating the configuration of an air conditioning system (400) including an active filter apparatus (304) according to a fourth embodiment, which is a modification example of the third embodiment. The fourth embodiment is different from the third embodiment in that another load apparatus (302), which is a harmonic generating load apparatus, is an apparatus driven by a single-phase voltage and that the other load apparatus (302) is assumed to be a lighting apparatus, such as an LED, or a single-phase fan or pump. In particular, in the fourth embodiment, three first current detectors (305a, 305b, 305c) are provided by assuming a case where the phase connected to the other load apparatus (302) (i.e., an apparatus driven by a single-phase voltage) is not determined.

In FIG. 16, the components corresponding to those in FIG. 13 are denoted by reference numerals, such as "330". The details of these components are similar to those in the third embodiment in FIG. 13. Thus, hereinafter a description will be given of only the points different from the third embodiment.

The three first current detectors (305a. 305b, 305c) are provided corresponding to respective phases (R, S. T) of an AC power source (303) and detect the current values of the corresponding phases (R, S, T). That is, in the fourth embodiment, although the load apparatus (302) is an apparatus operated by a single-phase AC, the current values of all the three phases are detected and thus the current values can be reliably detected.

A voltage detector (360) is connected to the R phase and the S phase of the AC power source (303) and is not connected to the T phase. Thus, the voltage detector (360) detects only a line-to-line voltage (Vrs) of the AC power source (303) and inputs the line-to-line voltage (Vrs) to a controller (340). This is because, as described in the third embodiment, the controller (340) detects the phase of the power-source voltage in power reception paths (312) through computation by using only the line-to-line voltage (Vrs). The other line-to-line voltages (Vst, Vtr) each have a phase difference of 120 degrees from the line-to-line voltage (Vrs) (specifically, the phase is advanced or delayed by 120 degrees). Thus, the controller (340) according to the fourth embodiment is capable of computing the amplitude of the power-source voltage from the line-to-line voltage (Vrs), and is capable of obtaining the phases and amplitudes of the other line-to-line voltages (Vst, Vtr) from the computed amplitude and phase of the power-source voltage. The result obtained in this way can be substituted into the above Equation (6). Thus, the detection of the actual line-to-line voltages (Vst, Vtr) can be omitted.

The omission of the detection of the line-to-line voltages (Vst, Vtr) and the computation of the other line-to-line voltages (Vst, Vtr) based on the line-to-line voltage (Vrs) may be adopted in the above-described third embodiment.

<Advantages>

According to the fourth embodiment, in a case where the other load apparatus (302) driven by a single-phase voltage is connected, the plurality of first current detectors (305a. 305b, 305c) are provided corresponding to the respective phases (R, S, T) of the AC power source (303). Thus, even if the phase connected to the other load apparatus (302) is unknown, the current values of all the three phases can be reliably grasped.

According to the fourth embodiment, in a case where the other load apparatus (302) driven by a single-phase voltage is connected, the detection of the actual line-to-line voltages (Vst, Vtr) is omitted. This makes it possible to reduce a harmonic current and improve a fundamental power factor without unnecessarily increasing the cost of the active filter apparatus (304).

The fourth embodiment produces the advantages described in the above-described third embodiment.

In the fourth embodiment, in a case where the phase of the AC power source (303) to which the load apparatus (302) driven by a single-phase voltage is connected is determined in advance, a first current detector may be provided for the phase to which the load apparatus (302) is connected.

Fifth Embodiment

Figure 17:
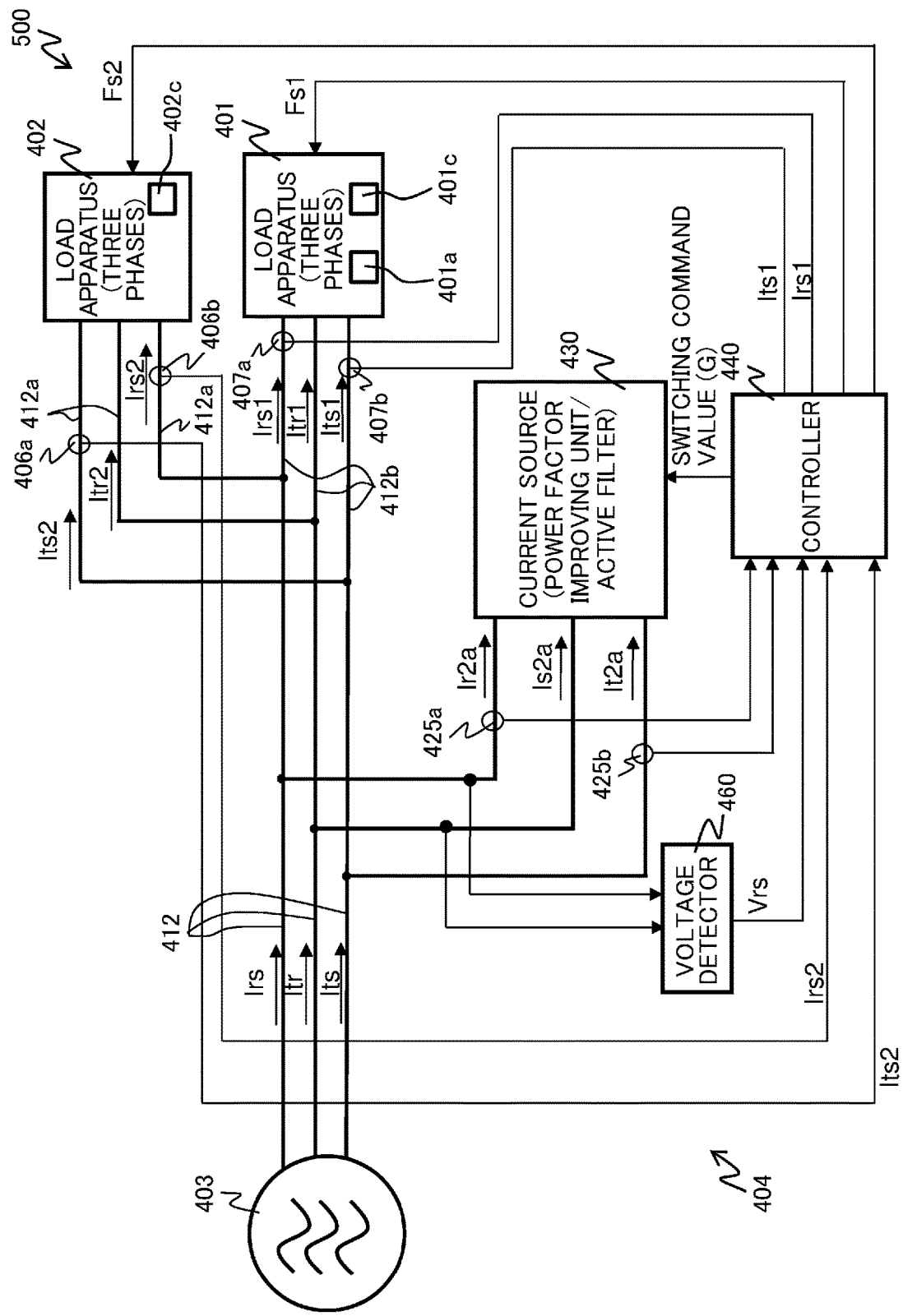
FIG. 17 is a diagram schematically illustrating the configuration of an air conditioning system including an active filter apparatus according to a fifth embodiment.

FIG. 17 is a block diagram illustrating an air conditioning system (500) including an active filter apparatus (404) according to a fifth embodiment, which is a modification example of the third embodiment. The fifth embodiment is different from the third embodiment in that, as illustrated in FIG. 17, first current detectors (406a. 406b, 407a. 407b) are connected to wiring lines (412a, 412b) that connect individual load apparatuses (401, 402) to the points at which output currents (Irs, Itr, Its) of an AC power source (403) branch off to the individual load apparatuses (401, 402) in power reception paths (412). Accordingly, the operation states of the respective load apparatuses (401, 402), for example, whether the load apparatuses (401, 402) are in a maximum load state or a light load state, can be determined.

In FIG. 17, the components corresponding to those in FIG. 13 are denoted by reference numerals, such as "430". The details of these components are similar to those in the third embodiment in FIG. 13. Thus, hereinafter a description will be given of only the points different from the third embodiment.

Specifically, the first current detectors (406a, 406b) are provided corresponding to the T phase and the R phase of the AC power source (403) on the input side of the load apparatus (402). The first current detector (406a) detects an output current (Its2) of the AC power source (403) to be input to the load apparatus (402), and the first current detector (406b) detects an output current (Irs2) of the AC power source (403) to be input to the load apparatus (402). The first current detectors (407a, 407b) are provided corresponding to the R phase and the T phase of the AC power source (403) on the input side of the load apparatus (401). The first current detector (407a) detects an output current (Irs1) of the AC power source (403) to be input to the load apparatus (401), and the first current detector (407b) detects an output current (Its1) of the AC power source (403) to be input to the load apparatus (401).

That is, the first current detectors (406a. 406b) are provided corresponding to the load apparatus (402), and the first current detectors (407a, 407b) are provided corresponding to the load apparatus (401).

The fifth embodiment is different from the third embodiment in that a voltage detector (460) detects only a line-to-line voltage (Vrs) of the AC power source (403) and inputs the line-to-line voltage (Vrs) to a controller (440), as in the above-described fourth embodiment. The controller (440) obtains the phases and amplitudes of the other line-to-line voltages (Vst, Vtr) from the line-to-line voltage (Vrs).

Figure 18:
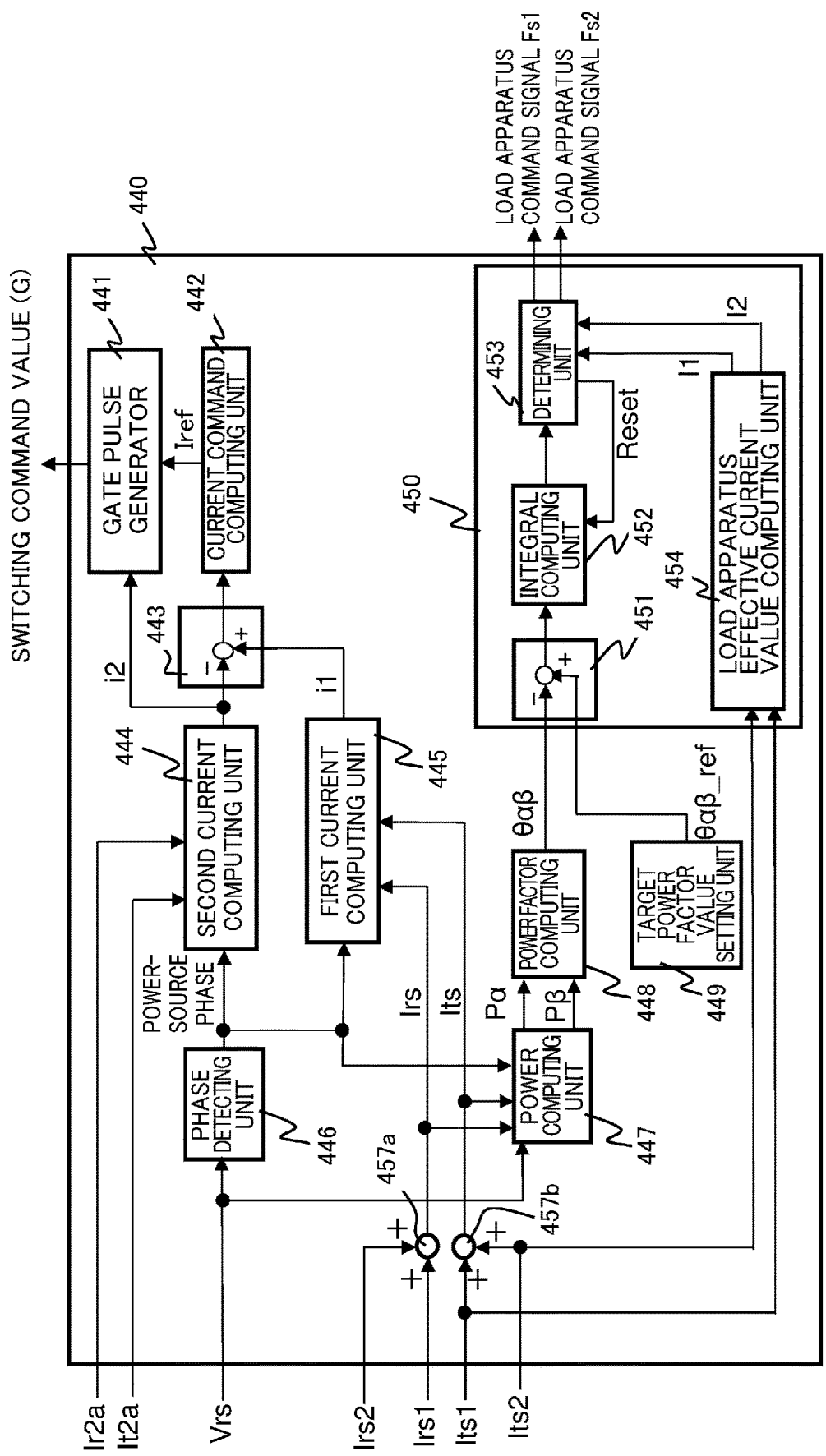
FIG. 18 is a block diagram illustrating an example of a controller according to the fifth embodiment.

Furthermore, the fifth embodiment is different from the third embodiment in that the controller (440) outputs load apparatus command signals (Fs1, Fs2) for the respective load apparatuses (401, 402). An example of the controller (440) is illustrated as a block diagram in FIG. 18. The controller (440) illustrated in FIG. 18 further includes adding units (457a, 457b) in comparison with FIG. 14 according to the third embodiment. A load adjustment determining unit (450) further includes a load apparatus effective current value computing unit (454).

That is, the controller (440) further includes the adding units (457a, 457b) in addition to a phase detecting unit (446), a first current computing unit (445), a second current computing unit (444), a load current computing unit (443), a current command computing unit (442), a gate pulse generator (441), a power computing unit (447), a power factor computing unit (448), a target power factor value setting unit (449), and the load adjustment determining unit (450). The load adjustment determining unit (450) further includes the load apparatus effective current value computing unit (454) in addition to a subtracting unit (451), an integral computing unit (452), and a determining unit (453).

Hereinafter, a description will be given of the configuration of the controller (440) according to the fifth embodiment, regarding only the points different from the controller (240) according to the third embodiment.

The adding unit (457a) adds the detection results (Irs2, Irs1) of the respective first current detectors (406b, 407a) and outputs an addition result as the output current (Irs) of the AC power source (403) to the power computing unit (447) and the first current computing unit (445). The adding unit (457b) adds the detection results (Its2, Its1) of the respective first current detectors (406a, 407b) and outputs an addition result as the output current (Its) of the AC power source (403) to the power computing unit (447) and the first current computing unit (445).

The first current computing unit (445) extracts a harmonic current component and a reactive component of the fundamental from the output currents (Hs, Its) of the AC power source (403), which are the addition results of the respective adding units (457a, 457b), and outputs the extracted components as a first current value (i1).

The power computing unit (447) obtains, from the line-to-line voltage (Vrs) of one phase of the AC power source (403) detected by the voltage detector (460), the line-to-line voltages (Vst, Vtr) of the other phases, and uses, in the above Equations (6) and (7), the line-to-line voltages (Vrs, Vst, Vtr) of the three phases and the output currents (Irs. Its) of the AC power source (403), which are the addition results of the respective adding units (457a, 457b).

The load apparatus effective current value computing unit (454) computes an effective value (I1) of the current flowing through the load apparatus (401) and an effective value (I2) of the current flowing through the load apparatus (402) by using the detection results (Its2, Its1) of the respective first current detectors (406a, 407b) input thereto, and outputs the effective values (I1, I2) to the determining unit (453).

Figure 19:
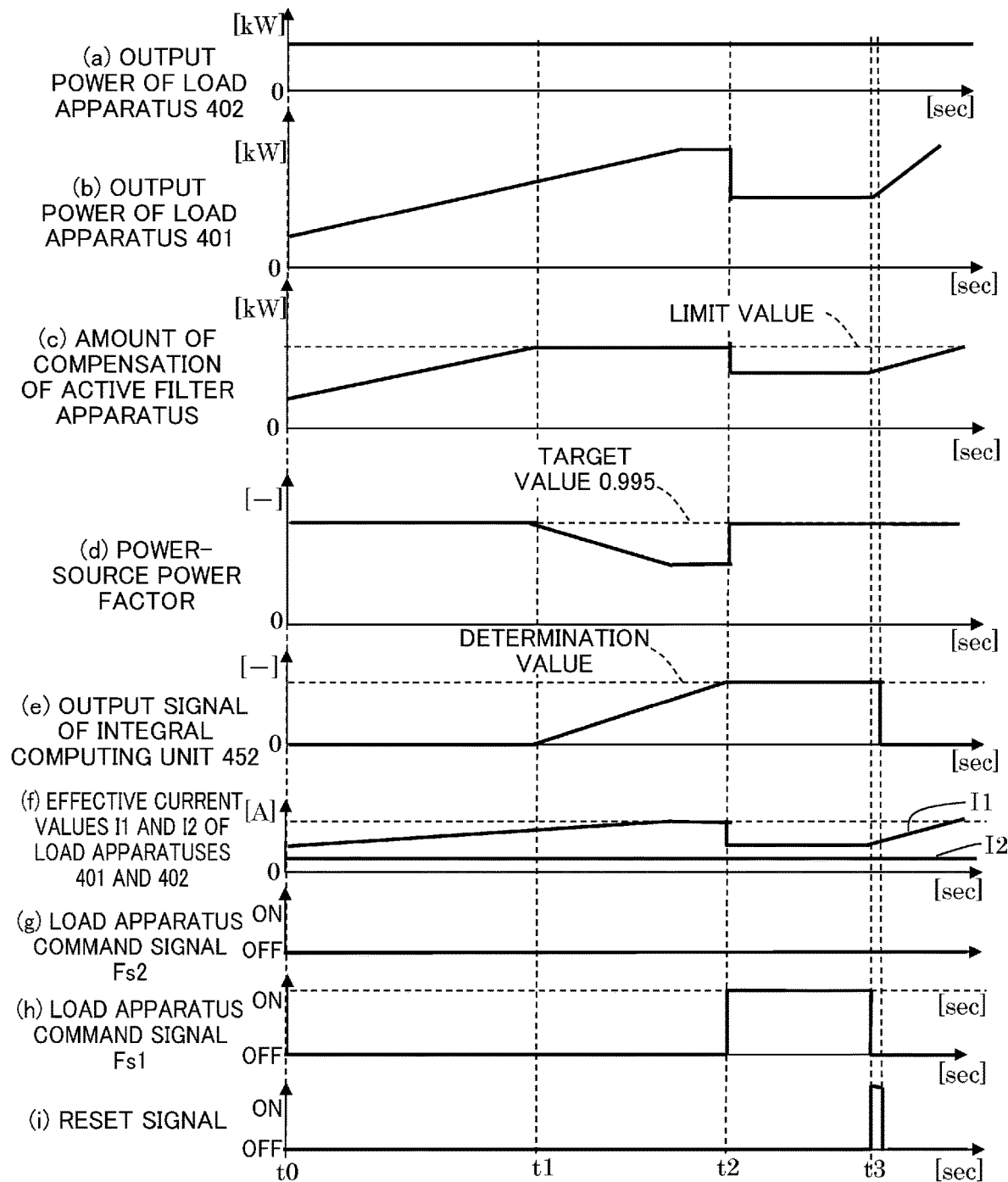
FIG. 19 is a diagram illustrating temporal changes in output powers of respective load apparatuses, an amount of compensation of the active filter apparatus, a power-source power factor, an output signal of an integral computing unit, current values of the respective load apparatuses, load apparatus command signals, and a reset signal according to the fifth embodiment.

The operation of the determining unit (453) will be described with reference to FIG. 19. FIG. 19 illustrates an example of temporal changes in the operations of the load apparatuses (401, 402), the amount of compensation of the active filter apparatus (404), the power-source power factor, and the operation of the load adjustment determining unit (450). FIG. 19(b) to FIG. 19(e) are similar to FIG. 15(b) to FIG. 15(e) of the third embodiment.

As illustrated in FIG. 19(a) and FIG. 19(b), when the output powers of the respective load apparatuses (401, 402) change, the effective current values (I1, I2) of the respective load apparatuses (401, 402) change in the manner illustrated in FIG. 19(f). Specifically, the effective current value (I2) of the load apparatus (402) is constant, whereas the effective current value (I1) of the load apparatus (401) increases from time t0 to immediately before time t2. From time t0 to time t2, the effective current value (I1) of the load apparatus (401) is larger than the effective current value (I2) of the load apparatus (402). Thus, it is understood that the load apparatus (401) uses more power than the load apparatus (402) as seen from the AC power source (403), and it can be estimated that the load apparatus (401) contributes more than the load apparatus (402) to a decreased power-source power factor in FIG. 19(d).

With use of the above, the determining unit (453) outputs the load apparatus command signals (Fs1, Fs2) illustrated in FIG. 19(g) and FIG. 19(h) at or after time t2 at which the output signal of the integral computing unit (452) reaches a determination value. Specifically, the determining unit (453) keeps an output stop state (OFF state) for the load apparatus command signal (Fs2) for providing a command to the load apparatus (402), as illustrated in FIG. 19(g), but outputs the load apparatus command signal (Fs1) for providing a command to the load apparatus (401) from time t2 to time t3 (ON state), as illustrated in FIG. 19(h), thereby decreasing the operation parameter for changing the operation state of only the load apparatus (401).

Accordingly, from time t2 to time t3, the operation state of the load apparatus (402) does not change from the state at and before time t2, and thus the output power and the effective current value (I2) of the load apparatus (402) do not change. On the other hand, the operation state from time t2 to time t3 of the load apparatus (401), which highly contributes to a decreased power-source power factor, changes such that the operation capability of the load apparatus (401) decreases. Accordingly, the output power and the effective current value (I1) of the load apparatus (401) become lower than those in the state immediately before the load apparatus command signal (Fs1) is output. Accordingly, the amount of compensation of the active filter apparatus (404) decreases below that in the state immediately before the load apparatus command signal (Fs1) is output (i.e., the limit value) from time t2 to time t3, and a margin is generated in the amount of compensation.

In this way, the controller (440) according to the fifth embodiment determines a target whose operation capability is to be decreased from among the load apparatuses (401, 402), based on the detection results of the first current detectors (406a, 406b, 407a, 407b) or the like. In FIG. 19, the target is determined to be the load apparatus (401). The operation parameter of the determined target is adjusted to decrease the operation capability of the determined target, and the fundamental power factor approaches the target value θαβ_ref of the power factor. Accordingly, the number of load apparatuses as a target whose operation capability is to be decreased can be minimized, and the operation state of the load apparatus whose operation capability is not to be decreased can be maintained.

The operation other than the above-described operation is similar to that of the third embodiment.

<Advantages>

According to the fifth embodiment, in the power system in which the plurality of load apparatuses (401, 402) are connected, the operation capabilities of the load apparatuses (401, 402) can be individually decreased. This makes it possible to suppress an unnecessary decrease in the operation capabilities of the load apparatuses (401, 402) as much as possible.

The fifth embodiment produces advantages similar to those of the third embodiment, and enables a reduction in harmonic current and an improvement in fundamental power factor without an unnecessary increase in the cost of the active filter apparatus (404).

Sixth Embodiment

Figure 20:
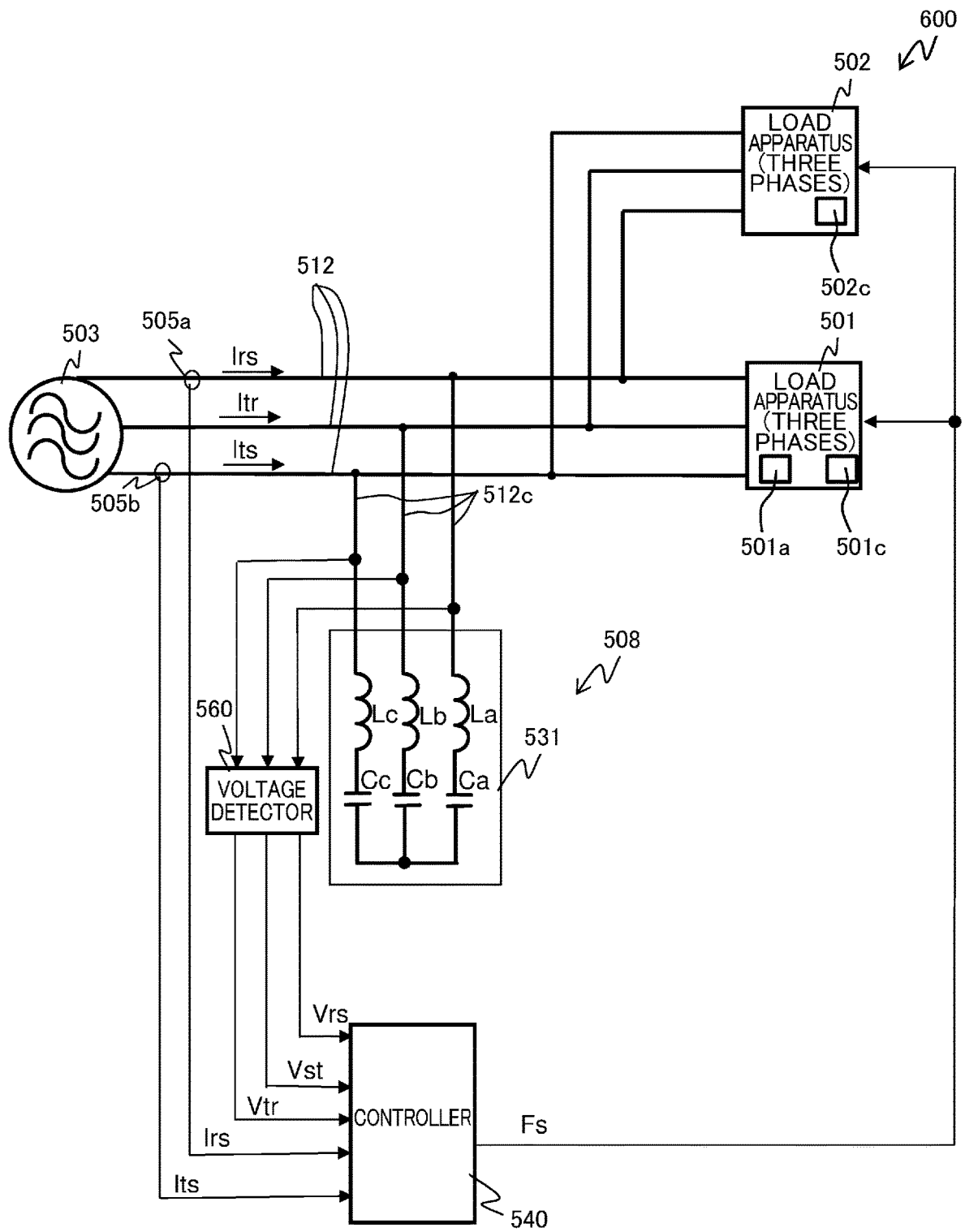
FIG. 20 is a diagram schematically illustrating the configuration of an air conditioning system including a phase modifying facility according to a sixth embodiment.

FIG. 20 is a block diagram of an air conditioning system (600) including a phase modifying facility (508) according to a sixth embodiment, which is a modification example of the third embodiment. The sixth embodiment is different from the third embodiment in that the phase modifying facility (508) is provided as a phase modifying apparatus, instead of the active filter apparatus (204).

The phase modifying facility (508) includes a phase modifier (531) (corresponding to the power factor improving unit) that changes the phase of a harmonic current of load apparatuses (501, 502) to improve a fundamental power factor, as well as first current detectors (505a, 505b) and a voltage detector (560) that are similar to those of the third embodiment.

The phase modifier (531) is attached to improve the power factor of the entire structure, is connected in parallel to the load apparatuses (501, 502) with respect to an AC power source (503), and controls reactive power of the AC power supplied to the individual load apparatuses (501, 502). The phase modifier (531) includes a plurality of phase advancing capacitors (Ca, Cb, Cc) and a plurality of reactors (La, Lb, Lc). The phase advancing, capacitors (Ca, Cb, Cc) are connected in series on respective branch lines (512c) extending to the phase modifying facility (508) of power reception paths (512). The three phase advancing capacitors (Ca, Cb, Cc) are provided corresponding to the respective phases of the three-phase AC power source (503). The three reactors (La, Lb. Lc) are provided corresponding to the respective phase advancing capacitors (Ca, Cb, Cc), and the reactors (La, Lb, Lc) are connected in series to the respective phase advancing capacitors (Ca, Cb, Cc).

In the sixth embodiment, the phase modifier (531) includes not only the phase advancing capacitors (Ca, Cb, Cc) but also the reactors (La, Lb, Lc) because the reactors (La, Lb, Lc) are capable of reducing the magnitude of the current flowing through the phase modifier (531) if the phase advancing capacitors (Ca, Cb, Cc) are broken by a short circuit.

Figure 21:
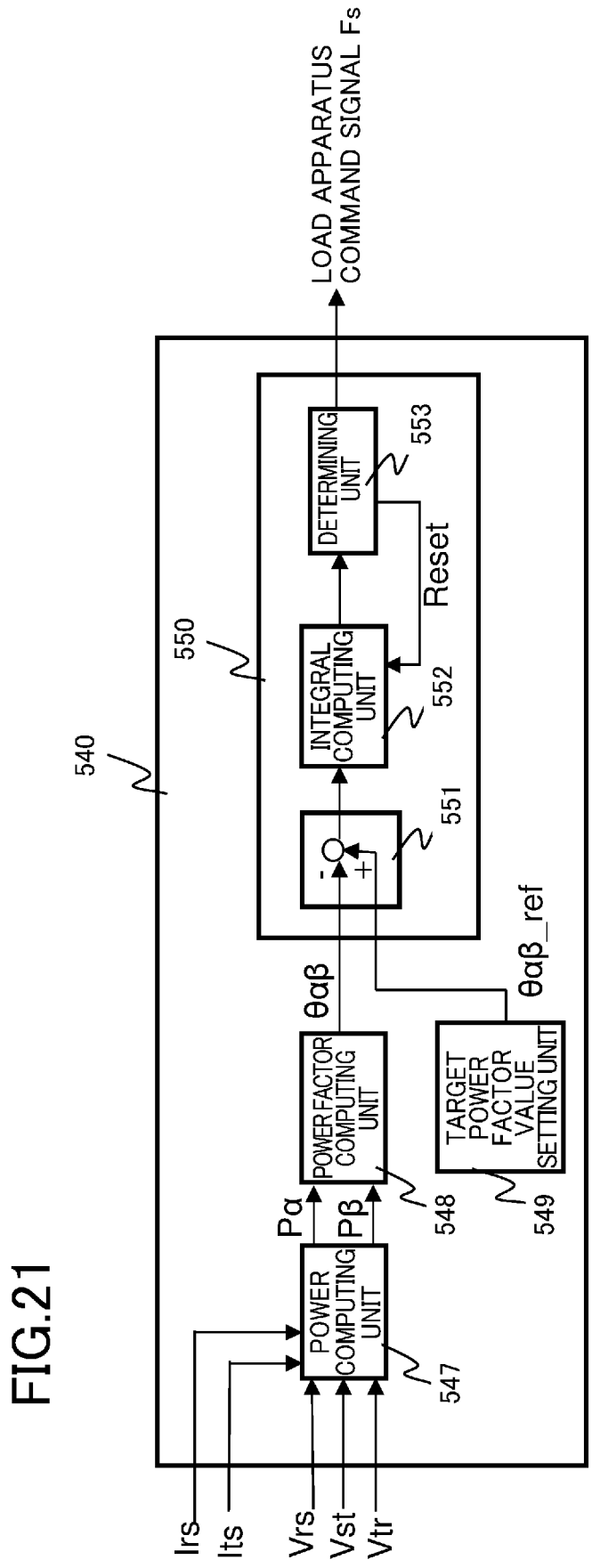
FIG. 21 is a block diagram illustrating an example of a controller according to the sixth embodiment.

The phase modifying facility (508) according to the sixth embodiment further includes a controller (540) having the configuration illustrated in FIG. 21. As illustrated in FIG. 21, the controller (540) is constituted only by functional units that performs adjustment control on the operation states of the respective load apparatuses (501, 502) (a power computing unit (547), a power factor computing unit (548), a target power factor value setting unit (549), and a load adjustment determining unit (550) in FIG. 21), with functional units that performs adjustment control on the output current of the current source (230) in FIG. 14 according to the third embodiment (the gate pulse generator (241), the current command computing unit (242), the load current computing unit (243), the second current computing unit (244), the first current computing unit (245), and the phase detecting unit (246) in FIG. 14) being omitted. The load adjustment determining unit (550) includes a subtracting unit (551), an integral computing unit (552), and a determining unit (553) similarly to FIG. 14. The operation of adjustment control on the operation states of the respective load apparatuses (501, 502) performed by the controller (540) is similar to that of the third embodiment, and thus the detailed description is omitted here.

The controller (540) may be provided separately from the phase modifying facility (508). In this case, given that the controller (540) has a function of adjusting the operation capabilities of the load apparatuses (501, 502) and a function of computing a power-source power factor, it is preferable that the controller (540) be installed in a management room or central management room where the power in the entire building or the like is managed.

<Advantages>

The air conditioning system (600) according to the sixth embodiment includes the phase modifying facility (508) including the phase modifier (531) that changes the phases of the load apparatuses (501, 502) to improve the fundamental power factor. In the phase modifying facility (508), the controller (540) performs adjustment control on the operation states of the respective load apparatuses (501, 502) similarly to the third embodiment while reducing the current capacities of the phase advancing capacitors (Ca, Cb, Cc). Accordingly, the power factors of the load apparatuses (501, 502) can be kept high and thus the fundamental power factor can be improved as quickly as possible. In addition, measures against harmonics are taken without problems, with the size and cost of the phase modifying facility (508) being reduced.

In the sixth embodiment, the phase modifier (531) includes the phase advancing capacitors (Ca, Cb, Cc) and the reactors (La, Lb, Lc). Accordingly, even if a short-circuit failure occurs in the phase advancing capacitors (Ca, Cb, Cc), the magnitude of the current flowing through the phase modifier (531) can be reduced by the reactors (La, Lb, Lc). Thus, when a short-circuit failure occurs, for example, a situation can be prevented from occurring where a large current transiently flows through the phase modifier (531), the current also affects a component other than the phase modifier (531), and a serious failure occurs.

The sixth embodiment produces the advantages described in the above-described third embodiment.

<Modification Examples of Third to Sixth Embodiments>

The phase modifying facility (508) according to the above-described sixth embodiment may adopt a configuration in which the power meter (9) is provided instead of the first current detectors (505a, 505b), similarly to the above-described first embodiment. In this case, the controller (540) has a configuration in which the functional units used to compute the power-source power factor θαβ (the power computing unit (547) and the power factor computing unit (548)) in FIG. 21 are omitted, similarly to FIG. 2 of the first embodiment.

In the above-described third to sixth embodiments, a plurality of phase modifying apparatuses (active filter apparatuses or phase modifying facilities) may be provided for one load apparatus. In this case, the phase modifying apparatuses may share a compensating current in accordance with the current capacities of the respective phase modifying apparatuses.

In a case where a so-called smart meter that transmits information about electricity usage or the like to an electric power company or the like is installed in advance in a structure, such as a building or a factory, the smart meter may be used as the first current detectors according to the above-described third to sixth embodiments.

In the above-described sixth embodiment, the phase modifier (531) may include only the phase advancing capacitors (Ca, Cb, Cc).

In the above-described third to sixth embodiments, a load apparatus is not limited to an air conditioning apparatus and may be, for example, an elevator, a fan, a pump, an escalator, a lighting apparatus driven by a three-phase power source, or the like provided in a building or the like.

In the above-described third to sixth embodiments, the first current detectors and the second current detectors need not be of a type of wirelessly transmitting a detection result. The first current detectors and the second current detectors need not be of a type of operating with a non-power-source scheme.

In the above-described third to fifth embodiments, the active filter apparatus may be incorporated in a load apparatus.

In a case where a load apparatus is an air conditioning apparatus, the air conditioning apparatus is not limited to an apparatus that performs only cooling and heating. The air conditioning apparatus includes an apparatus capable of performing freezing, ventilation, and humidity control.

Seventh Embodiment

<Configuration of Air Conditioning System (700)>

Figure 22:
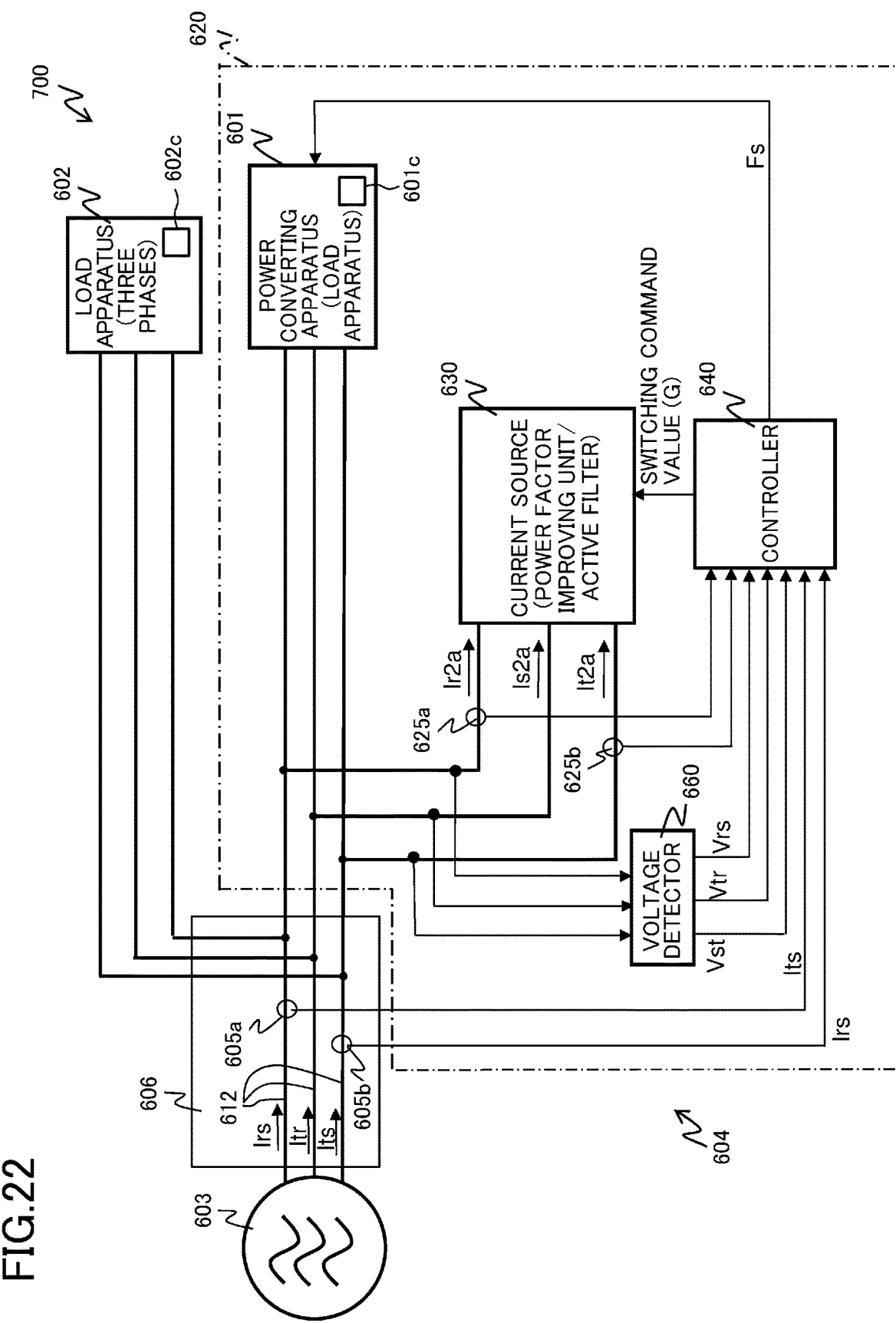
FIG. 22 is a diagram schematically illustrating the configuration of an air conditioning system including an active filter apparatus according to a seventh embodiment.

FIG. 22 is a block diagram illustrating the configuration of an air conditioning system (700) according to a seventh embodiment. The air conditioning system (700) is installed in an apartment, a factory, a building, a detached house, or the like (hereinafter a building or the like). In this example, the air conditioning system (700) includes a plurality of load apparatuses (601, 602) and an active filter apparatus (604). In particular, most of the components of the active filter apparatus (604), specifically the components except for first current detectors (605a, 605b), are provided in an air conditioning apparatus (620) together with the power converting apparatus (601), which is a load apparatus. The air conditioning apparatus (620) performs indoor air conditioning (cooling and heating).

The above-described building or the like is supplied with power from a power system including an AC power source (603). In this example, the AC power source (603) is a three-phase AC power source (for example, a three-phase commercial power source), and supplies power to the plurality of load apparatuses (601, 602) in a branching manner. The building or the like is provided with a distribution switchboard (606) that is connected to the AC power source (603) and receives AC power from the AC power source (603). The distribution switchboard (606) includes a plurality of breakers, and causes the AC power from the AC power source (603) to branch off to a plurality of apparatuses through the respective breakers. In this example, the air conditioning apparatus (620) is connected to one of the breakers. The air conditioning apparatus (620) is operated by the AC power supplied through the distribution switchboard (606).

The load apparatus (602) is connected to one of the plurality of breakers of the distribution switchboard (606). In this example, a case is taken as an example where the load apparatus (602) is an apparatus including a circuit that can be a source of a harmonic current such as an inverter circuit (the apparatus is referred to as a harmonic generating load apparatus). Examples of the load apparatus (602) include an elevator, a fan, a pump, an escalator, a lighting apparatus driven by a three-phase power source, an air conditioning, apparatus that is different from the air conditioning apparatus (620) and that does not have measures against harmonics such as an active filter, and the like provided in the building or the like.

The load apparatuses (601, 602) respectively include adjusting units (601c, 602c) connected to a controller (640) (corresponding to the operation state control unit). The adjusting units (601c, 602c) are each configured using a microcomputer and a memory device storing a program for operating the microcomputer. The adjusting units (601c, 602c) control, based on a load apparatus command signal Fs (described below) output from the controller (640), the respective load apparatuses (601, 602).

<Air Conditioning Apparatus (620)>

The air conditioning apparatus (620) includes a refrigerant circuit (not illustrated) including a compressor and the power converting apparatus (601) and includes, incorporated therein, main components of the active filter apparatus (604) (specifically the components except for the first current detectors (605a, 605b)).

The refrigerant circuit is configured by connecting a compressor, an outdoor heat exchanger, an expansion mechanism, and an indoor heat exchanger by a refrigerant pipe. The refrigerant circuit is charged with refrigerant. Circulation of the refrigerant throughout the refrigerant circuit causes the inside of a room to be cooled or heated.

The power converting apparatus (601) is a load apparatus connected to the AC power source (603) and corresponds to a harmonic generating load apparatus. The power converting apparatus (601) is connected to the AC power source (603) through the distribution switchboard (606). Although not illustrated, the power converting apparatus (601) includes a converter circuit and an inverter circuit. When supplied with AC power from the AC power source (603), the power converting apparatus (601) converts the AC power to power having a desired frequency and a desired voltage and supplies the converted power to the compressor (more specifically, the electric motor included in the compressor). Accordingly, the compressor operates and the refrigerant circuit functions. As a result, indoor air conditioning is performed.

When the power converting apparatus (601) or the electric motor of the compressor operates in the air conditioning apparatus (620), a harmonic current may be generated. The harmonic current may flow out to the AC power source (603) through a current path for supplying power from the distribution switchboard (606) to the air conditioning apparatus (620). As described above, a harmonic current may flow out to the AC power source (603) not only from the power converting apparatus (601) but also from the load apparatus (602), which is a harmonic generating load apparatus, through a current path for supplying power to the load apparatus (602).

In general, the flow-out level of such a harmonic current to the AC power source (603) side is restricted. Thus, in the air conditioning system (700) according to the seventh embodiment, the harmonic current is reduced by the active filter apparatus (604). Furthermore, the active filter apparatus (604) according to the seventh embodiment has a function of improving a fundamental power factor under circumstances where an improvement in the fundamental power factor at power distribution/reception ends is required from the viewpoints of installed capacity and energy saving.

Hereinafter, the configuration of the active filter apparatus (604) will be described.

<Active Filter Apparatus (604)>

The active filter apparatus (604) is connected to the AC power source (603) and has a function of cancelling out a harmonic current that flows out from the load apparatuses (601, 602), which are harmonic generating load apparatuses. That is, the active filter apparatus (604) causes a compensating current to flow so that the waveforms of the currents in the current paths of the AC power source (603) (hereinafter, power reception paths (612)) become closer to a sinusoidal waveform. More specifically, the active filter apparatus (604) generates a compensating current having a phase opposite to that of the harmonic current appearing in the power reception paths (612), and supplies the compensating current to the power reception paths (612).

As a result of causing the above-described compensating current to flow, the active filter apparatus (604) improves a fundamental power factor. In this example, the active filter apparatus (604) is configured to cause a compensating current for compensating for a reactive component of the fundamental to flow, thereby improving the fundamental power factor.

The harmonic current generated in the power converting apparatus (601), which is a load apparatus, may be the largest when the load of the air conditioning apparatus (620) is the largest (for example, at the maximum output in a cooling operation). The same applies to the harmonic current generated in the load apparatus (602) when it is assumed that the load apparatus (602) is an air conditioning apparatus.

Thus, in general, the capability (the amount of power that can be generated), that is, the capacity, of the active filter apparatus (604) is set by assuming the harmonic current when all the load apparatuses (601, 602) simultaneously have the maximum load. However, the load apparatuses (601, 602) are used at a load smaller than the maximum load more often than used at the maximum load. Thus, the active filter apparatus (604) having the above-described capability set thereto may be mostly in a state where the capability thereof is redundant, if the capability is used only to improve the power factor by taking measures against the harmonic current of the load apparatuses (601, 602).

Thus, in the seventh embodiment, the capability (i.e., the capacity) of the active filter apparatus (604) is set to be lower than a general capability described above. For example, the capability (i.e., the capacity) of the active filter apparatus (604) is set to about 80%, with the capability of coping with the harmonic current when all the load apparatuses (601, 602) simultaneously have the maximum load being 100%. The active filter apparatus (604) becomes more expensive as the capability (i.e., the capacity) thereof increases. In the seventh embodiment, the capability is set to be relatively low, and thus the cost of the active filter apparatus (604) can be reduced.

The active filter apparatus (604) according to the seventh embodiment performs control to exhibit the function of improving the power factor by taking measures against the harmonic current without problems although the capability thereof is relatively low, which will be described below.

To implement the above-described function, the active filter apparatus (604) according to the seventh embodiment includes, as illustrated in FIG. 22, a current source (630), the first current detectors (605a, 605b) (corresponding to the current detecting unit), second current detectors (625a, 625b), a voltage detector (660), and the controller (640)

—Current Source—

The current source (630) is a so-called active filter that improves the fundamental power factor by generating a current for reducing a harmonic current and improving the fundamental power factor (i.e., a compensating current).

An output terminal of the current source (630) is connected to the power reception paths (612) of the load apparatuses (601, 602), and a generated compensating current is output to the power reception paths (612). Specifically, the current source (630) is connected in parallel to the load apparatuses (601, 602) with respect to the AC power source (603).

Although not illustrated, the current source (630) according to the seventh embodiment is configured using a so-called inverter circuit. A switching command value (G), which will be described below, is input to the current source (630) from the controller (640). The current source (630) performs switching in accordance with the switching command value (G) to generate a compensating current.

—First Current Detectors—

The first current detectors (605a, 605b) detect current values in the power reception paths (612) of the AC power source (603). Specifically, the first current detectors (605a, 605b) detect the values of output currents output from the AC power source (603) before the output currents branch off to the current source (630) and the individual load apparatuses (601, 602).

In this example, the two first current detectors (605a, 605b) are provided. Specifically, the first current detector (605a) detects an R-phase current value (Irs) in the AC power source (603). The first current detector (605b) detects a T-phase current value (Its) in the AC power source (603). The detection results of the respective first current detectors (605a, 605b) are transmitted to the controller (640).

The configurations of the respective first current detectors (605a, 605b) are not particularly limited. For example, a current transformer may be adopted thereto.

The first current detectors (605a, 605b) are each configured to wirelessly transmit a detection result to the controller (640). The distance between the AC power source (603) and the active filter apparatus (604) may be 20 to 30 m. Thus, if the first current detectors (605a, 605b) are connected to the active filter apparatus (604) by wiring lines, the wiring run length is long, and a great deal of time and effort is required to connect the first current detectors (605a, 605b) and the active filter apparatus (604). In contrast, in the seventh embodiment, the detection results of the first current detectors (605a. 605b) are wirelessly transmitted to the controller (640). This eliminates the necessity of the wiring lines and the necessity of installing the wiring lines.

A phenomenon in which the magnetic fluxes passing through the first current detectors (605a, 605b) are changed with time by the currents flowing through the first current detectors (605a, 605b) is called electromagnetic induction. An induced electromotive force, which is an electromotive force generated by the electromagnetic induction, may be used as a power source for driving the first current detectors (605a, 605b) (for example, a power source for communication). Accordingly, the first current detectors (605a, 605b) can operate with a non-power-source scheme (i.e., operate without connecting the first current detectors (605a, 605b) to an external power source), and it becomes unnecessary to connect the first current detectors (605a, 605b) to an external power source.

In particular, the first current detectors (605a, 605b) are installed inside the distribution switchboard (606), as illustrated in FIG. 22. This prevents the first current detectors (605a. 605b) from being exposed to rain or wind and suppresses degradation of the first current detectors (605a, 605b). Thus, it is possible to establish an environment that does not shorten the lives of the first current detectors (605a, 605b).

—Second Current Detectors—

The second current detectors (625a. 625b) detect current values to be input to the current source (630) (hereinafter referred to as current values (Ir2a. It2a)).

In this example, the two second current detectors (625a, 625b) are provided. The second current detector (625a) detects an R-phase current value (Ir2a) to be input to the current source (630) from the AC power source (603), and the second current detector (625b) detects a T-phase current value (It2a) to be input to the current source (630) from the AC power source (603). The current values (Ir2a, It2a) detected by the respective second current detectors (625a. 625b) are transmitted to the controller (640).

The configurations of the respective second current detectors (625a, 625b) are not particularly limited. For example, a current transformer may be adopted thereto.

The second current detectors (625a, 625b) may respectively transmit the current values (Ir2a. It2a) in a wired or wireless manner.

Like the above-described first current detectors (605a, 605b), the second current detectors (625a. 625b) may be configured to operate with a non-power-source scheme.

FIG. 22 illustrates an example in which the two second current detectors (625a, 625b) are provided corresponding to the currents (Ir2a, It2a) of the two phases of the currents (Ir2a, Is2a, It2a) of the three phases to be input to the current source (630). Alternatively, three second current detectors may be provided corresponding to the currents (Ir2a, Is2a, It2a) of the three phases.

—Voltage Detector—

The voltage detector (660) is connected to the output terminals of the AC power source (603). The voltage detector (660) is a sensor that detects line-to-line voltages (Vrs, Vtr, Vst) of the AC power source (603).

—Controller—

The controller (640) is configured using a microcomputer and a memory device storing a program for operating the microcomputer. As illustrated in FIG. 22, the controller (640) is connected to the current source (630), the first current detectors (605a, 605b), the second current detectors (625a, 625b), the voltage detector (660), and the power converting apparatus (601), which is a load apparatus, and controls, based on the detection results of the respective detectors (605a, 605b, 625a, 625b, 660), the operations of the current source (630) and the power converting apparatus (601).

The controller (640) according to the seventh embodiment performs adjustment control on the output current of the current source (630), and adjustment control on the operation state of the power converting apparatus (601) based on the actual power-source power factor of the AC power source (603) (specifically, adjustment control on the operation parameter for changing the operation state). To perform such control, the controller (640) includes, as exemplified as a block diagram in FIG. 23, a phase detecting unit (646), a first current computing unit (645), a second current computing unit (644), a load current computing unit (643), a current command computing unit (642), a gate pulse generator (641), a power computing unit (647), a power factor computing unit (648), a target power factor value setting unit (649), and a load adjustment determining unit (650). The load adjustment determining unit (650) includes a subtracting unit (651), an integral computing unit (652), and a determining unit (653).

The adjustment control on the output current of the current source (630) is mainly performed by the phase detecting unit (646), the first current computing unit (645), the second current computing unit (644), the load current computing unit (643), the current command computing unit (642), and the gate pulse generator (641) among these units. The adjustment control on the operation state of the power converting apparatus (601) based on the actual power-source power factor of the AC power source (603) is performed by the power computing unit (647), the power factor computing unit (648), the target power factor value setting unit (649), and the load adjustment determining unit (650).

<Adjustment Control on Output Current of Current Source (630)>

The phase detecting unit (646) receives the line-to-line voltage (Vrs) of one phase of the line-to-line voltages (Vrs, Vst, Vtr) of the AC power source (603) detected by the voltage detector (660). The phase detecting unit (646) detects the phase of the power-source voltage in the power reception paths (612) by using the received line-to-line voltage (Vrs), and outputs the detected phase to the first current computing unit (645) and the second current computing unit (644).

The first current computing unit (645) receives the phase of the power-source voltage detected by the phase detecting unit (646) and the output currents (Irs, Its) of the AC power source (603) detected by the first current detectors (605a, 605b). Based on the phase of the power-source voltage and the output currents (Irs, Its) of the AC power source (603) that have been received, the first current computing unit (645) obtains a current (a first current value (i1)) that is necessary to perform both compensation for a harmonic current (reduction of a harmonic current) and compensation for a reactive component of the fundamental (improvement in the fundamental power factor), and outputs the first current value (i1) to the load current computing unit (643). More specifically, the first current computing unit (645) extracts, from the detection results (the current values (Irs, Its)) of the first current detectors (605a, 605b), a harmonic current component and a reactive component of the fundamental, and outputs them as the first current value (i1).

The second current computing unit (644) receives the phase of the power-source voltage detected by the phase detecting unit (646) and the current values (Ir2a, It2a) that have been detected by the second current detectors (625a, 625b) and that are to be input to the current source (630). Based on the phase of the power-source voltage and the current values (Ir2a, It2a) that have been received, the second current computing unit (644) obtains a current (a second current value (i2)) flowing into the active filter apparatus (604) that is performing both compensation for a harmonic current (reduction of a harmonic current) and compensation for a reactive component of the fundamental (improvement in the fundamental power factor) at the present, and outputs the second current value (i2) to the load current computing unit (643). More specifically, the second current computing unit (644) extracts, from the detection results (the current values (Ir2a, It2a)) of the second current detectors (625a, 625b), a harmonic current component and a reactive component of the fundamental, and outputs them as the second current value (i2).

The load current computing unit (643) calculates the currents flowing through the power converting apparatus (601) and the load apparatus (602), which are harmonic generating load apparatuses. By subtracting the current values (Ir2a, Is2a, It2a) of the respective phases input to the current source (630) of the active filter apparatus (604) from the output current values (Irs, Itr, Its) of the respective phases of the AC power source (603), the sum of the currents flowing through the respective load apparatuses (601, 602) is obtained. With use of this, in the seventh embodiment, harmonics generated in the individual load apparatuses (601, 602) are suppressed to improve the fundamental power factor at the power distribution/reception ends near the AC power source (603) and reduce the harmonic current. Specifically, in the seventh embodiment, the load current computing unit (643) obtains the sum of the currents flowing through the respective load apparatuses (601, 602) by subtracting the second current value (i2) of the second current computing unit (644) from the first current value (i1) of the first current computing unit (645), and outputs the obtained computation result to the current command computing unit (642).

The current command computing unit (642) computes the current value of the opposite phase of the computation result of the load current computing unit (643), and outputs the value as a current command value (Iref) to the gate pulse generator (641).

The gate pulse generator (641) generates a switching command value (G) for providing a command for switching in the inverter circuit constituting the current source (630). Specifically, the gate pulse generator (641) performs so-called feedback control of repeating an operation of generating a switching command value (G) in accordance with the difference between the current value output from the current source (630) and the above-described current command value (Iref). Accordingly, the current source (630) supplies a current (compensating current) corresponding to the current command value (Iref) to the power reception paths (612). More specifically, the gate pulse generator (641) generates a switching command value (G) that causes the second current value (i2) obtained by the second current computing unit (644) to match the current command value (Iref), and outputs the switching command value (G) to the current source (630). Accordingly, the harmonic component included in the currents flowing through the load apparatuses (601, 602) and the current output from the active filter apparatus (604) are cancelled out, the output currents (Irs, Itr, Its) of the AC power source (603) become sine-wave currents from which a harmonic current has been removed, and the power factor is improved.

<Adjustment Control on Operation State of Power Converting Apparatus (601)>

The power computing unit (647) receives the line-to-line voltages (Vrs, Vtr, Vst) of the three phases of the AC power source (603) detected by the voltage detector (660) and the output currents (Irs, Its) of the AC power source (603) detected by the first current detectors (605a, 605b). The power computing unit (647) applies these received values to the following Equations (11) and (12), thereby computing voltages Vα and Vβ and currents iα and iβ of two rotation axes (αβ axes).

[Math. 11]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (11)$$

[Math. 12]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (12)$$

Subsequently, the power computing unit (647) applies the voltages Vα and Vβ and the currents iα and iβ of the two rotation axes (αβ axes) obtained from the above Equations (11) and (12) to the following Equation (13), thereby computing an active power Pα. Also, the power computing unit (647) applies the voltages Vα and Vβ and the currents iα and iβ of the two rotation axes (αβ axes) obtained from above Equations (11) and (12) to the following Equation (14), thereby computing a reactive power Pβ.

[Math. 13]

$$P\alpha = V\alpha \times i\alpha + V\beta \times i\beta \quad (13)$$

[Math. 14]

$$P\beta = V\alpha \times i\beta - V\beta \times i\alpha \quad (14)$$

The power factor computing unit (648) applies the active power Pα and the reactive power Pβ obtained by the power computing unit (647) to the following Equation (15), thereby computing the power-source power factor θαβ of the AC power source (603). That is, the power-source power factor θαβ obtained by the power factor computing unit (648) means the actual power-source power factor θαβ.

[Math. 15]

$$\theta\alpha\beta = \frac{P\alpha}{\sqrt{(P\alpha)^2 + (P\beta)^2}} \quad (15)$$

The target power factor value setting unit (649) sets in advance a target value θαβ_ref of the power factor. The target power factor value setting unit (649) according to the seventh embodiment sets the target value θαβ_ref of the power factor to a value of 0.995 to 1.004. In the case of evaluating the power-source power factor, the value thereof is to be rounded off at the third decimal place. Thus, when the target value θαβ_ref of the power factor is set to a value of 0.995 to 1.004, the actual power-source power factor controlled based on the target value θαβ_ref of the power factor is evaluated as "1".

The subtracting unit (651) of the load adjustment determining unit (650) receives the actual power-source power factor θαβ obtained by the power factor computing unit (648) and the target value θαβ_ref of the power factor set by the target power factor value setting unit (649). The subtracting unit (651) subtracts the actual power-source power factor θαβ from the target value θαβ_ref of the power factor. The subtracting unit (651) outputs a value obtained through the subtraction to the integral computing unit (652).

The integral computing unit (652) integrates the subtraction result of the subtracting unit (651) (i.e., the result obtained by subtracting the actual power-source power factor θαβ from the target value θαβ_ref of the power factor).

The determining unit (653) receives the integration result of the integral computing unit (652). Based on the integration result, the determining unit (653) controls the operation parameters for changing the operation states of the load apparatuses (601, 602) such that the fundamental power factor approaches the target value θαβ_ref of the power factor. Specifically, the determining unit (653) outputs, to the power converting apparatus (601), which is a load apparatus, a load apparatus command signal Fs for adjusting the operation parameters and decreasing the operation capabilities of the load apparatuses (601, 602), to cause the fundamental power factor (power-source power factor) to approach the target value θαβ_ref of the power factor. When the operation capability of the power converting apparatus (601) is decreased by the load apparatus command signal Fs, a margin is generated in the compensation capability of the active filter apparatus (604), and the fundamental power factor increases to substantially match the target value θαβ_ref of the power factor.

Here, the operation parameter includes at least one of the power of the power converting apparatus (601), which is a load apparatus, the current of the power converting apparatus (601), the rotational speed of the electric motor, and the like.

Figure 24:
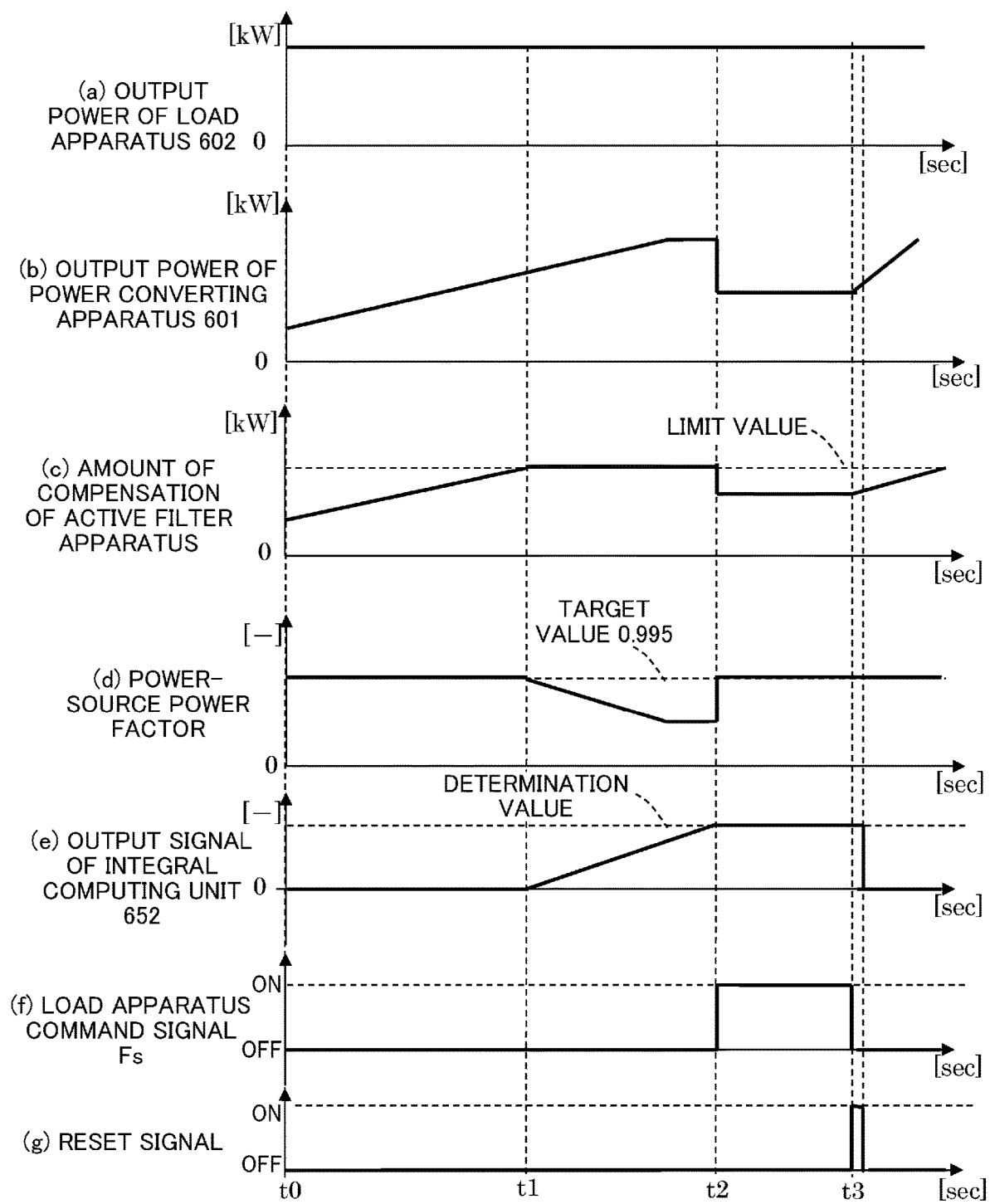
FIG. 24 is a diagram illustrating temporal changes in output powers of respective load apparatuses, an amount of compensation of the active filter apparatus, a power-source power factor, an output signal of an integral computing unit, a load apparatus command signal, and a reset signal according to the seventh embodiment.

FIG. 24 illustrates an example of temporal changes in the operations of the load apparatus (602) and the power converting apparatus (601), the amount of compensation of the active filter apparatus (604), the power-source power factor, and the operation of the load adjustment determining unit (650). FIG. 24(a) illustrates the output power correlated to the operation of the load apparatus (602). In this example, it is assumed that the load apparatus (602) is a constant load, such as a pump. FIG. 24 (b) illustrates the output power correlated to the operation of the power converting apparatus (601). It is assumed that the load apparatus (602), which is not the target to be controlled, stably operates with a constant output power regardless of time. In contrast, from time t0 to time t2, the power converting apparatus (601) continuously increases the output power with an increase in air conditioning, load. It is assumed that the period from time t0 to time t2 is daytime (14:00 to 15:00) of the hottest day of mid-summer, when an outside temperature is abnormally high and the air conditioning load suddenly increases.

FIG. 24(c) illustrates the amount of compensation of the active filter apparatus (604) by power. From time t0 to time t1, the amount of compensation of the active filter apparatus (604) increases with an increase in the output power of the power converting apparatus (601). That is, from time t0 to time t1, the active filter apparatus (604) compensates for an increase in the output power of the power converting apparatus (601). Thus, from time t0 to time t1, the power-source power factor illustrated in FIG. 24(d) is substantially maintained at the target value.

However, at and after time t1, the output power of the power converting apparatus (601) continues increasing, but the amount of compensation of the active filter apparatus (604) reaches a limit value at time t1 and is kept constant at the limit value thereafter. Thus, at and after time t1, the power-source power factor decreases from the target value in contrast to the increase in the output power of the power converting apparatus (601). This is because, although the output power of the power converting apparatus (601) increases, the compensation capability of the active filter apparatus (604) has already reached the limit value and is insufficient.

Thus, from time t0 to time t1, there is no difference between the target value θαβ_ref of the power factor and the actual power-source power factor θαβ, and the output result (output signal) of the integral computing unit (652) of the load adjustment determining unit (650) is substantially kept at "0", as illustrated in FIG. 24(e). However, at and after time t1, a difference occurs between the target value θαβ_ref of the power factor and the actual power-source power factor θαβ, and the output result (output signal) of the integral computing unit (652) increases.

Time t2 is the point of time at which the output result (output signal) of the integral computing unit (652) reaches a determination value. At time t2, in response to receipt of the output result (output signal) from the integral computing unit (652), the determining unit (653) outputs a load apparatus command signal Fs (i.e., a load apparatus command signal Fs representing "ON") for making the operation state of the power converting apparatus (601) different from the operation states at and before time t2 to the power converting apparatuses (601), as illustrated in FIG. 24(f). The load apparatus command signal Fs causes the operation state of the power converting apparatus (601) to change such that the output power decreases from time t2 to time t3 as illustrated in FIG. 24(b). Accordingly, at and after time t2, the amount of compensation of the active filter apparatus (604) decreases from the limit value because the output power of the power converting apparatus (601) decreases, as illustrated in FIG. 24(c). This means that a margin is generated in the amount of compensation of the active filter apparatus (604). Thus, as illustrated in FIG. 24(d), the actual power-source power factor can recover so as to substantially match the target value θαβ_ref of the power factor.

In this way, when the actual power-source power factor θαβ decreases from the target value θαβ_ref of the power factor, the controller (640) according to the seventh embodiment adjusts the operation parameter, which is at least one of the power of the power converting apparatus (601), the current of the power converting apparatus (601), the rotational speed of electric motor, and the like, to decrease the operation parameter. Accordingly, the controller (640) performs "power-source power factor demand control" of forcibly decreasing the operation capability of the power converting apparatus (601) and making a state where the actual power-source power factor θαβ matches the target value θαβ_ref of the power factor. The "power-source power factor demand control" is control in which the controller (640) according to the seventh embodiment adjusts, based on the detection results of the first current detectors (605a, 605b), the operation parameter such that the fundamental power factor approaches the target value θαβ_ref of the power factor.

When a state where the actual power-source power factor θαβ matches the target value θαβ_ref of the power factor continues for a certain period from time t2 (in FIG. 24, the period from time t2 to time t3), the determining unit (653) causes the load apparatus command signal Fs output therefrom to be in an "OFF" state as in the period from time t0 to time t2, as illustrated in FIG. 24(f). Accordingly, the power converting apparatus (601) is released from a forcible decrease in operation capability and performs a normal operation under control that is based on a normal command.

At time t3, the determining unit (653) outputs a reset signal for resetting the integration result (clearing the integration result to zero) of the integral computing unit (652), as illustrated in FIG. 24(g). Accordingly, the integration result (output signal) of the integral computing unit (652) becomes zero, and the integral computing unit (652) becomes ready for a case where the actual power-source power factor θαβ decreases below the target value θαβ_ref of the power factor next time.

<Advantages>

In the seventh embodiment, the operation of the active filter apparatus (604) is not controlled but the operation state of the power converting apparatus (601) as a load apparatus is controlled based on the actual output current of the AC power source (603) such that the fundamental power factor, which is the present power-source quality, approaches the target value θαβ_ref of the power factor, which is the target value of the power-source quality. Accordingly, the actual power-source power factor θαβ approaches the target value θαβ_ref. In this way, even if the capacity of the active filter apparatus (604) is small, the operation capability of the power converting apparatus (601) is adjusted so as to be decreased, for example, by controlling the operation state of the power converting apparatus (601), which is a load apparatus, and thus the capability of improving the fundamental power factor of the active filter apparatus (604) recovers. Accordingly, even if the capacity of the active filter apparatus (604) is relatively small, the fundamental power factor is improved without problems. Thus, the capacity of the active filter apparatus (604) can be actively reduced, and the cost can be reduced accordingly.

In the seventh embodiment, the current source (630) further reduces the harmonic currents of the power converting apparatus (601) and the load apparatus (602). That is, the current source (630) reduces the harmonic currents and improves the fundamental power factor.

In the seventh embodiment, the first current detectors (605a, 605b) are installed in the distribution switchboard (606).

The first current detectors (605a. 605b) according to the seventh embodiment are configured to wirelessly transmit a detection result to the controller (640). This eliminates the necessity of the wiring lines for connecting the first current detectors (605a, 605b) and the controller (640) and the necessity of installing the wiring lines.

In the seventh embodiment, the first current detectors (605a, 605b) are configured to operate with a non-power-source scheme. This eliminates the necessity of connecting the first current detectors (605a, 605b) to an external power source.

The air conditioning system (700) according to the seventh embodiment includes the active filter apparatus (604) and the air conditioning apparatus (620). In particular, the active filter apparatus (604) is incorporated in the air conditioning apparatus (620). In the case of designing a structure, such as a building, installation of a refrigerant pipe that connects an outdoor unit and an indoor unit of the air conditioning apparatus (620) is necessary, and thus the specifications of the air conditioning apparatus (620) to be installed in the structure are determined naturally. Thus, a communication line between the active filter apparatus (604) and the air conditioning apparatus (620) can be connected during construction of the structure, and an environment in which the operation capability of the power converting apparatus (601) included in the air conditioning apparatus (620) can be changed based on the output current output from the AC power source (603) can be easily established.

Eighth Embodiment

Figure 25:
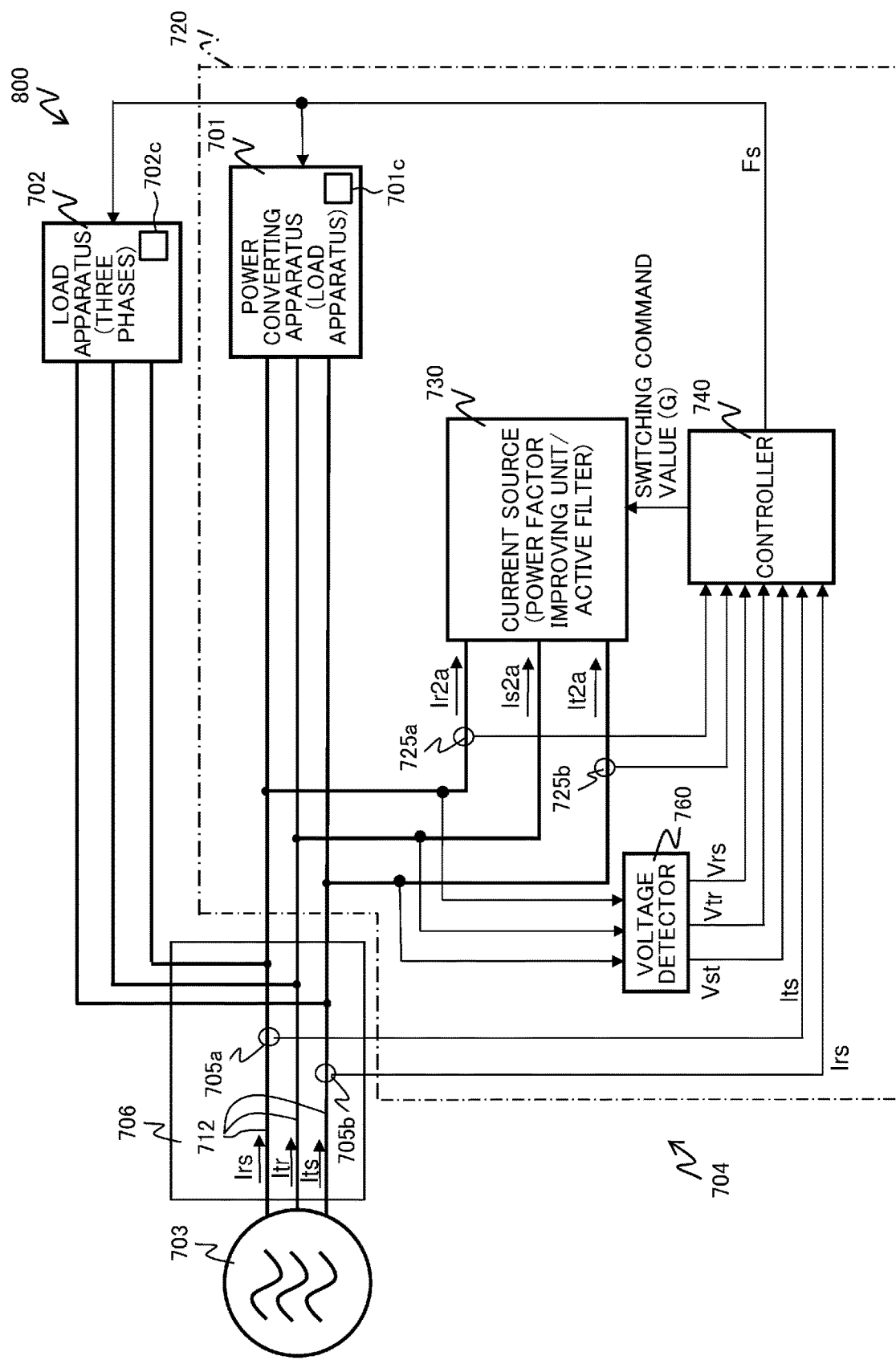
FIG. 25 is a diagram schematically illustrating the configuration of an air conditioning system including an active filter apparatus according to an eighth embodiment.

FIG. 25 is a block diagram illustrating the configuration of an air conditioning system (800) including an active filter apparatus (704) according to an eighth embodiment, which is a modification example of the seventh embodiment. The eighth embodiment is different from the seventh embodiment in that, when the actual power-source power factor θαβ decreases from the target value θαβ_ref of the power factor, the operation parameter of a load apparatus (702) (specifically, at least one of the power, the current, the rotational speed of the electric motor, and the like of the load apparatus (702)) is decreased in addition to the operation parameter of a power converting apparatus (701). That is, in the eighth embodiment, the target whose capability is to be decreased includes a plurality of (all of) load apparatuses (701, 702) in the air conditioning system (800). Accordingly, the fundamental power factor can be caused to approach the target value θαβ_ref of the power factor and the capability of the entire building (the entire power system) can be quickly decreased. Thus, a decrease in power-source power factor can be minimized to secure the target power-source power factor.

Thus, in FIG. 25, unlike in FIG. 22, a load apparatus command signal Fs output by a controller (740) is input not only to the power converting apparatus (701) but also to the load apparatus (702).

The air conditioning system (800) illustrated in FIG. 25 is similar to the seventh embodiment except for the above-described configuration. In FIG. 25, the components corresponding to those in FIG. 22 are denoted by reference numerals, such as "730". The details of these components are similar to those in the seventh embodiment in FIG. 22.

Figure 26:
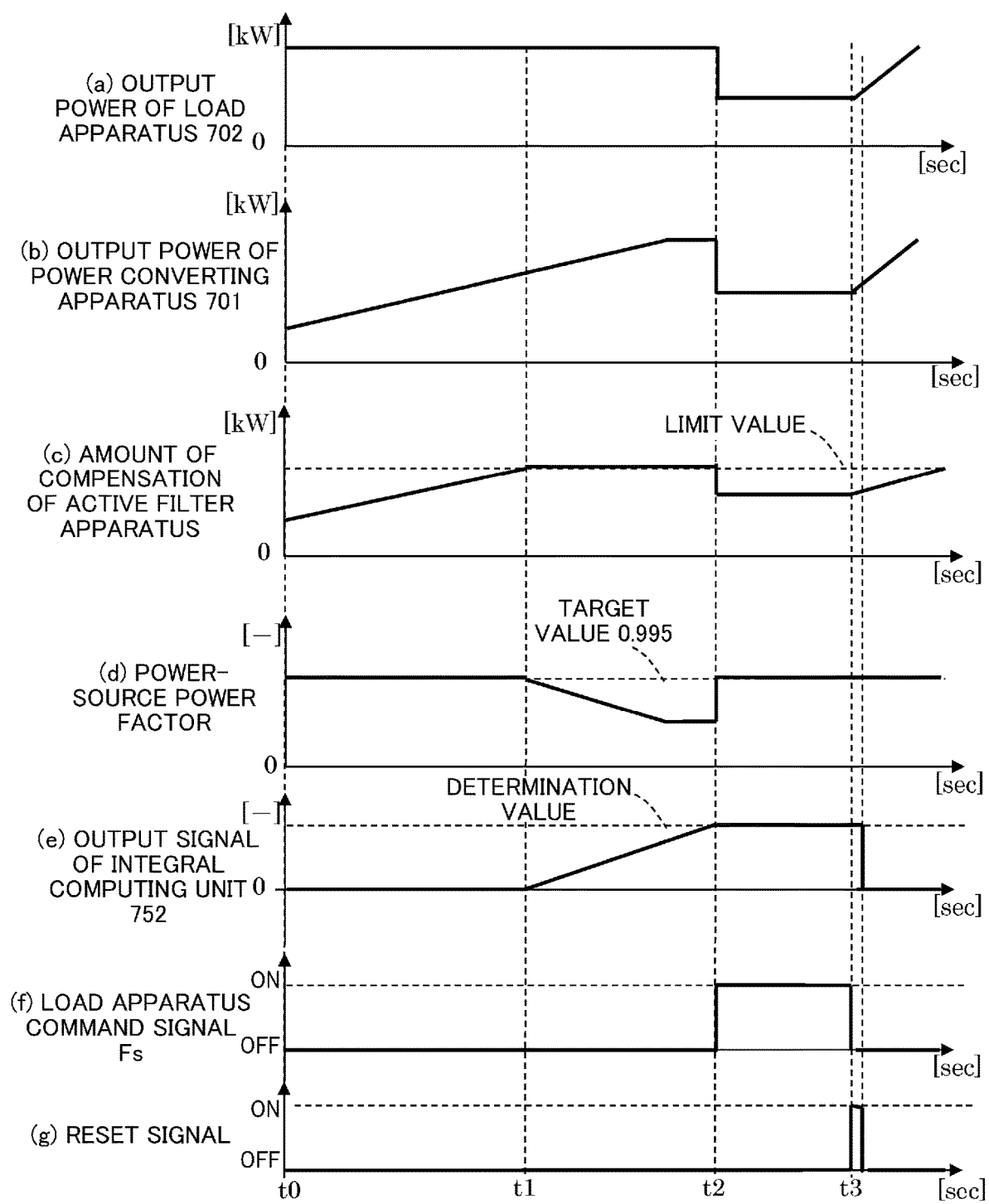
FIG. 26 is a diagram illustrating temporal changes in output powers of respective load apparatuses, an amount of compensation of the active filter apparatus, a power-source power factor, an output signal of an integral computing unit, a load apparatus command signal, and a reset signal according to the eighth embodiment.

FIG. 26 illustrates an example of temporal changes in the operations of the load apparatus (702) and the power converting apparatus (701), the amount of compensation of the active filter apparatus (704), the power-source power factor, and the operation of the controller (740) according to the eighth embodiment. FIG. 26 is different from FIG. 24 in that the output power of the load apparatus (702) illustrated in FIG. 26(a) is not constant.

Specifically, the output power of the load apparatus (702) is constant from time t0 to time t2. On the other hand, a continuous increase in the output power of the power converting apparatus (701) from time t0 to time t2 causes the amount of compensation of the active filter apparatus (704) to reach a limit value at or after time t1. As a result, the power-source power factor deviates from the target value at or after time t1. Thus, the integration result of an integral computing unit (752) reaches a determination value at time t2, and the load apparatus command signal Fs is in an ON state from time t2 to time t3. From time t2 to time t3, the load apparatus command signal Fs is output not only to the power converting apparatus (701) but also to the load apparatus (702), and thus the target whose output power decreases with a decrease in capability includes the power converting apparatus (701) and the load apparatus (702). Accordingly, the power-source power factor can be increased to achieve the target power-source power factor.

<Advantages>

In the eighth embodiment, the operation states of the plurality of load apparatuses (701, 702) in the air conditioning system (800) are changed in the direction of decreasing the operation capabilities. Accordingly, the operation capabilities of the load apparatuses (701, 702) in the entire air conditioning system (800) decrease more than in the case of changing only the operation state of one load apparatus, and thus the capability of improving the fundamental power factor quickly recovers. Thus, a decrease in power-source power factor can be minimized, and the power-source power factor can be caused to quickly reach the target value.

The eighth embodiment produces the advantages described in the above-described seventh embodiment.

Ninth Embodiment

Figure 27:
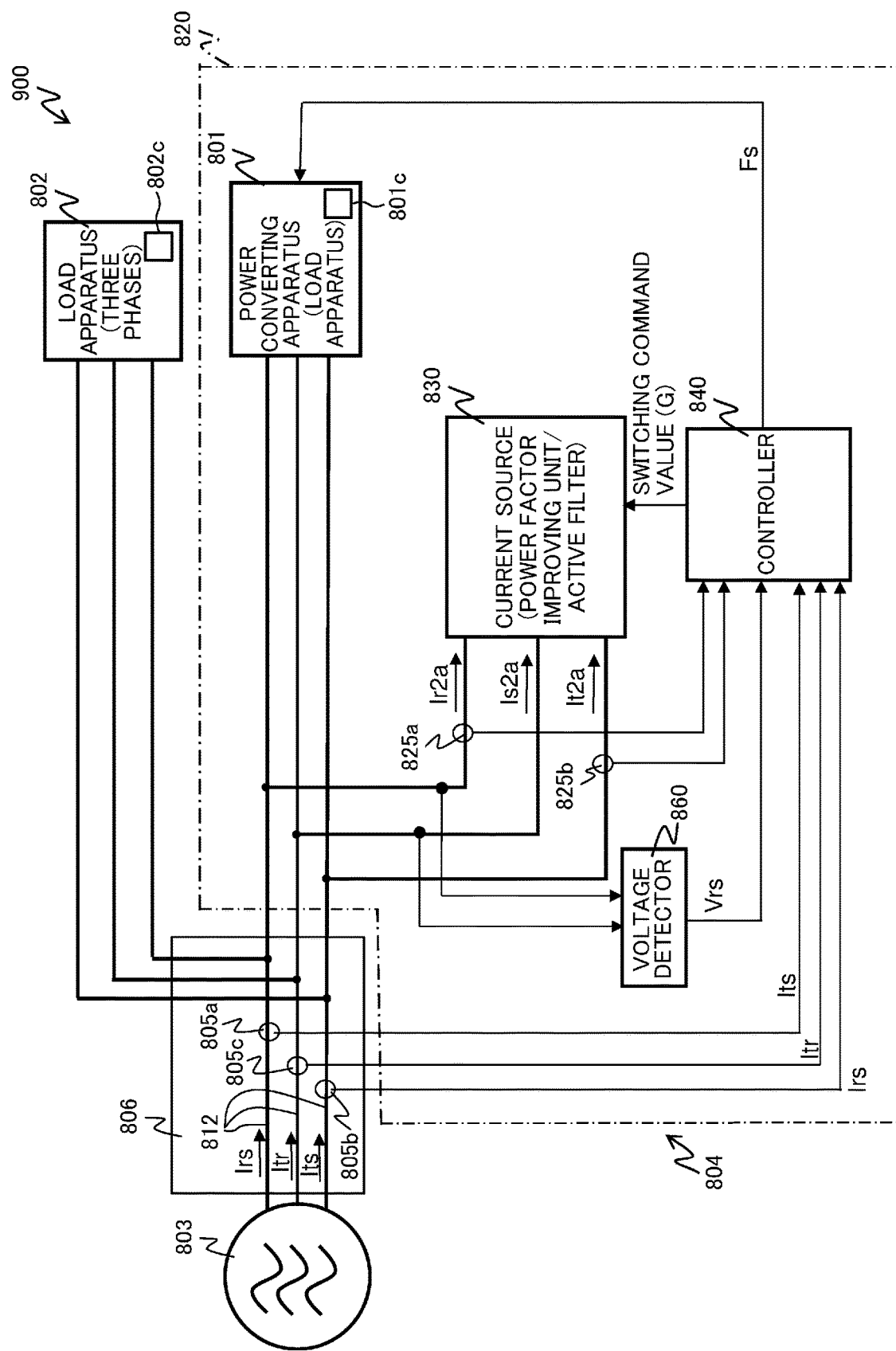
FIG. 27 is a diagram schematically illustrating the configuration of an air conditioning system including an active filter apparatus according to a ninth embodiment.

FIG. 27 is a block diagram illustrating the configuration of an air conditioning system (900) including an active filter apparatus (804) according to a ninth embodiment, which is a modification example of the seventh embodiment. The ninth embodiment is different from the seventh embodiment in that another load apparatus (802), which is a harmonic generating load apparatus, is an apparatus driven by a single-phase voltage and that the other load apparatus (802) is assumed to be a lighting apparatus, such as an LED, or a single-phase fan or pump. In particular, in the ninth embodiment, three first current detectors (805*a*, 805*b*, 805*c*) are provided by assuming a case where the phase connected to the other load apparatus (802) (i.e., an apparatus driven by a single-phase voltage) is not determined.

In FIG. 27, the components corresponding to those in FIG. 22 are denoted by reference numerals, such as "830". The details of these components are similar to those in the seventh embodiment in FIG. 22. Thus, hereinafter a description will be given of only the points different from the seventh embodiment.

The three first current detectors (805*a*, 805*b*, 805*c*) are provided corresponding to respective phases (R, S, T) of an AC power source (803) and detect the current values of the corresponding phases (R, S, T). That is, in the ninth embodiment, although the load apparatus (802) is an apparatus operated by a single-phase AC, the current values of all the three phases are detected and thus the current values can be reliably detected.

A voltage detector (860) is connected to the R phase and the S phase of the AC power source (803) and is not connected to the T phase. Thus, the voltage detector (860) detects only a line-to-line voltage (Vrs) of the AC power source (803) and inputs the line-to-line voltage (Vrs) to a controller (840). This is because, as described in the seventh embodiment, the controller (840) detects the phase of the power-source voltage in power reception paths (812) through computation by using only the line-to-line voltage (Vrs). The other line-to-line voltages (Vst, Vtr) each have a phase difference of 120 degrees from the line-to-line voltage (Vrs) (specifically, the phase is advanced or delayed by 120 degrees). Thus, the controller (840) according to the ninth embodiment is capable of computing the amplitude of the power-source voltage from the line-to-line voltage (Vrs), and is capable of obtaining the phases and amplitudes of the other line-to-line voltages (Vst, Vtr) from the computed amplitude and phase of the power-source voltage. The result obtained in this way can be substituted into the above Equation (11). Thus, the detection of the actual line-to-line voltages (Vst, Vtr) can be omitted.

The omission of the detection of the line-to-line voltages (Vst, Vtr) and the computation of the other line-to-line voltages (Vst. Vtr) based on the line-to-line voltage (Vrs) may be adopted in the above-described seventh and eighth embodiments.
<Advantages>

According to the ninth embodiment, in a case where the other load apparatus (802) driven by a single-phase voltage is connected, the plurality of first current detectors (805*a*, 805*b*, 805*c*) are provided corresponding to the respective phases (R, S. T) of the AC power source (803). Thus, even if the phase connected to the other load apparatus (802) is unknown, the current values of all the three phases can be reliably grasped.

According to the ninth embodiment, in a case where the other load apparatus (802) driven by a single-phase voltage is connected, the detection of the actual line-to-line voltages (Vst, Vtr) is omitted. This makes it possible to reduce a harmonic current and improve a fundamental power factor without unnecessarily increasing the cost of the active filter apparatus (804).

The ninth embodiment produces the advantages described in the above-described seventh embodiment.

In the ninth embodiment, in a case where the phase of the AC power source (803) to which the load apparatus (802) driven by a single-phase voltage is connected is determined in advance, a first current detector may be provided for the phase to which the load apparatus (802) is connected.

Tenth Embodiment

Figure 28:
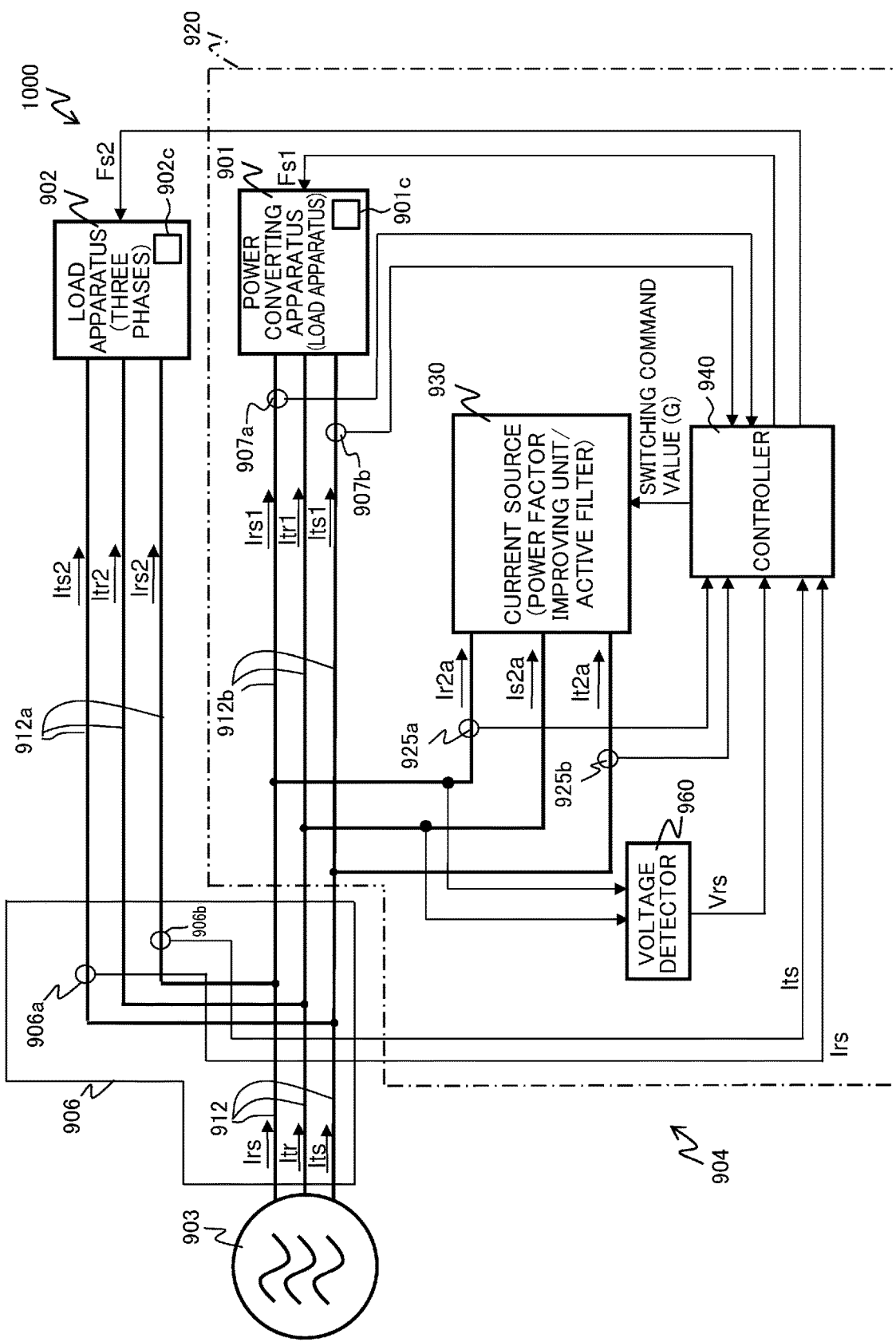
FIG. 28 is a diagram schematically illustrating the configuration of an air conditioning system including an active filter apparatus according to a tenth embodiment.

FIG. 28 is a block diagram illustrating the configuration of an air conditioning system (1000) including an active filter apparatus (904) according to a tenth embodiment, which is a modification example of the seventh embodiment. The tenth embodiment is different from the seventh embodiment in that, as illustrated in FIG. 28, first current detectors (906*a*. 906*b*, 907*a*, 907*b*) are connected to wiring lines (912*a*, 912*b*) that connect individual load apparatuses (901, 902) to the points at which output currents (Irs, Itr, Its) of an AC power source (903) branch off to the power converting apparatus (901) and the load apparatus (902) in power reception paths (912). Accordingly, the operation states of the power converting apparatus (901) and the load apparatus (902), for example, whether the power converting apparatus (901) and the load apparatus (902) are in a maximum load state or a light load state, can be determined.

In FIG. 28, the components corresponding to those in FIG. 22 are denoted by reference numerals, such as "930". The details of these components are similar to those in the seventh embodiment in FIG. 22. Thus, hereinafter a description will be given of only the points different from the seventh embodiment.

Specifically, the first current detectors (906*a*, 906*b*) are provided corresponding to the T phase and the R phase of the AC power source (903) on the input side of the load apparatus (902). The first current detector (906*a*) detects an output current (Its2) of the AC power source (903) to be input to the load apparatus (902), and the first current detector (906*b*) detects an output current (Irs2) of the AC power source (903) to be input to the load apparatus (902). The first current detectors (907*a*, 907*b*) are provided corresponding to the R phase and the T phase of the AC power source (903) on the input side of the power converting apparatus (901). The first current detector (907*a*) detects an output current (Irs1) of the AC power source (903) to be input to the power converting apparatus (901), and the first current detector (907*b*) detects an output current (Its1) of the AC power source (903) to be input to the power converting apparatus (901).

That is, the first current detectors (906*a*, 906*b*) are provided corresponding to the load apparatus (902), and the first current detectors (907*a*, 907*b*) are provided corresponding to the power converting apparatus (901).

FIG. 28 exemplifies a case where the first current detectors (906*a*, 906*b*) are provided inside a distribution switchboard (906) and the first current detectors (907a, 907b) are not provided inside the distribution switchboard (906). Alternatively, all the first current detectors (906a, 906b, 907a. 907b) may be provided inside the distribution switchboard (906).

The tenth embodiment is different from the seventh embodiment in that a voltage detector (960) detects only a line-to-line voltage (Vrs) of the AC power source (903) and inputs the line-to-line voltage (Vrs) to a controller (940), as in the above-described eighth embodiment.

Furthermore, the tenth embodiment is different from the seventh embodiment in that the controller (940) outputs a load apparatus command signal (Fs1) for the power converting apparatus (901) and a load apparatus command signal (Fs2) for the load apparatus (902).

Figure 29:
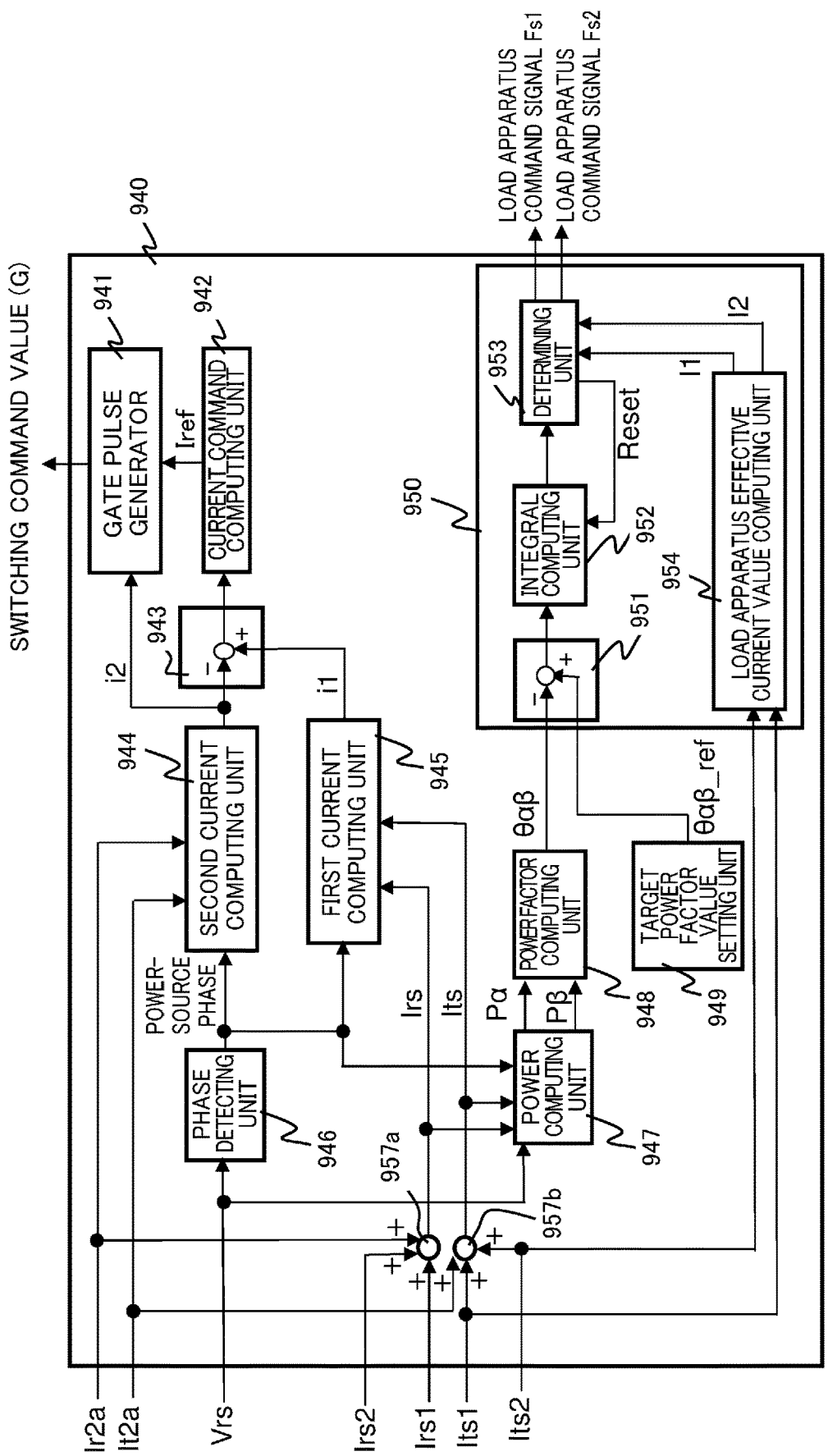
FIG. 29 is a block diagram illustrating an example of a controller according to the tenth embodiment.

An example of the controller (940) is illustrated as a block diagram in FIG. 29. The controller (940) illustrated in FIG. 29 further includes adding units (957a, 957b) in comparison with FIG. 23 according to the seventh embodiment. A load adjustment determining unit (950) further includes a load apparatus effective current value computing unit (954).

Figure 23:
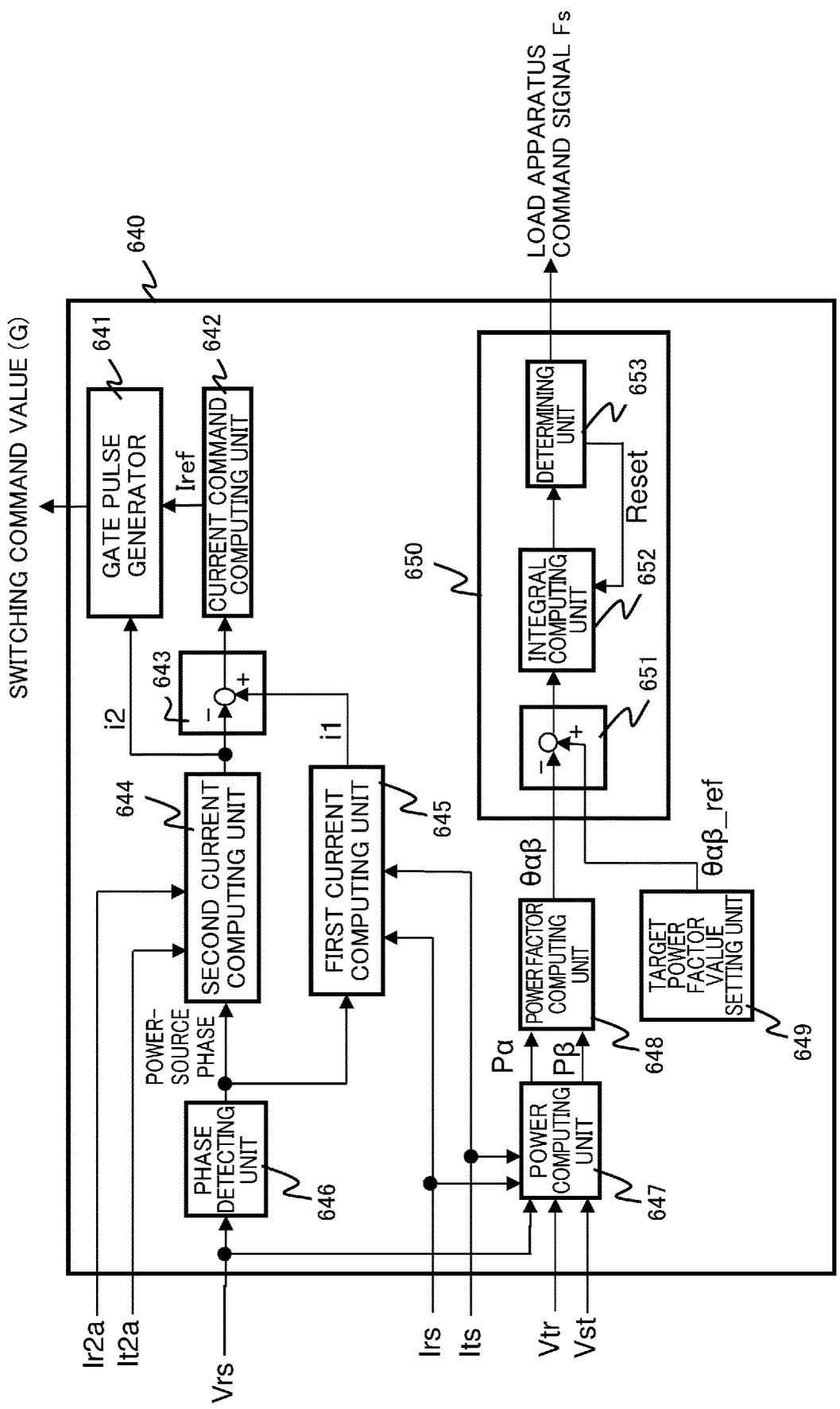
FIG. 23 is a block diagram illustrating an example of a controller according to the seventh embodiment.

In FIG. 29, the components corresponding to those in FIG. 23 are denoted by reference numerals, such as "946". The details of these components are similar to those in the seventh embodiment in FIG. 23 except for the following description. Hereinafter, a description will be given of the configuration of the controller (940) according to the tenth embodiment, regarding only the points different from the controller (640) according to the seventh embodiment.

The adding unit (957a) adds the detection results (Irs2, Irs1, Ir2a) of the respective current detectors (906b, 907a, 925a) and outputs an addition result as the output current (Irs) of the AC power source (903) to a power computing unit (947) and a first current computing unit (945). The adding unit (957b) adds the detection results (Its2, Its1, It2a) of the respective current detectors (906a, 907b, 925b) and outputs an addition result as the output current (Its) of the AC power source (903) to the power computing unit (947) and the first current computing unit (945).

The first current computing unit (945) extracts a harmonic current component and a reactive component of the fundamental from the output currents (Irs, Its) of the AC power source (903), which are the addition results of the respective adding units (957a, 957b), and outputs the extracted components as a first current value (i1).

The power computing unit (947) obtains, from the line-to-line voltage (Vrs) of one phase of the AC power source (903) detected by the voltage detector (960), the line-to-line voltages (Vst, Vtr) of the other phases, and uses, in the above Equations (11) and (12), the line-to-line voltages (Vrs, Vst, Vtr) of the three phases and the output currents (Irs, Its) of the AC power source (903), which are the addition results of the respective adding units (957a, 957b).

The load apparatus effective current value computing unit (954) computes an effective value (I1) of the current flowing through the power converting apparatus (901) and an effective value (I2) of the current flowing through the load apparatus (902) by using the detection results (Its2, Its1) of the respective first current detectors (906a, 907b) input thereto, and outputs the effective values (I1, I2) to a determining unit (953).

Figure 30:
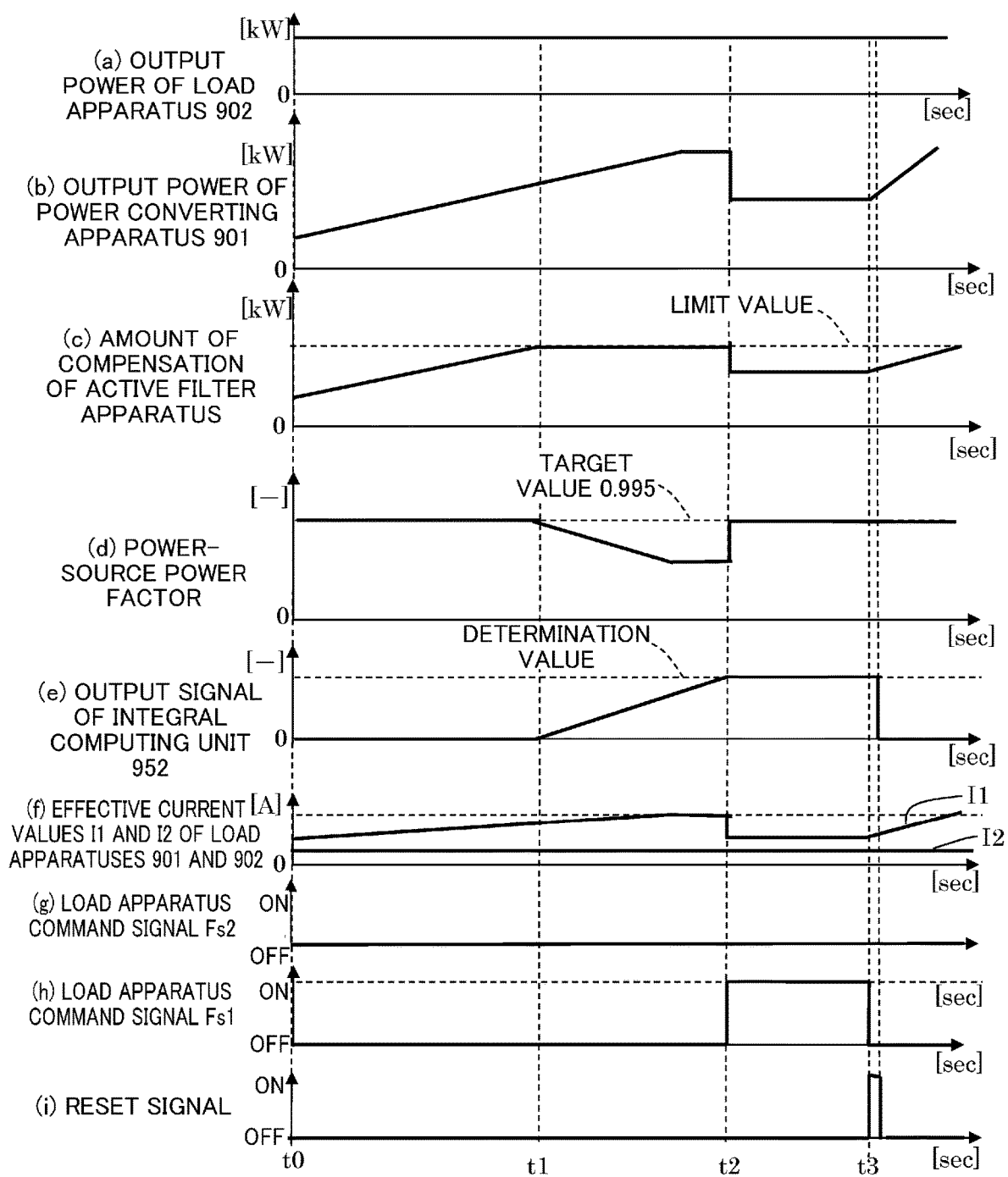
FIG. 30 is a diagram illustrating temporal changes in output powers of respective load apparatuses, an amount of compensation of the active filter apparatus, a power-source power factor, an output signal of an integral computing unit, effective current values of the respective load apparatuses, load apparatus command signals, and a reset signal according to the tenth embodiment.

The operation of the determining unit (953) will be described with reference to FIG. 30. FIG. 30 illustrates an example of temporal changes in the operations of the power converting apparatus (901) and the load apparatus (902), the amount of compensation of the active filter apparatus (904), the power-source power factor, and the operation of the load adjustment determining unit (950). FIG. 30(a) to FIG. 30(e) are similar to FIG. 24(a) to FIG. 24(e) of the seventh embodiment.

As illustrated in FIG. 30(a) and FIG. 30(b), when the output powers of the power converting apparatus (901) and the load apparatus (902) change, the effective current values (I1, I2) of the power converting apparatus (901) and the load apparatus (902) change in the manner illustrated in FIG. 30(f). Specifically, the effective current value (I2) of the load apparatus (902) is constant, whereas the effective current value (I1) of the power converting apparatus (901) increases from time t0 to immediately before time t2. From time t0 to time t2, the effective current value (I1) of the power converting apparatus (901) is larger than the effective current value (I2) of the load apparatus (902). Thus, it is understood that the power converting apparatus (901) uses more power than the load apparatus (902) as seen from the AC power source (903), and it can be estimated that the power converting apparatus (901) contributes more than the load apparatus (902) to a decreased power-source power factor in FIG. 30(d).

With use of the above, the determining unit (953) outputs the load apparatus command signals (Fs1, Fs2) illustrated in FIG. 30(g) and FIG. 30(h) at or after time t2 at which the output signal of the integral computing unit (952) reaches a determination value. Specifically, the determining unit (953) keeps an output stop state (OFF state) for the load apparatus command signal (Fs2) for providing a command to the load apparatus (902), as illustrated in FIG. 30(g), but outputs the load apparatus command signal (Fs1) for providing a command to the power converting apparatus (901) from time t2 to time t3 (ON state), as illustrated in FIG. 30(h), thereby decreasing the operation parameter for changing the operation state of only the power converting apparatus (901).

Accordingly, from time t2 to time t3, the operation state of the load apparatus (902) does not change from the state at and before time t2, and thus the output power and the effective current value (I2) of the load apparatus (902) do not change. On the other hand, the operation state from time t2 to time t3 of the power converting apparatus (901), which highly contributes to a decreased power-source power factor, changes such that the operation capability of the power converting apparatus (901) decreases. Accordingly, the output power and the effective current value (I1) of the power converting apparatus (901) become lower than those in the state immediately before the load apparatus command signal (Fs1) is output. Accordingly, the amount of compensation of the active filter apparatus (904) decreases below that in the state immediately before the load apparatus command signal (Fs1) is output from time t2 to time t3, and a margin is generated in the amount of compensation.

In this way, the controller (940) according to the tenth embodiment determines a target whose operation capability is to be decreased from among the power converting apparatus (901) and the load apparatus (902) connected to the controller (940), based on the detection results of the first current detectors (906a, 906b, 907a, 907b) or the like. In FIG. 30, the target is determined to be the power converting apparatus (901). The operation parameter of the determined target is adjusted to decrease the operation capability of the determined target, and the fundamental power factor approaches the target value $\theta\alpha\beta\_ref$ of the power factor. Accordingly, in the tenth embodiment, the number of load apparatuses as a target whose operation capability is to be decreased can be minimized, and the operation state of the load apparatus whose operation capability is not to be decreased can be maintained.

The operation other than the above-described operation is similar to that of the seventh embodiment.

<Advantages>

According to the tenth embodiment, as in the above-described seventh embodiment, the operation state of the power converting apparatus (901) is changed based on the actual output current of the AC power source (903) such that the fundamental power factor, which is the present power-source quality, approaches the target value θαβ_ref of the power factor, which is the target value of the power-source quality. Accordingly, the actual power factor θαβ approaches the target value θαβ_ref of the power factor. In this way, even if the capacity of the active filter apparatus (904) is small, the operation capability of the power converting apparatus (901), which is a load apparatus, is decreased, and thus the compensation capability of the active filter apparatus (904) recovers. Accordingly, even if the capacity of the active filter apparatus (904) is relatively small, the fundamental power factor is improved without problems. Thus, the capacity of the active filter apparatus (904) can be actively reduced, and the cost can be reduced accordingly.

In the tenth embodiment, the current source (930) further reduces the harmonic currents of the power converting apparatus (901) and the load apparatus (902). That is, the current source (930) reduces the harmonic currents and improves the fundamental power factor.

In the tenth embodiment, the load apparatus (901) for which the power is to be reduced (i.e., the operation state is to be changed in the direction of decreasing the operation capability) is selected from among the plurality of load apparatuses (901, 902). Accordingly, the load apparatus (901) whose operation capability is to be decreased can be minimized, for example, and the operation state of the load apparatus (902) whose operation capability is not to be decreased can be maintained.

In the tenth embodiment, the load apparatus (901) whose operation state is to be changed in the direction of decreasing the operation capability is determined based on the values of currents actually flowing through the respective load apparatuses (901, 902). Accordingly, the load apparatus (901) serving as a target whose operation capability is to be decreased can be accurately determined in accordance with an actual situation.

In the tenth embodiment, the first current detectors (906*a*, 906*b*) are installed in the distribution switchboard (906).

The first current detectors (906*a*, 906*b*, 907*a*, 907*b*) according to the tenth embodiment are configured to wirelessly transmit a detection result to the controller (940). This eliminates the necessity of the wiring lines for connecting the first current detectors (906*a*, 906*b*, 907*a*, 907*b*) and the controller (940) and the necessity of installing the wiring lines.

In the tenth embodiment, the first current detectors (906*a*, 906*b*, 907*a*. 907*b*) are configured to operate with a non-power-source scheme. This eliminates the necessity of connecting the first current detectors (906*a*, 906*b*, 907*a*, 907*b*) to an external power source.

The air conditioning system (1000) according to the tenth embodiment includes the active filter apparatus (904) and an air conditioning apparatus (920). In particular, the active filter apparatus (904) is incorporated in the air conditioning, apparatus (920). In the case of designing a structure, such as a building, installation of a refrigerant pipe that connects an outdoor unit and an indoor unit of the air conditioning apparatus (920) is necessary, and thus the specifications of the air conditioning apparatus (920) to be installed in the structure are determined naturally. Thus, a communication line between the active filter apparatus (904) and the air conditioning apparatus (920) can be connected during construction of the structure, and an environment in which the operation capability of the power converting apparatus (901) included in the air conditioning apparatus can be changed based on the output current output from the AC power source (903) can be easily established.

<Modification Examples of Seventh to Tenth Embodiments>

A plurality of active filter apparatuses may be provided for one power converting apparatus (601, 701, 801, 901). In this case, the active filter apparatuses may share a compensating current in accordance with the current capacities of the respective active filter apparatuses.

In a case where a smart meter is installed in advance in a structure, the one smart meter can replace the first current detectors.

The load apparatus (601, 701, 801, 901) is not limited to a power converting apparatus, such as a compressor in an air conditioning apparatus, and may be, for example, an elevator, a fan, a pump, an escalator, a lighting apparatus driven by a three-phase power source, or the like provided in a building or the like.

The first current detectors and the second current detectors need not be of a wireless type.

The first current detectors and the second current detectors need not be of a non-power-source type.

The first current detectors need not be installed in the distribution switchboard.

The active filter apparatus need not be incorporated in the air conditioning apparatus. The active filter apparatus may be used for the application other than the air conditioning apparatus.

The active filter apparatus has a function of generating a current for improving the fundamental power factor of a load apparatus as an essential function, but need not necessarily have a function of reducing the harmonic current of the load apparatus.

In a case where the load apparatus is an air conditioning apparatus, the air conditioning apparatus is not limited to an apparatus that performs only cooling and heating. The air conditioning apparatus includes an apparatus capable of performing freezing, ventilation, and humidity control.

Eleventh Embodiment

In the above-described first to tenth embodiments, a description has been given of a case where the power-source power factor demand controller (40, 105) corresponding to the control signal generating unit and the controller (240, 340, 440, 540, 640, 740, 840, 940) obtain a present power-source power factor through detection or computation and generates a load apparatus command signal Fs (control signal) by using the present power-source power factor as a power-source quality. In an eleventh embodiment, a description will be given of a case where a load apparatus command signal (control signal) Fs is generated by using the power-source harmonic of an AC power source (1003) as a power-source quality.

A power-source power factor corresponds to the sum of a fundamental power factor and a power factor based on a power source harmonic component. In the eleventh embodiment, focusing on this, a load apparatus command signal (control signal) Fs is generated by using a power-source harmonic as a power-source quality.

Figure 31:
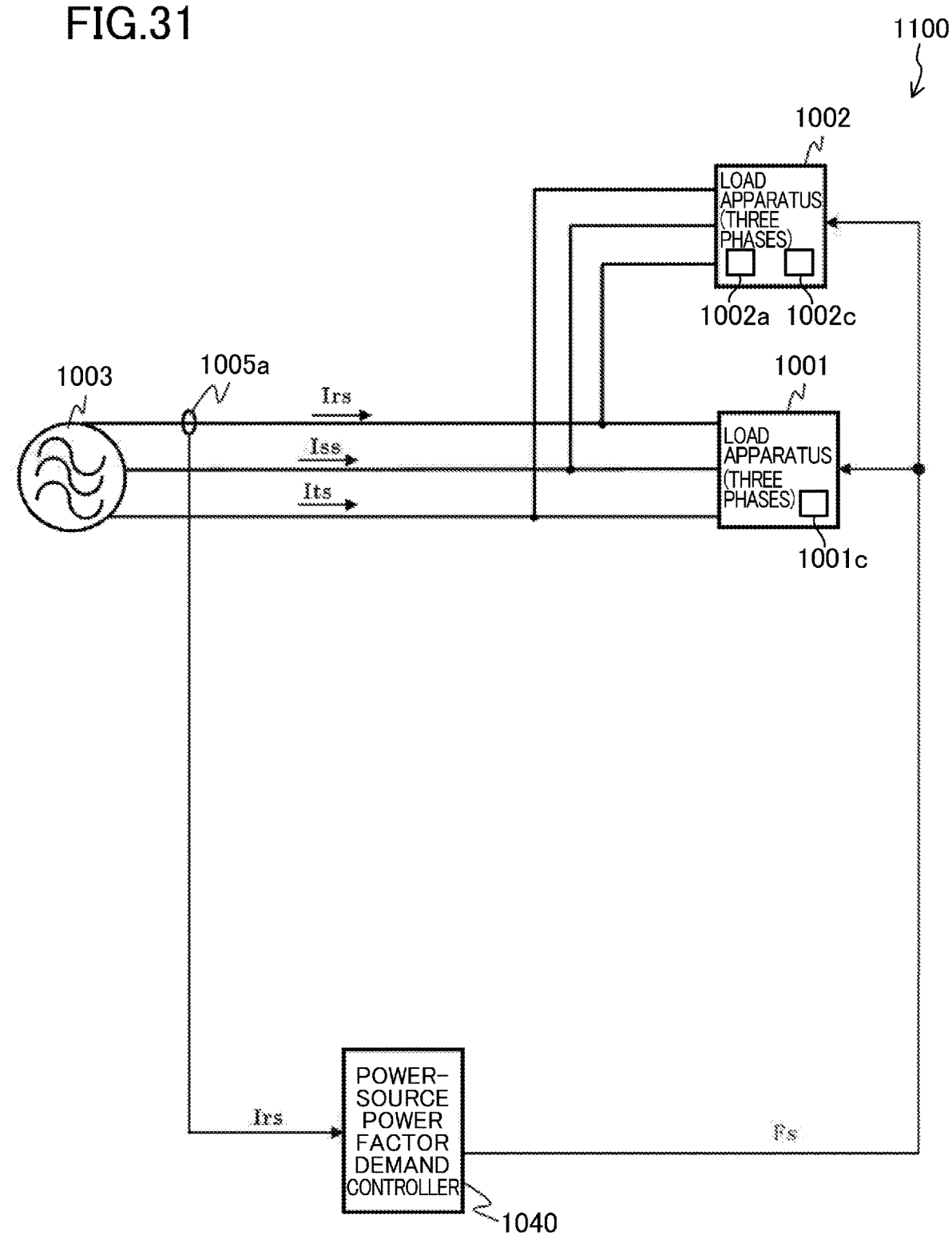
FIG. 31 is a diagram schematically illustrating the configuration of a power-source power factor control system according to an eleventh embodiment.

FIG. 31 is a block diagram illustrating a power-source power factor control system (1100) of load apparatuses (1001, 1002) according to the eleventh embodiment. In this example, the power-source power factor control system (1100) includes the plurality of load apparatuses (1001, 1002), a current detector (1005a), a power-source power factor demand controller (1040), and adjusting units (1001c, 1002c)(corresponding to the operation state control unit) included in the load apparatuses (1001, 1002).

The load apparatus (1001) is an air conditioning apparatus and is installed in a building or the like. The load apparatuses (1001), which is an air conditioning apparatus, performs indoor air conditioning (cooling and heating).

The building or the like is supplied with power from a power system including the AC power source (1003). In this example, the AC power source (1003) is a three-phase AC power source (for example, a three-phase commercial power source), and supplies power to the plurality of load apparatuses (1001, 1002) in a branching manner.

In the eleventh embodiment, a case is taken as an example where the load apparatus (1002) is an apparatus including a circuit that can be a source of a harmonic current, such as an inverter circuit (the apparatus is referred to as a harmonic generating load apparatus). Examples of the load apparatus (1002) include an elevator, a fan, a pump, an escalator, a lighting apparatus driven by a three-phase power source, an air conditioning apparatus that is different from the load apparatus (1001) as an air conditioning apparatus and that does not have measures against harmonics such as an active filter, and the like provided in the building or the like.

<Load Apparatuses>

The load apparatus (1002), which is an air conditioning apparatus, includes a refrigerant circuit (not illustrated) including a compressor and a power converting apparatus (1002a) in addition to the above-described adjusting unit (1002c). The power converting apparatus (1002a) is connected to the AC power source (1003) and is an example of a harmonic generating load apparatus. The power converting apparatus (1002a) includes a converter circuit and an inverter circuit (both are not illustrated). The AC power supplied to the load apparatus (1002) is converted to AC power having a desired frequency and a desired voltage by the power converting apparatus (1002a) and is supplied to the compressor (more specifically, the electric motor included in the compressor). Accordingly, the compressor operates and the refrigerant circuit functions. As a result, indoor air conditioning is performed.

The load apparatus (1001), which is an air conditioning apparatus, includes an active filter for improving the power factor built therein. This increases the power factor of the load apparatus (1001). As a result, the power-source power factor can be easily improved.

When the load apparatuses (1001, 1002) or the electric motor of the compressor included in the load apparatus (1001) operates at the maximum power, a harmonic current may flow out through current paths of the AC power source (1003) for supplying power to the load apparatuses (1001, 1002), and the power-source factor of the AC power source (1003) may decrease. In general, electricity charge systems have a mechanism of giving a higher discount rate with a higher power-source power factor, and/or a mechanism of imposing a penalty of increasing electricity charges as the power-source power factor decreases below a predetermined value (for example, 90% or 85%). Thus, in the eleventh embodiment, a decrease in the power-source power factor by the load apparatuses (1001, 1002) is improved.

<Current Detector (1005a)>

The current detector (1005a) is provided corresponding to one phase of the AC power source (1003). The current detector (1005a) detects the current value of the phase.

<Power-Source Power Factor Demand Controller (1040)>

The power-source power factor demand controller (1040) is configured using a microcomputer and a memory device storing a program for operating the microcomputer, and is connected to the current detector (1005a) and the adjusting units (1001c, 1002c) of the respective load apparatuses (1001, 1002). The power-source power factor demand controller (1040) generates a load apparatus command signal Fs (control signal) for changing the operation states of the load apparatuses (1001, 1002) by using the present power-source harmonic of the AC power source (1003) as a power-source quality, based on the power-source quality and a target value of the power-source power factor of the AC power source (1003), and outputs the load apparatus command signal Fs to the adjusting units (1001c, 1002c).

Figure 32:
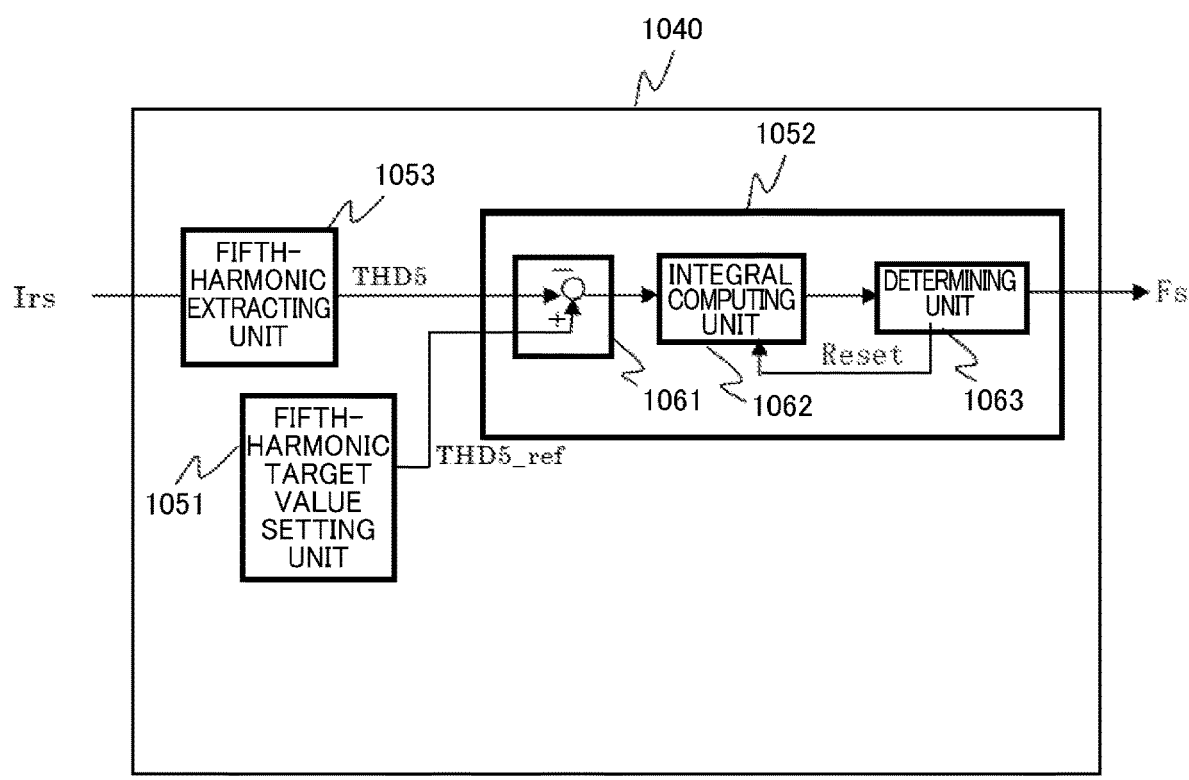
FIG. 32 is a block diagram illustrating an example of a power-source power factor demand controller according to the eleventh embodiment.

As illustrated in FIG. 32, the power-source power factor demand controller (1040) includes a fifth-harmonic target value setting unit (1051), a load adjustment determining unit (1052), and a fifth-harmonic extracting unit (1053).

The fifth-harmonic target value setting unit (1051) sets in advance, based on the power-source current or the like of the AC power source (1003), a target value (THD5_ref) of the power factor. The fifth-harmonic extracting unit (1053) extracts, from the current (Irs) detected by the current detector (1005a), a fifth-harmonic component (THD5) included in the current (Irs) (in a case where the frequency of the AC power source is 50 Hz, a frequency component of 250 Hz).

The load adjustment determining unit (1052) includes a subtracting unit (1061), an integral computing unit (1062), and a determining unit (1063).

When receiving the target value (THD5_ref) and the fifth-harmonic component (THD5), the subtracting unit (1061) subtracts the fifth-harmonic component (THD5) from the target value (THD5_ref). The integral computing unit (1062) integrates the subtraction result of the subtracting unit (1061). Based on the integration result, the determining unit (1063) generates a load apparatus command signal Fs for decreasing the capabilities (powers, currents, speeds, or the like) of the respective load apparatuses (1001, 1002) for the load apparatuses (1001, 1002). The load apparatus command signal Fs is output to the adjusting units (1001c, 1002c) of the respective load apparatuses (1001, 1002).

The above-described load apparatus command signal Fs causes the capabilities of the load apparatuses (1001, 1002) to be decreased and a power margin to be generated. A high power factor can be secured by causing the fifth-harmonic component to match the fifth-harmonic target value.

<Adjusting Units (1001c, 1002c)>

The load apparatuses (1001, 1002) respectively include the adjusting units (1001c, 1002c) connected to the power-source power factor demand controller (1040). The adjusting units (1001c, 1002c) are each configured using a microcomputer and a memory device storing a program for operating the microcomputer. The adjusting units (1001c, 1002c) adjust, based on the load apparatus command signal Fs output from the power-source power factor demand controller (1040), the operation parameters for changing the operation states of the respective load apparatuses (1001, 1002) to control the operation states of the load apparatuses (1001, 1002). Specifically, the operation parameters are the powers of the load apparatuses (1001, 1002), the currents of the load apparatuses (1001, 1002), the rotational speeds of the electric motors included in the load apparatuses (1001, 1002), or the like.

<Advantages>

According to the eleventh embodiment, even if a power-source harmonic is used as a power-source quality instead of a power-source power factor, the power-source power factor can be improved in the power system in which the plurality of load apparatuses (1001, 1002) are connected.

<Modification Examples of Eleventh Embodiment>

The target of operation state control may be either of the load apparatuses (1001, 1002).

<<Definition of Power-Source Power Factor According to First to Tenth Embodiments and Relationship Between Harmonic Component and Power Factor in Eleventh Embodiment>>

Now, a description will be given of the definition of the "power-source power factor", which is a power-source quality in the above-described first to tenth embodiments, and a fact that the power-source power factor can be improved also by power factor control that is based on the power-source harmonic extracted in the above-described eleventh embodiment.

It is assumed that the "power-source power factor" according to the above-described first to eleventh embodiments means both a total power factor and a fundamental power factor.

A voltage v(t) and a current i(t) of an AC power source are expressed as follows, where f represents frequency.

[Math. 16]

$$v(t)=V_0+\Sigma_{n=1}^{\infty}\sqrt{2}V_n \sin(2\pi \times n \times ft+\theta_n) \quad (16)$$

$$i(t)=I_0+\Sigma_{n=1}^{\infty}\sqrt{2}V_n \sin(2\pi \times n \times ft+\theta_n-\varnothing_n) \quad (17)$$

An active power P is given by an average value in one cycle of an instantaneous power "v(t)×i(t)" when the cycle is T (=1/f), as expressed below.

[Math. 18]

$$P = \frac{1}{T}\int_0^T v(t)i(t)dt \quad (18)$$

In the above Equation (18), when the term of the product of different frequency components is integrated over one cycle, the active power P is 0, and only the term of the square of the same frequency component remains. Thus, the calculation result of the above Equation (18) is expressed by the following Equation (19).

[Math. 19]

$$P=V_0 I_0 + \Sigma_{n=1}^{\infty} V_n I_n \cos \varnothing_n \quad (19)$$

The computation result of the above Equation (19) indicates that the active power of a distorted-wave AC is equal to the total sum of individual active powers in cases where each of a DC component, a fundamental component, and each harmonic component included in the distorted wave exists alone in a circuit.

On the other hand, an effective value V of a voltage and an effective value 1 of a current are expressed as follows.

[Math. 20]

$$V=\sqrt{\Sigma_{n=0}^{\infty} V_n^2} \quad (20)$$

$$I=\sqrt{\Sigma_{n=0}^{\infty} I_n^2} \quad (21)$$

In this case, an apparent power S is given by the following Equation (22).

[Math. 22]

$$S=V \times I \quad (22)$$

A power factor PF in this case is defined by the ratio of the active power to the apparent power and is expressed by the following Equation (23), based on the above Equations (19) and (20).

[Math. 23]

$$PF = \frac{P}{S} = \frac{V_0 I_0 + \Sigma_{n=1}^{\infty} V_n I_n \cos \varnothing_n}{\sqrt{\Sigma_{n=0}^{\infty} V_n^2} \sqrt{\Sigma_{n=0}^{\infty} I_n^2}} \quad (23)$$

The power-source power factor PF given by the above-Equation (23) is obtained in a case where both the voltage waveform and the current waveform are distorted.

The power factor defined by Equation (23) in which the influence of a harmonic component is taken into account is referred to as a total power factor by distinguishing it from a fundamental power factor, which will be described below.

The fundamental power factor is a power factor in a case where the voltage and current do not include a DC component and the distortion of the voltage waveform can be ignored (i.e., corresponding to a circuit connected to a power source of a sine-wave voltage). A voltage v(t) and a current i(t) in the case where the voltage and current do not include a DC component and the distortion of the voltage waveform can be ignored can be expressed by the following Equations (24) and (25).

[Math. 24]

$$v(t)=\sqrt{2}V_1 \sin(2\pi ft+\theta_1) \quad (24)$$

[Math. 25]

$$i(t)=\Sigma_{n=1}^{\infty}\sqrt{2}I_n \sin(2\pi \times n \times ft+\theta_n-\varnothing_n) \quad (25)$$

In this case, an active power can be obtained in accordance with the above Equation (18), but the term of the product of different frequency components is 0, and only the term of the product of a fundamental component of the voltage and a fundamental component of the current remains. As a result, the active power P can be expressed by the following Equation (26).

[Math. 26]

$$P=V_1 I_1 \cos \phi_1 \quad (26)$$

In Equation (26), "cos ϕ1" represents the cosine of the phase difference between a fundamental voltage and a fundamental current, that is, the power factor of a fundamental component, which is referred to as a fundamental power factor. On the other hand, when the effective value of the voltage is represented by V1 from the above Equation (24), the apparent power S can be expressed by the following Equation (27).

[Math. 27]

$$S=V_1 \sqrt{\Sigma_{n=0}^{\infty} I_n^2} \quad (27)$$

Thus, the total power factor PF can be expressed as follows from the above Equations (23) and (27).

[Math. 28]

$$PF = \frac{P}{S} = \frac{V_1 I_1 \cos\phi_1}{V_1 \sqrt{\sum_{n=0}^{\infty} I_n^2}} \quad (28)$$

As an index indicating the degree of distortion of a waveform, a total harmonic distortion (THD) can be defined by the following Equation (29) as the ratio of a total harmonic effective value An except for the fundamental to a fundamental effective value A1.

[Math. 29]

$$THD = \frac{\sqrt{\sum_{n=2}^{\infty} A_n^2}}{A_1} \quad (29)$$

With use of the above Equation (29), the above Equation (28) is substituted into the following Equation (30) of a total harmonic distortion THDi of current, and then the total power factor PF can be expressed by the following Equation (31).

[Math. 30]

$$THDi = \frac{\sqrt{\sum_{n=2}^{\infty} I_n^2}}{I_1} \quad (30)$$

[Math. 31]

$$PF = \frac{V_1 I_1 \cos\phi_1}{V_1 \sqrt{\sum_{n=0}^{\infty} I_n^2}} = \frac{V_1 I_1 \cos\phi_1}{V_1 \sqrt{I_1^2 + (THDi \times I_1)^2}} = \frac{V_1 I_1 \cos\phi_1}{V_1 I_1 \sqrt{1 + (THDi)^2}} = \frac{\cos\phi_1}{\sqrt{1 + (THDi)^2}} \quad (31)$$

The above Equation (31) indicates that the total power factor in a case where the current includes a harmonic component is a predetermined multiple B (see the following Equation (32)) of the fundamental power factor.

[Math. 32]

$$B = \frac{1}{\sqrt{1 + (THDi)^2}} \quad (32)$$

This also indicates that control on the fundamental power factor and the harmonic component THDi enables the total power factor to be changed. In particular, when the harmonic component THDi is decreased, the total power factor PF is increased. Thus, the above Equation (31) indicates that the total power factor PF can be controlled by using the harmonic component THDi of current as a detected value.

OTHER EMBODIMENTS

The power-source quality used to generate a load apparatus command signal Fs (control signal) may be a combination of a present power-source power factor and a power-source harmonic, not a present power-source power factor or a power-source harmonic.

INDUSTRIAL APPLICABILITY

As described above, the present disclosure is useful as a power-source power factor control system, a phase modifying apparatus, and an active filter apparatus.

REFERENCE SIGNS LIST 1, 2, 101, 102, 201, 202, 301, 302, 401, 402, 501, 502, 601, 602, 701, 702, 801, 802, 901, 902 load apparatus
1b, 101b active filter
1c, 2c, 101c, 102c, 201c. 202c adjusting unit (operation state control unit)
3, 103, 203, 303, 403, 503, 603, 703, 803, 903, 1003 AC power source
9, 104 power-source power factor measuring device (power-source power factor measuring unit)
30, 130 active filter
31, 131 phase modifier
40, 1040 power-source power factor demand controller (control signal generating unit)
100, 200, 1100 power-source power factor control system
151 target power factor value setting unit (target value adjusting unit)
152 load adjustment determining unit (control signal generating unit)
204, 304, 404 active filter apparatus (phase modifying apparatus)
205a, 205b, 305a, 305b, 305c, 406a, 406b, 407a, 40711, 505a, 505b, 605a, 605b, 705a, 705b, 805a, 805b, 805c, 906a, 906b, 907a, 907b first current detector (current detecting unit)
508 phase modifying facility (phase modifying apparatus)
230, 330, 430, current source (power factor improving unit)
531 phase modifier (power factor improving unit)
240, 340, 440, 540, 640, 740, 840, 940 controller (operation state control unit)
601, 701, 801, 901 power converting apparatus (load apparatus)
604, 704, 804, 904 active filter apparatus
606, 706, 806, 906 distribution switchboard
620, 720, 820, 920 air conditioning apparatus
630, 730, 830, 930 current source
Ca, Cb, Cc phase advancing capacitor
La, Lb, Lc reactor

The invention claimed is:
1. A power-source power factor control system comprising:
a load apparatus that is connected to an AC power source and that is supplied with power from the AC power source;
a power-source power factor measuring unit that measures the power-source power factor;
a control signal generating unit that generates, based on a measurement result of the power-source power factor measuring unit and a target value about the power-source power factor of the AC power source, a control signal for changing the operation state of the load apparatus;
an operation state control unit that controls, based on the control signal, an operation state of the load apparatus; and
a target value adjusting unit that adjusts, based on the measurement result of the power-source power factor measuring unit, the target value, wherein the target value adjusting unit adjusts the target value by using an average value of the power-source power factor in a unit period for which the target value is adjusted, in a case where the average value of the power-source power factor in a first period of the unit period exceeds a reference value, the target value adjusting unit causes the target value in a second period following the first period of the unit period to be smaller than the target value in the first period, and in a case where the average value in the first period is below the reference value, the target value adjusting unit causes the target value in the second period to be larger than the target value in the first period.

2. The power-source power factor control system according to claim 1, wherein a total period of the first period and the second period is equal to or shorter than the unit period.

3. The power-source power factor control system according to claim 2, wherein the total period of the first period and the second period is equal to the unit period, and each of the first period and the second period is half the unit period.

4. The power-source power factor control system according to claim 1, wherein the unit period is one month.

5. The power-source power factor control system according to claim 1, wherein the power-source power factor measuring unit is a power meter.

6. The power-source power factor control system according to claim 1, wherein the power-source power factor measuring unit wirelessly transmits the measurement result to the control signal generating unit.

7. The power-source power factor control system according to claim 1, wherein the control signal generating unit wirelessly transmits the control signal that has been generated to the operation state control unit.

8. The power-source power factor control system according to claim 1, wherein the load apparatus is an air conditioning apparatus.

9. The power-source power factor control system according to claim 8, wherein the load apparatus is a source of a harmonic current, the power-source power factor control system further comprises an active filter that is connected in parallel to the load apparatus with respect to the AC power source and that reduces the harmonic current generated in the load apparatus, and the active filter is incorporated in the air conditioning apparatus.

10. The power-source power factor control system according to claim 1, further comprising:

a phase modifier that is connected in parallel to the load apparatus with respect to the AC power source and that controls reactive power of the power supplied to the load apparatus.

11. The power-source power factor control system according to claim 1, wherein the load apparatus is a source of a harmonic current, and the power-source power factor control system further comprises an active filter that is connected in parallel to the load apparatus with respect to the AC power source and that reduces the harmonic current generated in the load apparatus.

12. A phase modifying apparatus that is included in a power-source power factor control system including a load apparatus that is connected to an AC power source and that is supplied with power from the AC power source, and an operation state control unit that controls, based on a target value about a power-source quality including either a power-source power factor of the AC power source or a power-source harmonic of the AC power source and on a present power-source quality, an operation state of the load apparatus, and that is connected to the AC power source and the load apparatus, comprising:

a power factor improving unit that improves a fundamental power factor by generating a current for reducing a harmonic current of the load apparatus or by changing a phase of the current; and the operation state control unit, wherein the target value about the power-source power factor of the AC power source is a target value of the fundamental power factor, and the operation state control unit controls an operation parameter for changing the operation state of the load apparatus such that the fundamental power factor approaches the target value.

13. The phase modifying apparatus according to claim 12, further comprising:

a current detecting unit that detects an output current output from the AC power source, wherein the operation state control unit adjusts, based on a detection result of the current detecting unit, the operation parameter such that the fundamental power factor approaches the target value.

14. The phase modifying apparatus according to claim 13, wherein the AC power source is a power source having a plurality of phases, and the current detecting unit includes a plurality of current detecting units provided corresponding to respective phases of the AC power source.

15. The phase modifying apparatus according to claim 13, wherein the current detecting unit wirelessly transmits the detection result to the operation state control unit.

16. The phase modifying apparatus according to claim 13, wherein the current detecting unit operates with a non-power-source scheme.

17. The phase modifying apparatus according to claim 12, wherein the power factor improving unit is a phase modifier that is connected in parallel to the load apparatus with respect to the AC power source and that controls reactive power of the power supplied to the load apparatus.

18. The phase modifying apparatus according to claim 17, wherein the phase modifier includes a phase advancing capacitor.

19. The phase modifying apparatus according to claim 18, wherein the phase modifier further includes a reactor connected in series to the phase advancing capacitor.

20. The phase modifying apparatus according to claim 12, wherein the load apparatus is a source of the harmonic current, and the power factor improving unit is an active filter that is connected in parallel to the load apparatus with respect to the AC power source and that reduces the harmonic current generated in the load apparatus.

21. The phase modifying apparatus according to claim 12, wherein the load apparatus is an air conditioning apparatus.

22. An active filter apparatus that is included in a power-source power factor control system including a load apparatus that is connected to an AC power source and that is supplied with power from the AC power source, and an operation state control unit that controls, based on a target value about a power-source quality including either a power-source power factor of the AC power source or a power-source harmonic of the AC power source and on a present power-source quality, an operation state of the load apparatus, and that is connected to the AC power source and the load apparatus, comprising:
- a current source that generates a current for improving a fundamental power factor of the load apparatus;
- a current detecting unit detects an output current output from the AC power source; and
- the operation state control unit, wherein
- the target value about the power-source power factor of the AC power source is a target value of the fundamental power factor, and
- the operation state control unit controls, based on a detection result of the current detecting unit, an operation parameter for changing the operation state of the load apparatus such that the fundamental power factor approaches the target value.

23. The active filter apparatus according to claim 22, wherein the current source further reduces a harmonic current of the load apparatus.

24. The active filter apparatus according to claim 22, wherein
- the load apparatus includes a plurality of load apparatuses, and
- the operation state control unit adjusts the operation parameter of each of the plurality of the load apparatuses such that operation capabilities of the plurality of the load apparatuses decrease, to cause the fundamental power factor to approach the target value.

25. The active filter apparatus according to claim 24, further comprising:
- a distribution switchboard that causes the power from the AC power source to branch off to each of the load apparatuses, wherein
- the current detecting unit is installed in the distribution switchboard.

26. The active filter apparatus according to claim 22, wherein
- the load apparatus includes a plurality of load apparatuses,
- the operation state control unit
- determines, based on the detection result of the current detecting unit, the load apparatus whose operation capability is to be decreased from among the plurality of the load apparatuses, and
- adjusts the operation parameter of the determined load apparatus such that the operation capability of the determined load apparatus decreases, to cause the fundamental power factor to approach the target value.

27. The active filter apparatus according to claim 26, wherein
- the current detecting unit includes a plurality of current detecting units provided corresponding to respective load apparatuses, and
- each of the current detecting units detects the output current from the AC power source to a corresponding one of the load apparatuses.

28. The active filter apparatus according to claim 22, wherein the current detecting unit includes a plurality of current detecting units provided corresponding to respective phases of the AC power source.

29. The active filter apparatus according to claim 22, wherein the current detecting unit wirelessly transmits the detection result to the operation state control unit.

30. The active filter apparatus according to claim 22, wherein the current detecting unit operates with a non-power-source scheme.

31. The active filter apparatus according to claim 22, wherein the active filter apparatus is incorporated in an air conditioning apparatus.

* * * * *